United States Patent [19]

Nagai et al.

[11] Patent Number: 5,862,112
[45] Date of Patent: Jan. 19, 1999

[54] OPTICAL DISK AND AN OPTICAL DISK RECORDING REPRODUCTION DEVICE

[75] Inventors: Takahiro Nagai, Osaka; Isao Satoh, Neyagawa; Yuji Takagi, Hirakata; Yuji Hisakado, Osaka; Yoshito Aoki, Moriguchi; Shunji Ohara, Higashiosaka; Takashi Ishida, Yawata, all of Japan

[73] Assignee: Matsushita Electric Industrial Co., Ltd., Kadoma, Japan

[21] Appl. No.: 94,339

[22] Filed: Jun. 9, 1998

Related U.S. Application Data

[62] Division of Ser. No. 601,263, Feb. 14, 1996.

[30] Foreign Application Priority Data

Feb. 17, 1995 [JP] Japan .................................. 7-29436
Oct. 9, 1995 [JP] Japan ................................. 7-261245

[51] Int. Cl.⁶ ............................................. G11B 7/00
[52] U.S. Cl. ................ 369/48; 369/275.3; 369/44.26; 369/44.36; 369/54
[58] Field of Search ........................ 369/275.1, 275.2, 369/48, 275.3, 44.26, 44.32, 44.36, 54

[56] References Cited

U.S. PATENT DOCUMENTS

| | | |
|---|---|---|
| 5,327,408 | 7/1994 | Belser . |
| 5,383,176 | 1/1995 | Inui et al. . |
| 5,444,682 | 8/1995 | Yamada et al. . |
| 5,448,552 | 9/1995 | Onagi . |
| 5,452,284 | 9/1995 | Miyagawa et al. . |
| 5,499,229 | 3/1996 | Murakami et al. . |
| 5,508,995 | 4/1996 | Moriya et al. . |
| 5,508,996 | 4/1996 | Endoh . |
| 5,563,872 | 10/1996 | Horimai . |
| 5,638,354 | 6/1997 | Nakayama et al. ................. 369/44.26 |
| 5,673,250 | 9/1997 | Mieda et al. ........................ 369/275.4 |

FOREIGN PATENT DOCUMENTS

| | | |
|---|---|---|
| 5750330 | 3/1982 | Japan . |
| 62-239324 | 10/1987 | Japan . |
| 6459632 | 3/1989 | Japan . |
| 1307020 | 12/1989 | Japan . |
| 660431 | 3/1994 | Japan . |
| 0696447 | 4/1994 | Japan . |
| 6176404 | 6/1994 | Japan . |

*Primary Examiner*—Nabil Hindi
*Attorney, Agent, or Firm*—Renner, Otto, Boisselle & Sklar, P.L.L.

[57] ABSTRACT

An optical disk according to the present invention includes a first track having a spiral shape and a second track having a spiral shape, the first track and the second track adjoining each other, and information being recorded on or reproduced from the first track and the second track. The optical disk further includes an address region including: a first address block formed so as to be on both the first track and the second track adjoining the first track on an inner periphery side; and a second address block formed so as to be on both the first track and the second track adjoining the first track on an outer periphery side.

6 Claims, 40 Drawing Sheets

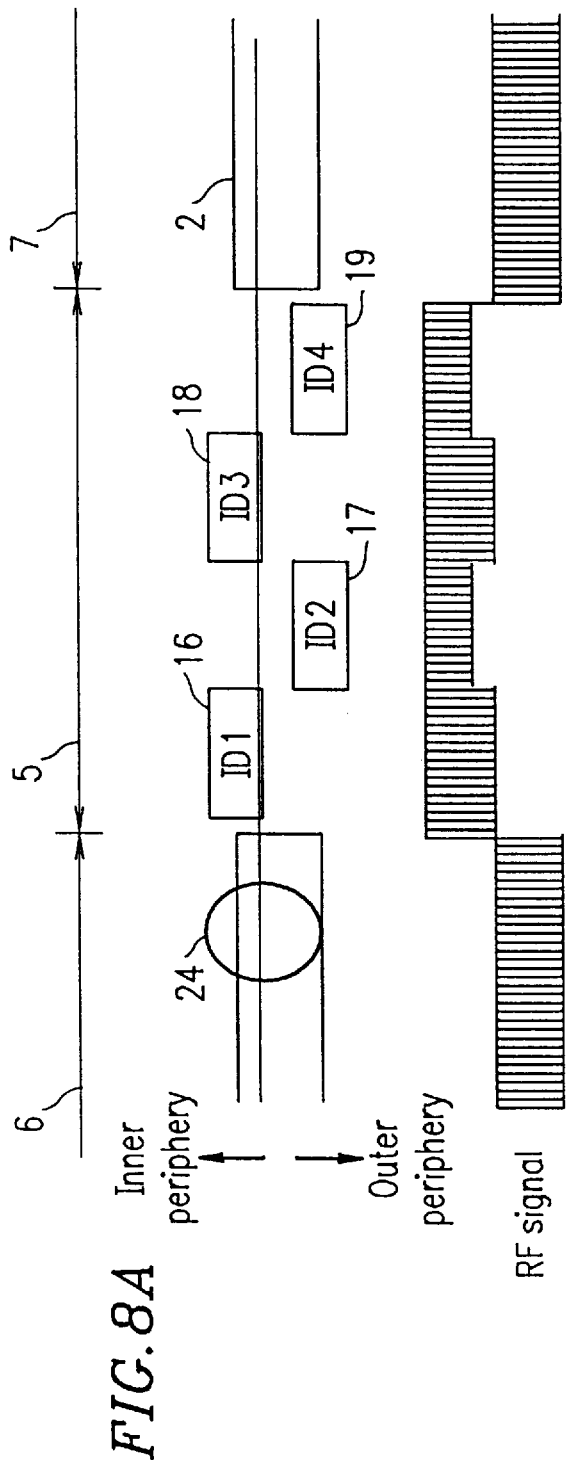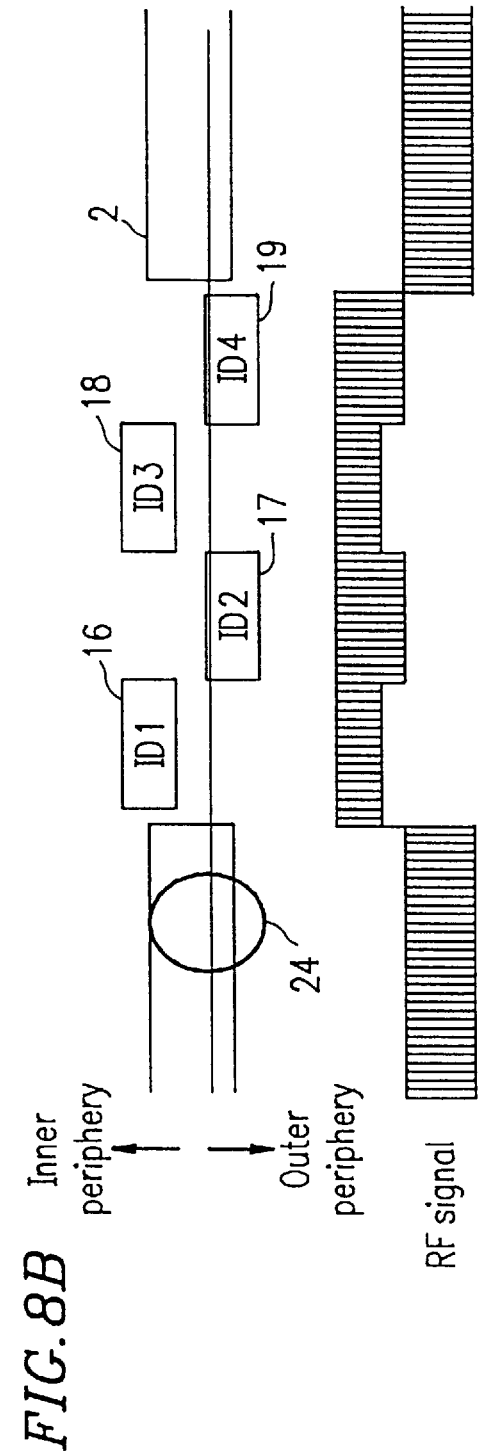

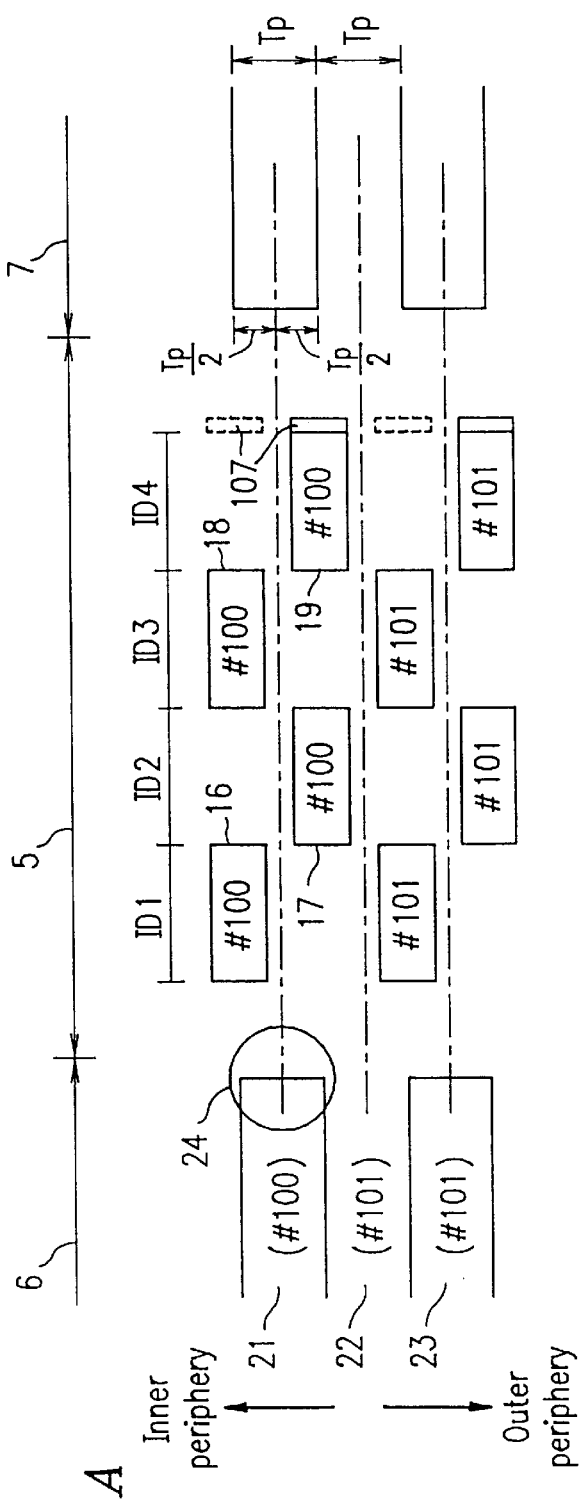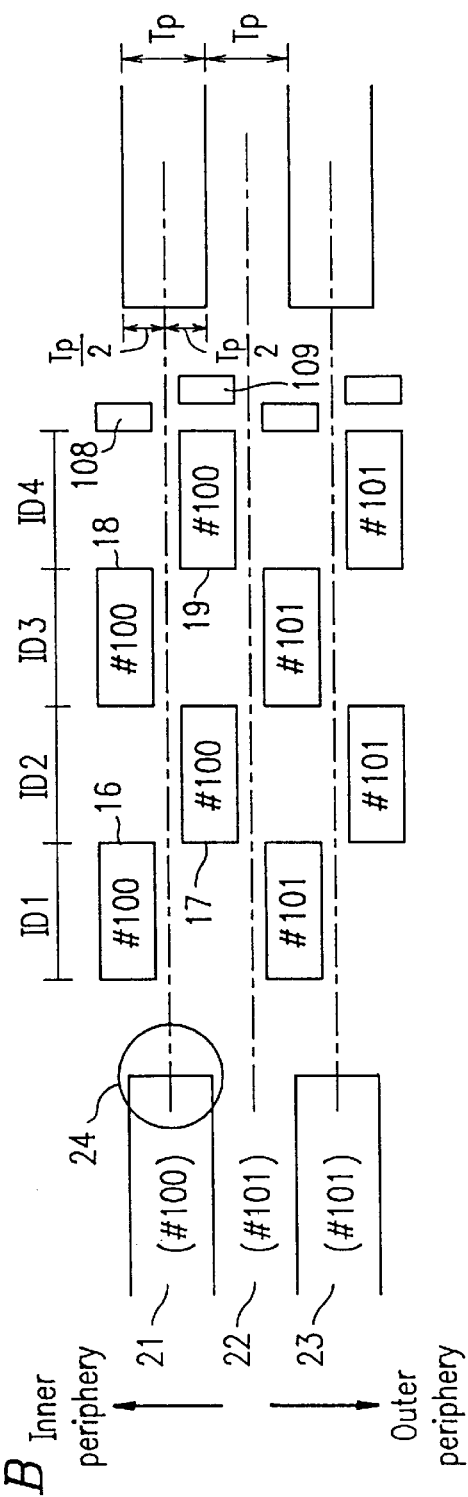

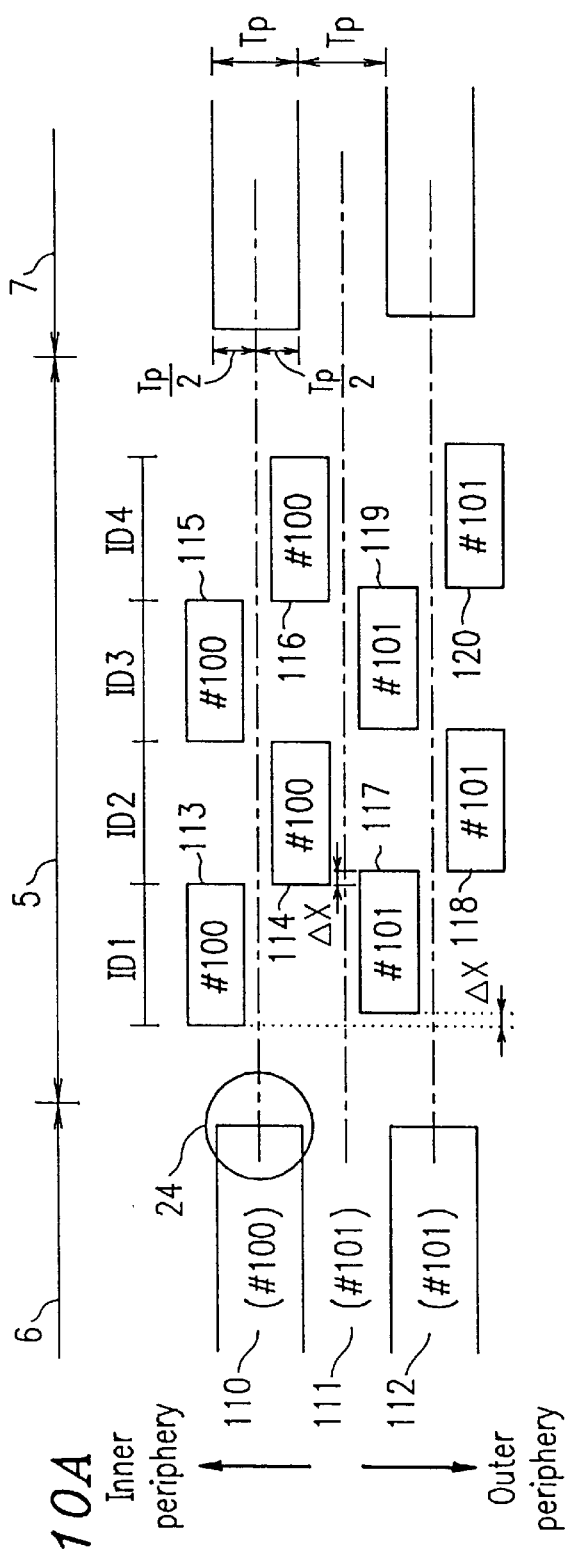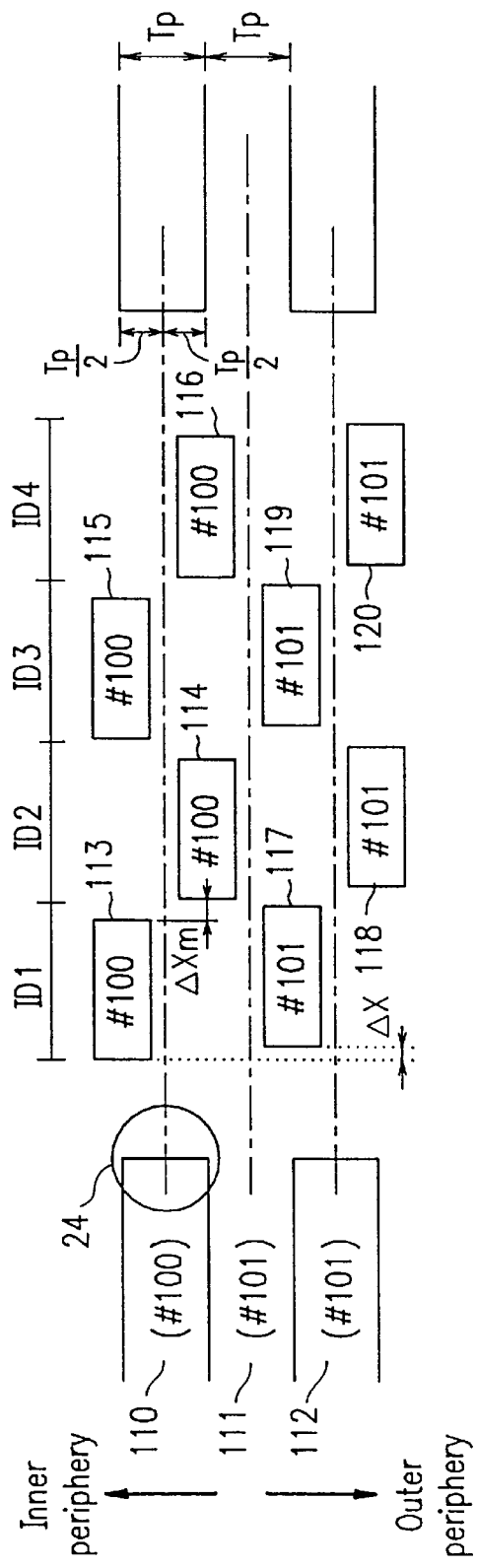

OPTICAL DISK AND AN OPTICAL DISK RECORDING REPRODUCTION DEVICE

This is a division of copending application Ser. No. 08/601,263, filed Feb. 14, 1996 now pending.

BACKGROUND OF THE INVENTION

1. Field of the Invention

The present invention relates to an optical disk and an optical disk recording/reproduction device. Specifically, the present invention relates to an optical disk in which information pit arrays are disposed between land tracks and groove tracks in a wobbling manner, and an recording/reproduction device for such an optical disk.

2. Description of the Related Art

Optical disks have excellent removability/portability and random access performance and therefore have been acquiring a broader range of applications in various information equipment fields, e.g., personal computers. As a result, there has been an increasing demand for increasing the recording capacitance of optical disks. Rewritable optical disks require sector-by-sector management of recording and reproduction of data. Therefore, in the production of such disks, address information for each sector is often formed in the form of pits while guide grooves are formed for tracking control purposes. In currently prevalent optical disks, concave and convex tracks of 1–1.6 $\mu$m (each width accounting for about 50%) are formed in a spiral shape on a disk substrate. A thin film composed of a recording material (e.g., Ge, Sb, and Te in the case of phase-change type optical disks) is formed on the surface of the tracks by methods such as sputtering. The disk substrate is mass-duplicated in the form of substrates of polycarbonate, etc. by using a stamper which is formed from a master disk in which concave grooves and pits for sector addresses and the like are cut by radiating a light beam. For optical disks having the above configuration, a light beam is radiated on either a concave track or a convex track with a predetermined recording power so as to form marks on the recording film, thereby recording information, and a light beam is radiated on either a concave track or a convex track with a predetermined reproduction power so as to detect light reflected from the recording film, thereby reproducing information.

In recent years, the capacity of information data dealt with in various fields has further increased, so that optical disks are also desired to have increased capacity. Although it is possible to increase the recording density by narrowing the width of each track (hereinafter referred to as the "track pitch"), it is necessary to reduce the track pitch to ½ of the conventional track pitch in order to realize a recording density twice as high as the conventional recording density. However, any production method would have a large difficulty in forming a stamper having convex and concave tracks with a stable width which is a half of the track pitch and to duplicate such a disk. On the other hand, there has been proposed a method for increasing the recording density by recording/reproducing information on both the concave tracks and convex tracks. According to this method, a recording density twice as high as the conventional recording density can be realized without changing the width of the concave and convex tracks.

In the case of optical disks in which information is recorded on both convex and concave tracks, providing sector addresses for identifying sectors separately for each track would require forming two addresses or concave tracks at the same time, which would require the use of two or more laser beams and therefore a complex apparatus. Therefore, an intermediate address method has been proposed in which addresses are formed so as to be on both a concave track and a convex track of the optical disk (Japanese Laid-Open Patent Publication No. 6-176404). According to this method, each address on the disk is provided so as to be centered around a boundary line between a convex track and a concave track, with a width substantially equal to that of the concave track, so that the concave track and the convex track share the same address. As a result of this, cutting of the master disk can be facilitated. In this case, however, two tracks are present for the same address when viewed from the recording/reproduction device, and therefore it is necessary to clearly distinguish between them somehow.

Hereinafter, a conventional optical disk and a conventional optical disk recording/reproduction device based on the above-mentioned intermediate address method will be described with reference to the figures.

FIG. 38 is a conceptual diagram showing a conventional optical disk having a sector structure. In FIG. 38, 200 denotes a disk; 201 denotes a track; 202 denotes a sector; 203 denotes a sector address region; and 204 denotes a data region. FIG. 39 is a magnified view of a sector address region and a conceptual diagram showing a conventional intermediate address. In FIG. 39, 206 denotes address pits; 207 denotes recording marks; 208 denotes a groove track; 209 denotes a land track; and 210 denotes an optical disk.

Herein, the groove track 208 and the land track 209 have the same track pitch Tp. Each address pit 206 is disposed so that the center thereof is shifted by Tp/2 along the radius direction of the disk from the center of the groove track 208.

FIG. 40 is a block diagram showing the conventional tracking control and the signal processing of reading signals on an optical disk.

Reference numeral 200 denotes a disk; 201 denotes a track; 210 denotes a light spot; and 211 denotes a disk motor for rotating the disk 200. Reference numeral 212 denotes an optical head for optically reproducing signals on the disk 200. The optical head 212 is composed of a laser diode 213, a collimate lens 214, an object lens 215, a half mirror 216, a photosensitive section 217, and an actuator 218. Reference numeral 220 denotes a tracking error signal detection section for detecting a tracking error signal indicating the amount of dislocation between the light spot 210 and the track 201 along the radius direction. The tracking error signal detection section 220 is composed of a differential circuit 221 and a LPF (Low Pass Filter) 222. Reference numeral 223 denotes a phase compensation section for generating a drive signal for driving the optical head from a tracking error signal; 224 denotes a head driving section for driving the actuator 218 in the optical head 212 in accordance with the drive signal; 225 denotes an addition circuit for signals from the photosensitive section 217; 226 denotes a waveform equivalent section for preventing interference between signs of a reproduced signal; 227 is a data slice section for digitalizing the reproduced signal at a predetermined slice level; 228 denotes a PLL (Phase Locked Loop) for generating a clock which is in synchronization with the digitalized signal; 229 is an AM detection section for detecting AMs (Address Marks); 230 is a demodulator for demodulating the reproduced signal; 231 denotes a switcher for separating the data from the address in the demodulated signal; 232 is a CRC (Cyclic Redundancy Check) determination section for determining errors in the address signal; 233 is an error correction section for correcting errors in the data signal; 234 denotes an address reproduction section composed of elements 225 to 232; and CRC is an error detection code which is generated from an address number and an ID number.

First, positioning control is performed along the focusing direction of the light spot 210, but the description of general focusing control is omitted.

Hereinafter, the tracking control operation will be described. Laser light radiated from the laser diode 213 is collimated by the collimate lens 214, and is converged on the disk 200 via the object lens 215. The laser light reflected from the disk 200 returns to photosensitive sections 217a and 217b via the half mirror 216, whereby the distribution of light amount is detected as an electric signal, which is determined by the relative positions of the light spot 210 and the track 201. In the case of using the two-divided photosensitive sections 217a and 217b, a tracking error signal is detected by detecting a difference between the photosensitive sections 217a and 217b by means of the differential circuit 221 and extracting a low-frequency region of the differential signal by means of the LPF 222. In order to ensure that the light spot 210 follows the track 201, a drive signal is generated in the phase compensation section 223 such that the tracking error signal becomes 0 (i.e., the photosensitive sections 217a and 217b have the same light amount distribution), and the actuator 218 is driven by the head driving section 224 in accordance with the drive signal, thereby controlling the position of the object lens 215.

On the other hand, when the light spot 210 follows the track 201, the amount of reflected light reduces at the recording marks 206 and the address pits 206 owing to interference of light, thereby lowering the output of the photosensitive section 217, whereas the amount of reflected light increases where pits do not exist, thereby increasing the output of the photosensitive section 217. The total light amount of the output of the photosensitive section corresponding to the recording mark 207 and address pits 206 are derived by the addition circuit 225, led through the waveform equivalent section 226, and digitalized at a predetermined slice level at the data slice section 227, i.e., converted into a signal sequence of "0" and "1". Data and a read clock are extracted from this digitalized signal by the PLL 228. The demodulator 230 demodulates the recorded data which has been modulated, and converts it into a data format which allows external processing. If the demodulated data is a signal in the data region, the errors in the data are corrected in the error correction section 233, whereby a data signal is obtained. On the other hand, if the AM detection section 229 detects an AM signal for identifying the address portion in a signal sequence that is constantly output from the PLL 228, the switcher 231 is switched so that the demodulated data is processed as an address signal. The CRC determination section 232 determines whether or not the address signal which has been read includes any errors; if no error is included, the address signal is output as address data.

FIG. 41 shows the states of a reproduced signal (RF signal) and a tracking error signal (TE signal) when the light spot 210 passes the sector address region 203 in the above-described configuration. Although the light spot 210 is located in the center of the track in the data region 204, a drastic dislocation occurs between the light spot 210 and the address pits 206 immediately after the light spot 210 enters the sector address region 203, thereby greatly fluctuating the level of the TE signal. The light spot 210 cannot rapidly follow the address pits 206 but gradually comes closer to the address pits 206, as indicated by the broken line. However, since the sector address region 203 is short, the data region 205, which is a grooved region, is reached before the light spot manages to completely follow the address pits 206, so that a tracking control is performed so that the off-tracking Xadr is eliminated in the grooved region. Moreover, since a portion of the light spot 210 is on the address pits 206, an RF signal as shown in FIG. 41 is obtained. The RF signal amplitude Aadr varies in accordance with the distance between the light spot 210 and the address pits 206. Specifically, Aadr decreases as the distance becomes larger, and increases as the distance becomes smaller.

However, in accordance with the sector address having the configuration shown in FIG. 39, the distance between the light spot and the address pits may also vary in the sector address region in the case where the center of the light spot is dislocated from the center of the track in the data region. As a result, there is a problem in that, although the amplitude of the reproduced signal in the address pit region would increase if the light spot shifted closer to the address pits, the amplitude of the reproduced signal in the address pit region would decrease if the light spot shifted away from the address pits, thereby resulting in an insufficient reading of the address.

There is also a problem in that, since the light spot is dislocated from the address pits in the sector address region, a large fluctuation in level (which does not indicate the actual track offset amount) occurs in the tracking error signal. Since the tracking control is performed by employing such a tracking error signal, a tracking offset occurs after the light spot passes the sector address section.

There is also a problem in that, since the same address pits are allocated to a land track and its adjoining groove track, it is impossible to identify whether or not a track which is currently being followed is a land track or a groove track.

SUMMARY OF THE INVENTION

An optical disk according to the present invention includes a first track having a spiral shape and a second track having a spiral shape, the first track and the second track adjoining each other, and information being recorded on or reproduced from the first track and the second track. The optical disk further includes an address region including: a first address block formed so as to be on both the first track and the second track adjoining the first track on an inner periphery side; and a second address block formed so as to be on both the first track and the second track adjoining the first track on an outer periphery side.

An optical disk of a land/groove recording/reproduction type according to the present invention includes a plurality of sectors each having a sector address region and a data region, wherein the sector address region includes a plurality of address blocks, at least two of the plurality of address blocks that adjoin each other along a circumference direction being disposed so as to be shifted toward opposite sides with respect to a track center, and each of the plurality of address blocks includes within the sector address region a portion indicating an address number for identifying the plurality of sectors from one another and a portion indicating an ID number for identifying the plurality of address blocks from one another.

In one embodiment of the invention, the at least two address blocks that adjoin each other are located so as to be shifted from the track center, toward an inner periphery side or an outer periphery side, by about a half of a track pitch along a radius direction.

In another embodiment of the invention, the portion indicating the address number has a data pattern which is common to the plurality of address blocks within the same sector address region.

In still another embodiment of the invention, each of the plurality of address blocks has non-pit data in a beginning portion and an end portion thereof.

In still another embodiment of the invention, the length of the non-pit data is larger than a disk rotation accuracy of a laser cutting process in the production of a master disk.

In still another embodiment of the invention, the first one of the plurality of address blocks includes a reproduction clock synchronization signal portion which is larger than a reproduction clock synchronization signal portion of any other one of the plurality of address blocks.

In still another embodiment of the invention, the sector address region includes a block composed of information not related to the identification of the address numbers, and the block is disposed so as to be shifted from the track center, toward an inner periphery side or an outer periphery side, by about a half of a track pitch along a radius direction.

In still another embodiment of the invention, an interspace is provided, along the circumference direction, between the at least two address blocks that adjoin each other.

In still another embodiment of the invention, in the sector address region, the address blocks are located along the circumference direction in such a manner that phases of pit patterns constituting the address blocks match each other on both sides of one track.

An optical disk recording/reproduction device for an optical disk of a land/groove recording/reproduction type according to the present invention includes a plurality of sectors each having a sector address region and a data region, wherein the sector address region of the optical disk includes a plurality of address blocks, at least two of the plurality of address blocks that adjoin each other along a circumference direction being disposed so as to be shifted toward opposite sides with respect to a track center, and each of the plurality of address blocks includes a portion indicating an address number for identifying the plurality of sectors from one another and a portion indicating an ID number for identifying the plurality of address blocks from one another within the sector address region. The recording/reproduction device includes: an optical head for radiating a light beam on the optical disk and receiving light reflected from the optical disk so as to output a reproduced signal; and an address signal reproduction section for reading the address number and the ID number when reproducing the sector address of the optical disk.

In one embodiment of the invention, the optical disk recording/reproduction device further includes an address correction section for correcting the address number which is read from each address block in accordance with the ID number by employing a signal indicating land reproduction or groove reproduction.

In another embodiment of the invention, the optical disk recording/reproduction device further includes: a memory for storing the address number read by the address signal reproduction section as associated with the ID number read by the address signal reproduction section; a, comparator for comparing two or more address numbers respectively associated with two or more ID numbers against each other so as to detect whether or not the two or more address numbers match each other; and a judgment section for determining whether a track on which the light beam for reproduction is a land track or a groove track based on an output of the comparator.

In still another embodiment of the invention, the optical disk recording/reproduction device further includes a tracking error signal detection section for detecting a tracking error signal indicating a locational offset amount between a track and a light spot; a timing generation section for generating a gate pulse signal synchronized with each address block of the sector address region; an outer periphery value sample/hold section for sampling and holding the levels of the tracking error signals for the address blocks disposed on an outer periphery side in synchronization with the gate pulse signal; an inner periphery value sample/hold section for sampling and holding the levels of the tracking error signals for the address blocks disposed on an inner periphery side in synchronization with the gate pulse signal; a differential circuit for obtaining a difference between a value in the outer periphery value sample/hold section and a value in the inner periphery value sample/hold section; a gain conversion section for converting an output of the differential circuit into a signal having a predetermined level; and a tracking offset correction circuit for performing a tracking correction using an output from the gain conversion section.

In still another embodiment of the invention, the optical disk recording/reproduction device further includes: a reflected light amount signal detection section for detecting the amount of reflected light from the optical disk; a timing generation section for generating a gate pulse signal synchronized with each address block of the sector address region; an outer periphery value sample/hold section for sampling and holding the signal levels of the reflected light for the address blocks disposed on an outer periphery side in synchronization with the gate pulse signal; an inner periphery value sample/hold section for sampling and holding the signal levels of the reflected light for the address blocks disposed on an inner periphery side in synchronization with the gate pulse signal; a differential circuit for obtaining a difference between a value held in the outer periphery value sample/hold section and a value held in the inner periphery value sample/hold section; a gain conversion section for converting an output of the differential circuit into a signal having a predetermined level; and a tracking offset correction circuit for performing a tracking correction using an output from the gain conversion section.

Alternatively, an optical disk according to the present invention includes a first track having a spiral shape and a second track having a spiral shape, the first track and the second track adjoining each other, and information being recorded on or reproduced from the first track and the second track, wherein the optical disk further includes: an address block formed so as to be on both the first track and the second track; and a track identification mark formed on either the first track or the second track.

In one embodiment of the invention, the address regions are located in accordance with a CAV format or a ZCAV (ZCLV) format.

Alternatively, an optical disk according to the present invention includes a first track having a spiral shape and a second track having a spiral shape, the first track and the second track adjoining each other, and information being recorded on or reproduced from the first track and the second track, wherein the optical disk further includes an address region including: an address block formed so as to be on both the first track and the second track; and a first track identification mark formed so as to be on both the first track and the second track adjoining the first track on an inner periphery side; and a second track identification mark formed so as to be on both the first track and the second track adjoining the first track on an outer periphery side, wherein the first track identification mark and the second track identification mark are identical.

Alternatively, an optical disk according to the present invention includes a first track having a spiral shape and a second track having a spiral shape, the first track and the second track adjoining each other, and information being recorded on or reproduced from the first track and the second track, wherein the optical disk further includes an address region including: an address block formed so as to be on both the first track and the second track; and a track identification mark formed in a control information region of either the first track or the second track.

Alternatively, an optical disk recording/reproduction device capable of recording information on and reproducing information from one optical disk according to the present invention includes: track designation means for selecting the first track or the second track for which information is to be recorded; and track identification mark reproduction means for reading a track identification mark; wherein the track identification mark reproduction means reads the track identification mark, if any, of a currently reproduced track and identifies the currently reproduced track to be either the first track or the second track depending on whether or not the track identification mark is present, so as to output a track identification signal, and the track designation means switches between selecting the first track and selecting the second track in accordance with the track identification signal.

Alternatively, an optical disk recording/reproduction device capable of recording information on and reproducing information from one optical disk according to the present invention includes: track designation means for selecting the first track or the second track for which information is to be recorded; address reproduction means for reading the first address block and the second address block formed so as to be on the first track and the second track adjoining the first track; and track identification means for identifying a currently reproduced track to be either the first track or the second track based on the first address block and the second address block reproduced by the address reproduction means, wherein the track identification means identifies the currently reproduced track to be either the first track or the second track based on a difference between the two addresses reproduced by the address reproduction means, so as to output a track identification signal, and the track designation means switches between selecting the first track and selecting the second track in accordance with the track identification signal.

Alternatively, an optical disk recording/reproduction device capable of recording information on and reproducing information from one optical disk according to the present invention includes: track designation means for selecting the first track or the second track for which information is to be recorded; track identification mark reproduction means for reading a track identification mark formed so as to be on both the first track and the second track adjoining the first track; and track identification means for identifying a currently reproduced track to be either the first track or the second track based on two track identification marks reproduced by the track identification mark reproduction means, wherein the track identification means identifies the currently reproduced track to be either the first track or the second track based on a difference between the two track identification marks reproduced by the track identification mark reproduction means, so as to output a track identification signal, and the track designation means switches between selecting the first track and selecting the second track in accordance with the track identification signal.

Alternatively, an optical disk recording/reproduction device capable of recording information on and reproducing information from one optical disk according to the present invention includes: track designation means for selecting the first track or the second track for which information is to be recorded; data reproduction means for reading a track identification mark provided in the control information region; track polarity determination means for determining the polarity of a reproduced track; and track selection signal correction means for correcting a track selection signal from the track designation means, wherein the data reproduction means reproduces the track identification mark in the control information region when the reproduction of the optical disk is started; the track polarity determination means determines whether the selection of tracks is correct or not based on the track identification mark of the reproduced track and the track selection signal from the track designation means so as to output a track polarity determination signal; and the track selection signal correction means corrects the track selection signal from the track designation means based on the track polarity determination signal so as to select the first track or the second track.

In one embodiment of the invention, the optical disk recording/reproduction device further includes an address correction section for correcting the address number stored in the memory in accordance with the ID number.

A method for identifying an optical disk according to the present invention is characterized in that a plurality of address blocks provided within one address region are read in order to detect whether or not at least two address blocks match each other, thereby identifying a currently reproduced track to be either the first track or the second track.

In accordance with the above-mentioned configuration, sector addresses having address blocks which are disposed so as to wobble with respect to the center of each track along the radius direction are provided. As a result, insufficient reading of address signals due to tracking offset can be reduced and the tracking offset after passing a sector address can be reduced.

Moreover, it becomes possible to identify a currently reproduced track to be either a land track or a groove track.

Furthermore, it is possible to detect an off-track signal indicating the actual tracking offset amount between the light spot and a track based on a difference between reflected light amount signals or tracking error signals obtained at address blocks wobbling between an inner track and an outer track. It becomes possible to accurately follow tracks by correcting the tracking error signal using this off-track signal.

Thus, the invention described herein makes possible the advantages of (1) providing an optical disk having a novel address pit arrangement in sector address sections such that insufficient reading of address signals due to tracking offset is reduced and the tracking offset after passing a sector address is reduced, the optical disk further enabling identification of land tracks and groove tracks; and (2) providing an optical disk recording/reproduction device for such an optical disk.

These and other advantages of the present invention will become apparent to those skilled in the art upon reading and understanding the following detailed description with reference to the accompanying figures.

BRIEF DESCRIPTION OF THE DRAWINGS

FIGS. 8A and 8B are diagrams describing a tracking offset of a light spot and a RF signal.

FIGS. 9A and 9B are diagrams showing the location of address blocks in an optical disk according to another example of the present invention.

FIGS. 10A and 10B are diagrams showing the location of address blocks in an optical disk according to still another example of the present invention.

DESCRIPTION OF THE PREFERRED EMBODIMENTS

Hereinafter, examples of the present invention will be described with reference to the figures.

(EXAMPLE 1)

Figure 1:
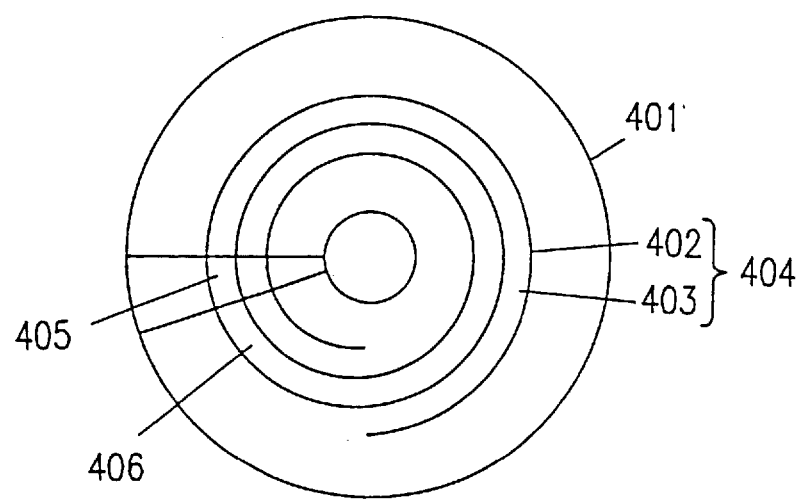
FIG. 1 is a schematic view showing an optical disk according to Example 1 of the present invention.

FIG. 1 shows the outlook of an optical disk 401 according to Example 1 of the present invention. Two spiral-shape tracks 404 are provided on the optical disk 401: a convex track (i.e., land track) 402 and a concave track (i.e., groove track) 403.

The recording and/or reproduction of information is conducted for both tracks 402 and 403. One round of each track is divided into one or more address regions 405 and one or more data regions 406. In the case where one round of each track is divided into a plurality of sectors, one address region 405 and one data region 406 are assigned to each sector. In this case, each address region 405 is also referred to as a sector address region.

The optical disk 401 includes a substrate and various films (not shown) formed on the substrate. These films include a known recording film for recording information, a known reflective film, and a known protection film. The optical disk 401 can be of a type obtained by attaching two substrates to each other, each substrate having an information recording face. This applies to any one of the optical disks described in the following examples.

Figure 2:
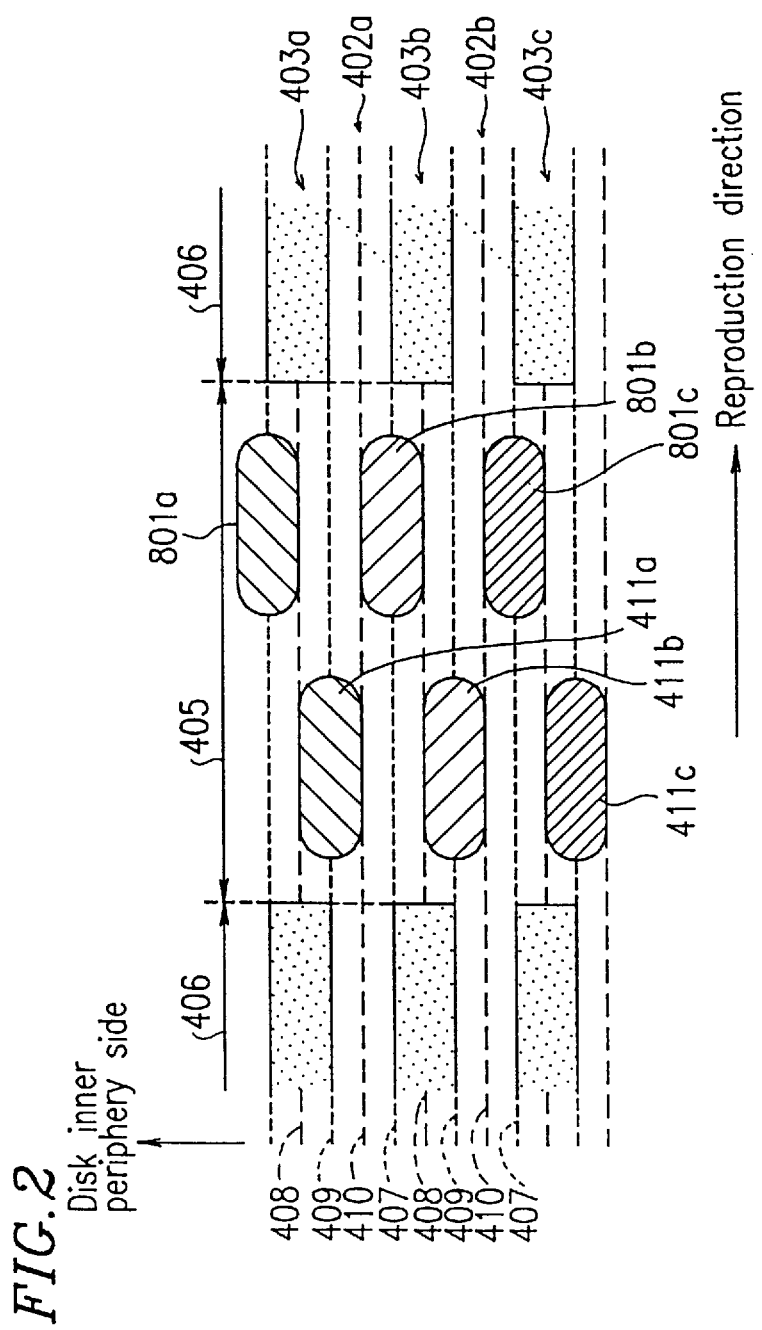
FIG. 2 is a diagram showing the location of address blocks in an optical disk according to Example 1 of the present invention.

FIG. 2 shows the address regions 405 of the optical disk 401 in more detail. As shown in FIG. 2, one address region 405 showing the address of its corresponding track (or sector) is allocated to each of tracks 403a, 402a, 403b, and 402b.

In order to indicate the address of the groove track 403a, a pair of address blocks 411a and 801a are provided in the address region 405, the address blocks 411a and 801a consisting of identical pit arrays. In order to indicate the address of the groove track 403b, a pair of address blocks 411b and 801b are provided in the address region 405, the address blocks 411b and 801b consisting of identical pit arrays. In order to indicate the address of the groove track 403c, a pair of address blocks 411c and 801c are provided in the address region 405, the address blocks 411c and 801c consisting of identical pit arrays. The information indicated by the pit pattern (i.e., pit array) of the address block is different depending on the track (or sector).

As seen from FIG. 2, the pair of address blocks 411b and 801b, for example, are located so as to be shifted in opposite directions with respect to the center 408 of the groove track 403b. The amount of shift is about a half of a track pitch Tp. In the present example, the track pitch Tp is prescribed to be in the range of about 0.3 to about 1.6 μm.

Specifically, the address block 411b is formed so as to be centered around a boundary line 409 between the groove track 403b and the land track 402b (which adjoins the outer periphery of the groove track 403b), the address block 411b thus being on both the groove track 403b and the land track 402b. The address block 801b is formed so as to be centered around a boundary line 407 between the groove track 403b and the land track 402a (which adjoins the inner periphery of the groove track 403b), the address block 801b thus being on both the groove track 403b and the land track 402a. In other words, the two address blocks 411b and 801b are formed so as to be shifted toward the outer periphery and the inner periphery, respectively, from the center 408 of the groove track 403b by about 1/2 Tp. Herein, it is assumed that the groove tracks, land tracks, and the address blocks all have the same width. Moreover, the two address blocks 411b and 801b, which are formed in the same address region 405 on the groove track 403b, for example, contain the same address information. Furthermore, the two address blocks are successively disposed along the track direction (i.e., the circumference direction of the optical disk) so that they will be successively reproduced. Two address blocks are similarly formed in any other address region not shown in the figure.

In accordance with the above configuration, a laser light spot which has moved along the center 408 of the track 403b on the left side of FIG. 2, for example, passes over both address blocks 411b and 801b in the address region 405, and thereafter continues to move along the center 408 of the track 403b on the right side of FIG. 2.

The address regions 405 of the optical disk shown in FIG. 2 are formed in accordance with the CAV or ZCAV (ZCLV) format. Accordingly, the address regions 405 of adjoining tracks are aligned along the radius direction of the disk. As a result, the two address blocks 411b and 801c, which correspond to the adjoining groove tracks 403b and 403c, respectively, are formed in the address region 405 of the land track 402b. Herein, the data region 406 is identified by the first address block 411a or 411b, whose data is first reproduced within the address region.

As a result, when the data in the groove track 403b is reproduced, the information in the two address blocks 411b and 801b in the address region 405, which have the same value, is reproduced. When the data in the land track 402b is reproduced, the information in the two address blocks 411b and 801c in the address region 405, which have different values, is reproduced. Although these tracks share the same address block 411b, it is possible to determine whether the currently reproduced track is a groove track or a land track depending on whether the content of the address block 801b or 801c reproduced after the address block 411b coincides with the content of the address block 411b.

FIG. 2 describes a disk in which the first address block is disposed on the boundary line 409 between the groove track 403b and the land track 402b adjoining the outer periphery of the groove track 403b and the second address block is disposed on the boundary line 407 between the groove track 403b and the land track 402a adjoining the inner periphery of the groove track 403b. However, the same effect can be attained by a disk in which the first address block is disposed on the boundary line 407 between the groove track 403b and the land track 402a adjoining the inner periphery of the groove track 403b and the second address block is disposed on the boundary line 409 between the groove track 403b and the land track 402b adjoining the outer periphery of the groove track 403b.

A case was described in which two address blocks provided for identifying data regions on the groove track contain the same address information, but the same effect can be attained in the case where two address blocks provided for identifying data regions on the land track contain the same address information.

Figure 3:
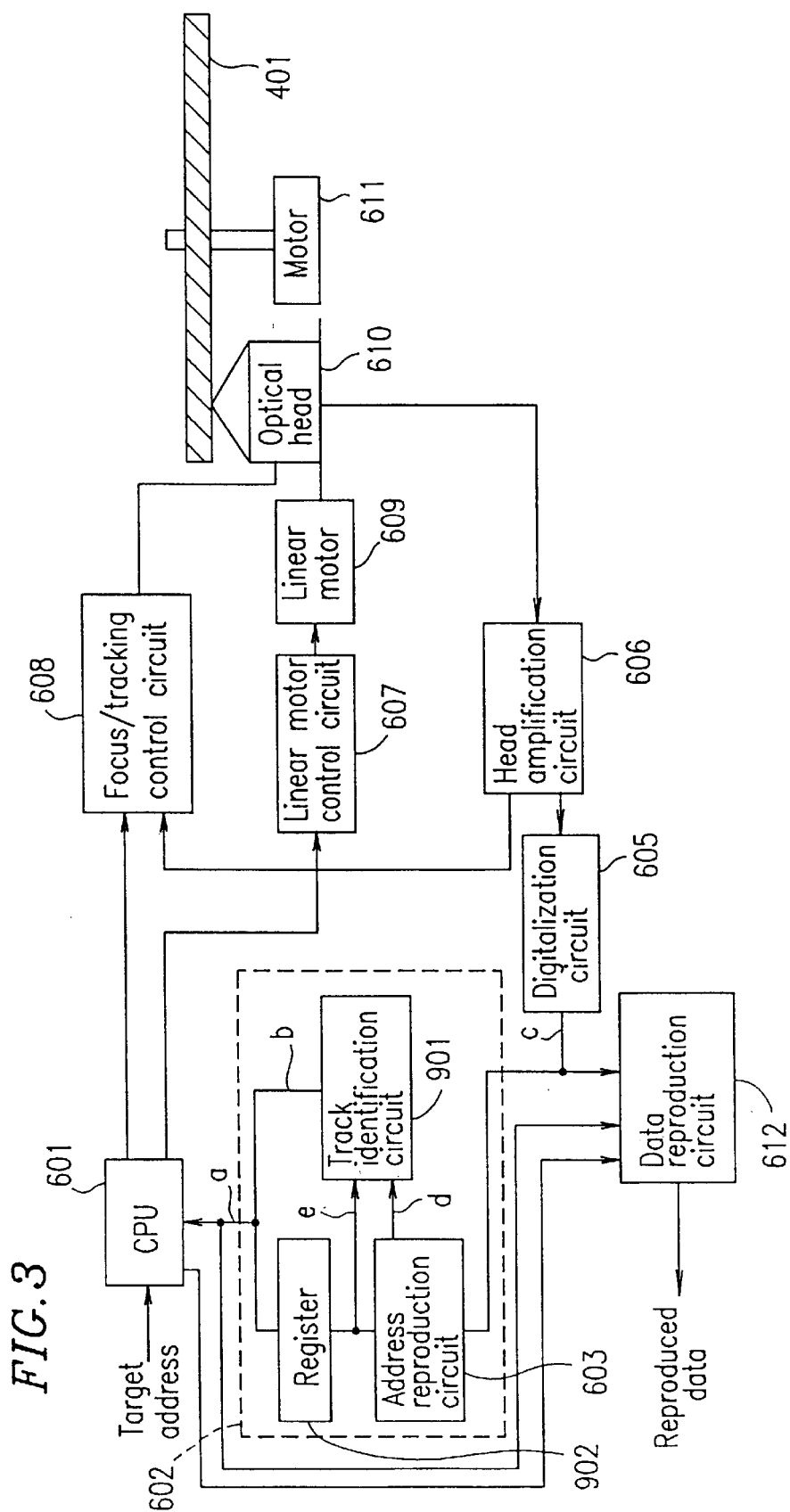
FIG. 3 is a block diagram showing an optical disk recording/reproduction device according to an example of the present invention.

FIG. 3 is a diagram showing an optical disk recording/reproduction device according to the present invention. Although the descriptions in the present specification will be centered around the reproduction of information recorded on an optical disk, it will be appreciated that the present invention is applicable to the recording of information on an optical disk. For conciseness, the "optical disk recording/reproduction device" in the present specification is defined to include not only a recording/reproduction device having a recording function but also a reproduction only device and a recording only device. In other words, the term "optical disk recording/reproduction device" will be employed so as to encompass both an "optical disk recording/reproduction device" by the narrow sense of the word and an "optical disk recording device" and an "optical disk reproduction device" by the narrow sense of the word.

The optical disk recording/reproduction device of the present example is suitable for recording or reproducing information on the optical disk 401 shown in FIG. 2. In the following description, a CPU 601 will be described as the track designation means; an address reproduction circuit 603 will be described as an address reproduction means; and a track identification circuit 901 will be described as a track identification means.

In FIG. 3, the optical disk 401 is attached to a motor 611, whereby it is rotated. An optical head 610 converges laser light on an information recording face of the optical disk 401. A head amplification circuit 606 converts the intensity of light reflected from the information recording side of the optical disk 401 into a voltage, which is amplified to become a signal at a predetermined level. A digitalization circuit 605 converts a reproduced analog signal into a digital signal. A linear motor 609 is provided for moving the optical head 610 to a target track. The operation of the linear motor 609 is controlled by a liner motor control circuit 607. A data reproduction circuit 612 demodulates the signal digitalized by the digitalization circuit 605 in synchronization with a clock, and transfers the obtained data. An ID reproduction circuit 602 is composed of: an address reproduction circuit 603 for reproducing an address (address information) from the signal digitalized by the digitalization circuit 605; the track identification circuit 901 for identifying the land track 402 from the groove track 403 (or vice versa); and a register 902 which is provided for combining a first address reproduced by the address reproduction circuit 603 and a track identification signal b obtained from the track identification circuit 901 into one address a. A focus/tracking control circuit 608 performs focusing control for maintaining the focus of the laser light on the information recording face and tracking control for maintaining the focus of the laser light in the center of a track of the disk. In order to access a target track, the CPU 601 moves the optical head 610 to the vicinity of the target track by means of the linear motor control circuit 607, further moves the optical head 610 onto the target track by means of the focus/tracking control circuit 608 through a track jump, and selects either a land track or a groove track by designating the tracking polarity.

Figure 4:
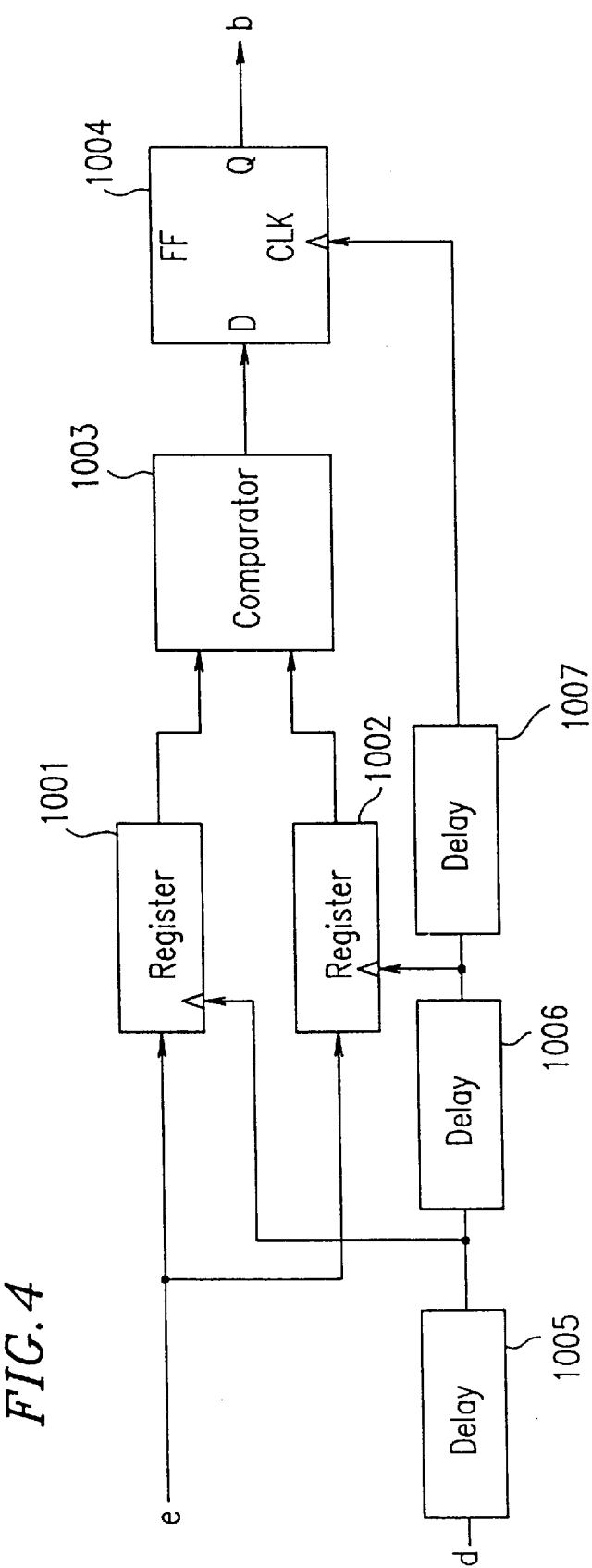
FIG. 4 is a configuration diagram showing a track identification circuit employed in the optical disk recording/reproduction device according to the present invention.

FIG. 4 is a diagram showing the configuration of the track identification circuit 901 for generating a track identification signal b based on two addresses e reproduced from the optical disk 401 shown in FIG. 2. Reference numeral 1001 denotes a register for retaining a first address; 1002 denotes a register for retaining a second address; 1003 denotes a comparator for comparing the two addresses; and 1004 denotes a flip-flop for retaining the comparison result.

Hereinafter, an address reproduction operation by the optical disk recording/reproduction device shown in FIG. 3 will be described with reference to FIGS. 3 and 4.

When receiving the logical address of a track in which data is desired to be recorded or reproduced (hereinafter referred to as the "target track"), the CPU 601 issues a seek command to the linear motor control circuit 607, and drives the linear motor 609 so as to move the optical head 610 to the vicinity of the target track. Next, the CPU 601 issues a track jump command or a track selection command, which is in accordance with whether the track is a land track or a groove track to the focus/tracking control circuit 608, whereby the optical head 610 arrives at the target track. The focus/tracking control circuit 608 selects the tracking control polarity and jumps the optical head 610 by half a track when receiving a track selection command, so that focusing and tracking to the target track are attained.

Reflected light from the optical disk 401 is converted into currents by a plurality of optical detectors in the optical head 610, and are converted into voltages corresponding to the respective optical detectors by the head amplification circuit 606. The reproduced signals are subjected to various calculations depending on the purpose for which they are used, whereby a reproduction signal indicating information, a tracking error signal, and a focusing error signal are generated. The tracking error signal and the focusing error signal are supplied to the focusing/tracking control circuit 608 so as to be employed for the focusing and tracking of the optical head 610. The reproduced signal indicating information is digitalized by the digitalization circuit 605.

In accordance with this optical disk recording/ reproduction device, a logical address for identifying a data region is composed of: the address block 411 (reproduced by the address reproduction circuit 603) common to the land track 402 and the groove track 403; and the track identification signal b (composed of 1 bit) for identifying the land track 402 from the groove track 403, in which the most significant bit is a value obtained from the track identification signal b and the other addresses are addresses obtained from the address region.

The track identification circuit 901 is composed of the two registers 1001 and 1002, the comparator 1003, the flip-flop 1004, delay elements 1005, 1006, and 1007. The track identification circuit 901 takes the two addresses e into the registers 1001 and 1002 in accordance with gate pulse signals obtained by delaying the address detection signal d by predetermined time periods. The two addresses e are compared by the comparator 1003. Specifically, the address detection signal d is delayed by predetermined time periods by the three delay elements 1005, 1006, and 1007 so as to give gate pulse signals for the registers 1001 and 1002 and the flip-flop 1004. In accordance with the above-described circuit, the track identification signal b is generated so as to indicate a groove track when the two address blocks 411 and 801 coincide with each other, and a land track when the two addresses are different.

The register 902 in FIG. 3 retains the first address reproduced by the address reproduction circuit 603. By combining the first address and the most significant bit of the address of the data (obtained from the track identification signal b), the address a for identifying the data region is obtained.

The data reproduction circuit 612 compares the address a reproduced in the ID reproduction circuit 602 and the address supplied from the CPU 601, and, if the addresses match, reproduces data after a predetermined period of time from the reproduction of the address.

Finally, if the reproduced address a is determined to be different from the address supplied from the CPU 601, the target track is sought again. Herein, if only the most significant bit of these addresses are different, a half-track jump is made, and the track selection signal, which selects the tracking polarity, is inverted. In the above-described example, the case where only the most significant bits of the addresses are different corresponds to a case in which the addresses common to the land track and the groove track match but either a land track or a groove track is wrongly selected. In order to correct this situation, the tracking selection signal is inverted, so that the tracking polarity is switched.

When reproducing the data in a groove track of the optical disk 401, the laser light scans approximately the center 408 of that groove track, and the information in two address blocks within one address region that have the same value (e.g., 411b and 801b) is reproduced. On the other hand, when reproducing the data in a land groove, the laser light scans approximately the center 410 of that land track, and the information in two address blocks having different values (e.g., 411*b* and 801*c*) within one address region is reproduced. Thus, information in different pairs of addresses is reproduced depending on whether a currently reproduced track is a land track or a groove track. As a result, it becomes possible to identify the currently reproduced track to be either the land track 402 or the groove track 403 based on the reproduced signal only. Therefore, irrespective of the correspondence between groove configurations (i.e., groove track or land track) and tracking polarities, recording or reproduction can be performed for a desired track by only using the reproduced signal.

In accordance with the above-described optical disk recording/reproduction device, the tracking polarity can be automatically switched based only on the reproduced signal, utilizing differences in two addresses. Therefore, it is possible to perform one, common type of tracking regardless of the kind of disk and the characteristics of the optical disk recording/reproduction device. As a result, compatibility among optical disks in which information is recorded on both land tracks and groove tracks can be improved.

(EXAMPLE 2)

Figure 5:
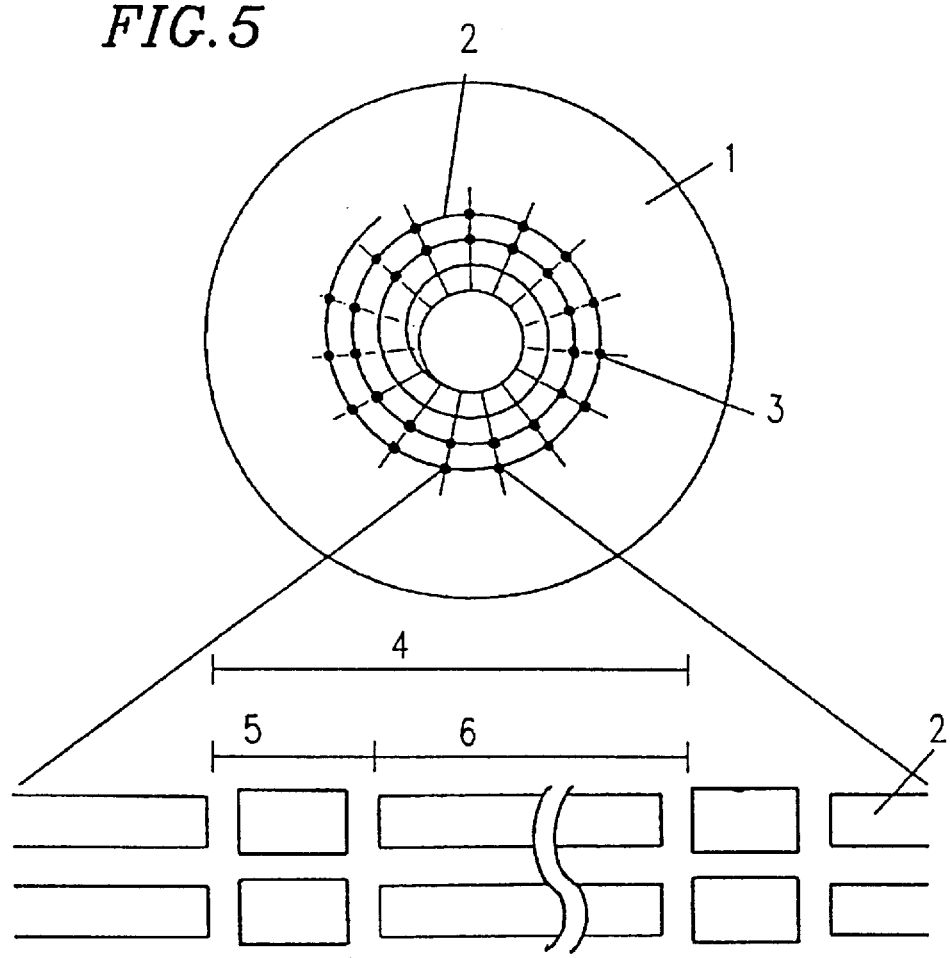
FIG. 5 is a schematic view showing an optical disk according to Example 2 of the present invention.

FIG. 5 shows an optical disk according to Example 2 of the present invention.

In accordance with a predetermined physical format, a plurality of sectors 4 are successively disposed on a disk 1 along a track 2. Each sector 4 is composed of a sector address region 5 indicating the position of that sector on the disk and a data region 6 for actually recording data.

Figure 6:
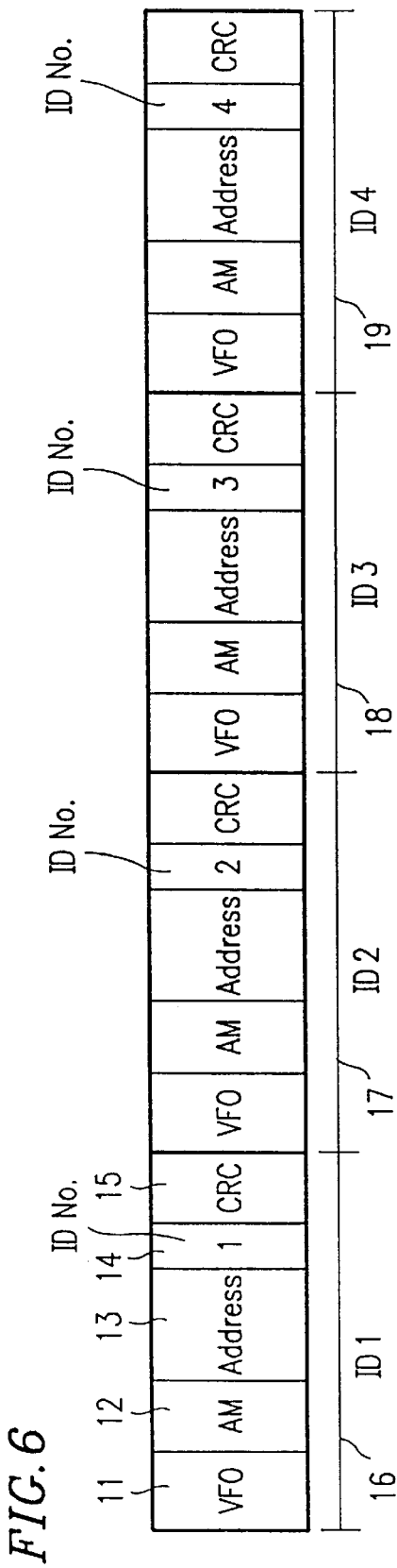
FIG. 6 is a diagram describing the format of sector addresses in an optical disk according to Example 2 of the present invention.

FIG. 6 shows a logical format of a sector address adopted by the optical disk 1 of the present example. In the optical disk 1 of the present example, four address blocks 16 to 19 are provided within one sector address. In FIG. 6, the address blocks 16 to 19 are indicated as ID1 to ID4, respectively. Each address block includes a VFO 11, an AM (Address Mark) 12, an address number 13 of the sector, an overlapping sequential number (ID number) 14, and a CRC (Cyclic Redundancy Check) 15.

The VFO 11 is a reproduction clock synchronization signal portion, which has a continuous repetition data pattern for enabling an address signal to be securely reproduced from the address region in spite of possible fluctuation in the rotation speed of the disk. The recording/reproduction device locks a PLL (Phase Locked Loop) to this repetition data pattern so as to generate a clock for reading data. The AM 12 is composed of a specific code pattern for indicating the start point of the address data. The address number 13 is a data pattern indicating the position of the sector on the disk. The ID number 14 indicates the location order of each address block in the relevant address region; this number may also be referred to as "repetition number". The CRC is an error detection code which is generated from the address number and the ID number. The error detection code can be any code other than CRC, e.g., Reed Solomon's code, as long as reading errors of the address number and the ID number can be detected. Each address block can contain additional information as well as the information shown in FIG. 6.

Figure 7A:
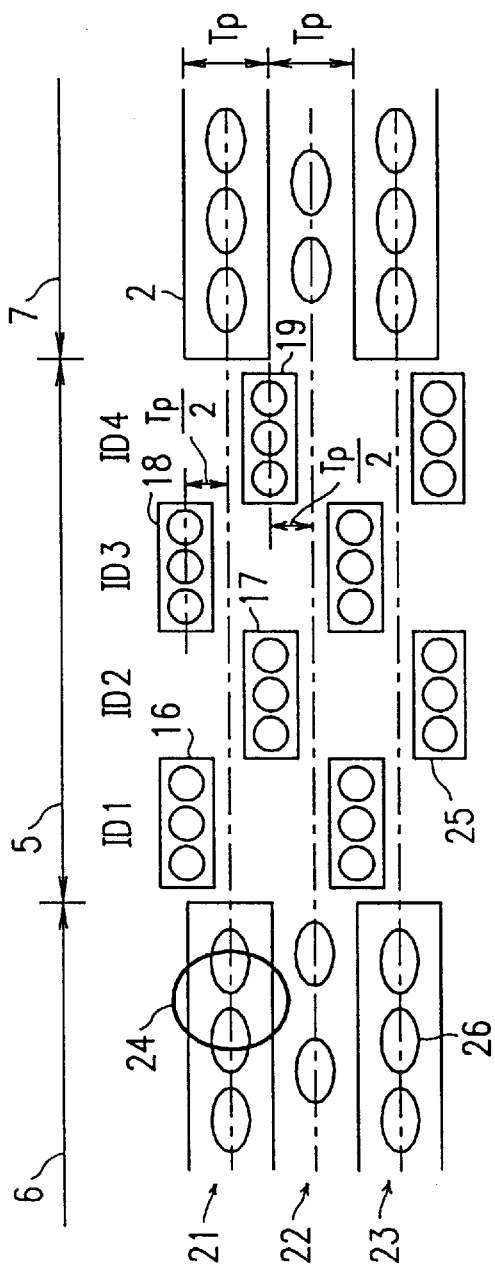
FIG. 7A is a diagram showing the configuration of sector address regions.

FIG. 7A is a diagram showing the location of address blocks within a sector address region of the optical disk of the present example. While two address blocks were provided in each address region in the previous example, there are four address blocks provided in each address region according to the present example. However, the number of address blocks to be provided in each address region is not limited to four.

FIG. 7A shows a land track 22 and groove tracks 21 and 23 adjoining the land track 22. Four address blocks ID1 to ID4 are disposed in the a sector address region 5 (provided between data regions 6 and 7) so as to alternately wobble with respect to the center of the track. Specifically, in the case where the track width (or the track pitch) of one track is Tp whether it is a land track or a groove track, the address blocks ID1 to ID4 are shifted by Tp/2 from the center of the track along the radius direction so as to be disposed alternately on the inner periphery side and the outer periphery side. Address pits 25 are formed in each of the address blocks ID1 to ID4. Recording marks 26 are formed in the data regions 6 and 7.

According to the present example, the width of the address pits 25 (i.e., size along the direction of the disk radius) is in the range of 0.1 to 0.6 $\mu$m. The recording marks 26 according to the present example are formed on a recording film.

The address pits 25 are usually formed when forming the groove tracks 21 and 23. In the case where the groove tracks and the address pits are formed by a laser cutting method, the laser light spot for cutting is moved toward right in FIG. 7A as it forms the data region 6 of the groove track 21. Thereafter, the laser light spot is moved toward right in FIG. 7A as it forms the address blocks 16, 17, 18, and 19 in the sector address region 5 in this order. Specifically, in the data region 6, laser light is continuously emitted so that a groove track of a predetermined width is formed, and laser light is intermittently emitted in accordance with the desired address pits in the sector address region 5 so as to be shifted by Tp/2 along the radius direction. Although the address blocks ID1 and ID3 are disposed so as to be shifted upward with respect to the address blocks ID2 to ID4 in the figure, it is also applicable to dispose the address blocks ID1 and ID3 so as to be shifted downward with respect to the address blocks ID2 to ID4 in the figure.

Figure 7B:
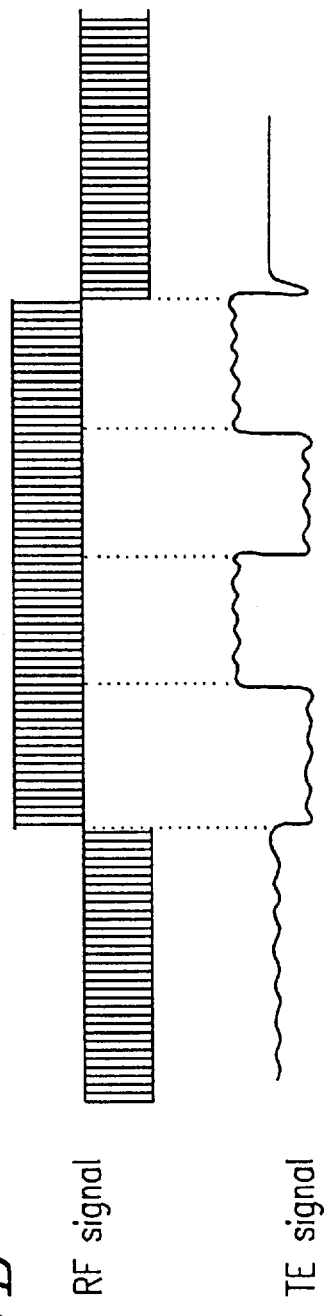
FIG. 7B is a diagram describing a RF signal and a TE signal in a sector address region.

FIG. 7B shows the respective waveforms of a reproduced signal (RF signal) and a tracking error signal (TE signal) when the light spot 24 scans the sector address region 5. In general, the amplitude of the RF signal takes a value which is substantially in proportion with the area which the light spot 24 occupies in the address pit 25. Therefore, when the light spot 24 is at the center of the track, the light spot 24 illuminates the same area of the address block ID1 or ID3 and the address block ID2 or ID4 although in different directions with respect to the address pits 25. Thus, the RF signal has substantially the same amplitude, as shown in FIG. 7A.

In the data regions 6 and 7, which are composed of grooves, the TE signal takes values which are in proportion with the amount of offset between the light spot 24 and the track groove. Similarly, in the sector address region 5 composed of pits, the TE signal takes values which are in proportion with the amount of offset between the light spot 24 and the address pits 25 (although the output level of the TE signal is different, for the same offset amount, between the groove portions and the pit portions). Accordingly, the resultant TE signal has different polarities depending on the location of the address block as shown in FIG. 7B.

FIGS. 8A and 8B show the states of the RF signal in a sector address region when the light spot is in off-track states. FIG. 8A shows the RF signal in the sector address region 5 in the case where the light spot 24 is shifted toward the inner periphery of the track. FIG. 8B shows the RF signal in the sector address region 5 in the case where the light spot 24 is shifted toward the outer periphery of the track. In FIG. 8A, the RF signal has a large amplification in the address blocks ID1 and ID3 since the light spot 24 passes near the address blocks 16 (i.e., ID1) and 18 (i.e., ID3), and the RF signal has a small amplification in the address blocks ID2 and ID4 since the light spot 24 passes at a distance from the address blocks 17 (i.e., ID2) and 19 (i.e., ID4). Therefore, the address signal becomes difficult to read in ID2 and ID4. However, at least one but only one address block is required to be properly read in one sector address. In the example shown in FIG. 8A, the RF signal amplitude is large in ID1 and ID3, thereby making it easy to read the address, so that the reading for the sector address as a whole is satisfactory.

Similarly in FIG. 8B, the RF signal amplitude is small in ID1 and ID3, thereby making it difficult to read the address, but the RF signal amplitude is conversely large in ID2 and ID4, thereby making it easy to read the address. In other words, the address readability in the sector addresses does not decrease irrespective of whether the light spot becomes off-track toward the inner periphery side or the outer periphery side from the track center.

As will be appreciated, the same address readability is attained for both the land tracks and the groove tracks.

Furthermore, as in FIG. 7B, the level of the TE signal alternately shifts, i.e., to be positive or negative, for every address block. However, by wobbling the address blocks, the frequency of level shifts increases. Specifically, the frequency of level shifts of the TE signal is 20 kHz or more, which is considerably higher than the control band in which the light spot can follow the target track, in view of the time (10 μsec or less) period usually required for passing through a sector address region. Therefore, the light spot will never respond to such level shifts of the TE signal. Moreover, since the mean value of level shifts is substantially zero, offsets of the light spot due to a DC component are unlikely to occur. As a result, the sector address regions have little influence on the tracking control section, and the disturbance in the tracking control immediately after passing through a sector address region can be reduced.

Although the present example described a case where 4 address blocks are provided for 1 sector address, similar effects of improving the address readability against off-tracking can be provided in the case where the number of address blocks is two or more.

In the case where an even number of address blocks are disposed equally on the inner periphery side and the outer periphery side, there is provided an effect of preventing disturbance in the tracking control after passing through an address region. In the case where an odd number of address blocks are provided, a DC component due to the level shifts of the TE signal is generated, but it has substantially no influence because it has a higher frequency than the tracking control band. It is desirable to provide an even number of address blocks equally on the inner periphery side and the outer periphery side in terms of both address readability and tracking control stability.

(EXAMPLE 3)

Next, an optical disk according to Example 3 of the present invention will be described.

FIGS. 9A and 9B show the location of information blocks in sector address regions according to the present example. The optical disk of the present example has the same configuration as that shown in FIG. 7A except that it includes additional information blocks 107, 108, and 109 containing additional information (which is not address number information). Reference numerals #100 and #101 denote track address numbers.

The address blocks 16 to 19 each contain address information for identifying an address number from an ID number. It is preferable to dispose the additional information blocks 107 to 109 so as to be shifted by a width of about Tp/2 from the center of the track along the radius direction, as in the case of address blocks 16 to 19. In the case where the additional information blocks are shorter in length than the address blocks, or where it is impossible to divide the additional information into two, the additional information block 107 is disposed either on the inner periphery side or the outer periphery side. On the contrary, in the case where the additional information block is relatively long, the additional information can be divided into identifiable block units 108 and 109 as shown in FIG. 9B, which are disposed so as to be alternately shifted on the inner periphery side and the outer periphery side.

By adopting the above-mentioned configuration, it is possible to improve address information and additional information readability against off-tracking, and stability of tracking control during and after passing through a sector address region even in the case where additional information is added to the sector address region, as in the previous examples.

Although additional information is disposed at the end (i.e., right side in the figure) of each sector address region according to the present example, it can also be disposed in another position.

(EXAMPLE 4)

Next, an optical disk according to Example 4 of the present invention will be described.

FIGS. 10A and 10B show the location of address blocks in sector address regions according to the present example. In FIGS. 10A and 10B, 110 and 112 denote groove tracks; 111 denotes a land track; 113, 114, 115, 116, 117, 118, 119, and 120 denote address blocks; and 24 denotes a light spot.

First, a method for forming tracks and address pits will be described. Tracks and pits are formed by radiating cutting laser light onto a rotating master disk. A continuous groove is obtained when the laser light is continuously radiated, which becomes a track (i.e., groove track in the present example). Pits are formed by discontinuously radiating the laser light by turning it on and off at a predetermined interval. In other words, in the case of a disk having sector addresses, tracks and address pits are formed in each round of the disk by controlling the radiation of the cutting laser light in the groove portions and the address pit portions while moving the cutting laser light along the radius direction by a track pitch for every turn of the master disk.

Tracks and address pits are formed by a similar method in order to realize the wobbled address pits according to the present invention. However, the address pits are disposed so as to be either on the inner periphery side or the outer periphery side of the track, so that the cutting laser light must be turned on and off while shifting the center of the cutting laser light by Tp/2 for each address block. Alternatively, the track grooves and address pits can be formed by employing a set of three laser light beams (i.e., laser light for forming track grooves, laser light for forming address pits on the inner periphery side, and laser light for forming the address pits on the outer periphery side), each laser light being turned on and off in predetermined positions.

In FIGS. 10A and 10B, the groove track 110 (on the left side of the figure) and the address blocks 113, 114, 115, and 116 are first formed in this order. Then, after the master disk has made one complete turn, the groove track 112 and the address blocks 117, 118, 119, and 120 are formed in this order. Since the rotation accuracy and the like of the master disk have some fluctuation, the positions of address blocks including the same ID number (e.g., address blocks 113 and 117) do not necessary coincide along the circumference direction. If their positions are at an offset of ΔX as shown in FIG. 10A, there is a possibility that the reproduced (RF) signal may not be accurately detected when reproducing data in the land track 111 because the end of the address block 117 and the beginning of the address block 114 overlap with each other by ΔX. Therefore, by disposing the address blocks so as to be at an interval of Xm with one another along the circumference direction, the interval Xm being equal to or greater than the disk rotation accuracy during cutting, the overlapping of adjoining address blocks can be prevented, thereby ensuring the reproducibility of an address signal.

The interval Xm equal to or greater than the disk rotation accuracy during cutting is set to be a value in the range of 0 to 1.0 μm, for example. The interval Xm can be varied in accordance with the distance from the center of the disk.

(EXAMPLE 5)

Next, an optical disk according to Example 5 of the present invention will be described.

Figure 11:
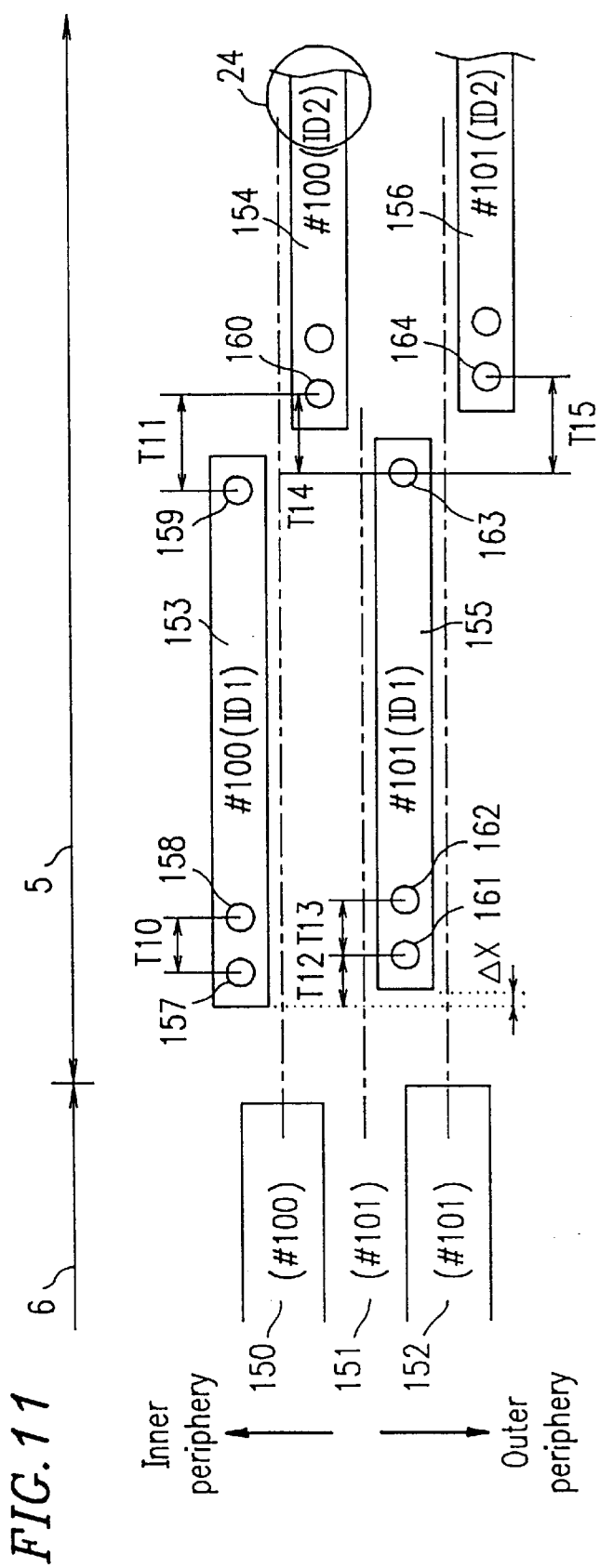
FIG. 11 is a diagram showing the location of address blocks in an optical disk according to still another example of the present invention.

FIG. 11 shows the location of address blocks in sector address regions of an optical disk according to the present example. In FIGS. 11, 150 and 152 denote groove tracks; 151 denotes a land track; 153, 154, 155, and 156 denote address blocks; and 157 to 164 denote address pits constituting the address blocks. When performing a cutting, the grooves and address pits are reproducing the data in the land track 151 can be reduced.

(EXAMPLE 6)

Next, an optical disk according to Example 6 of the present invention will be described.

Figure 12:
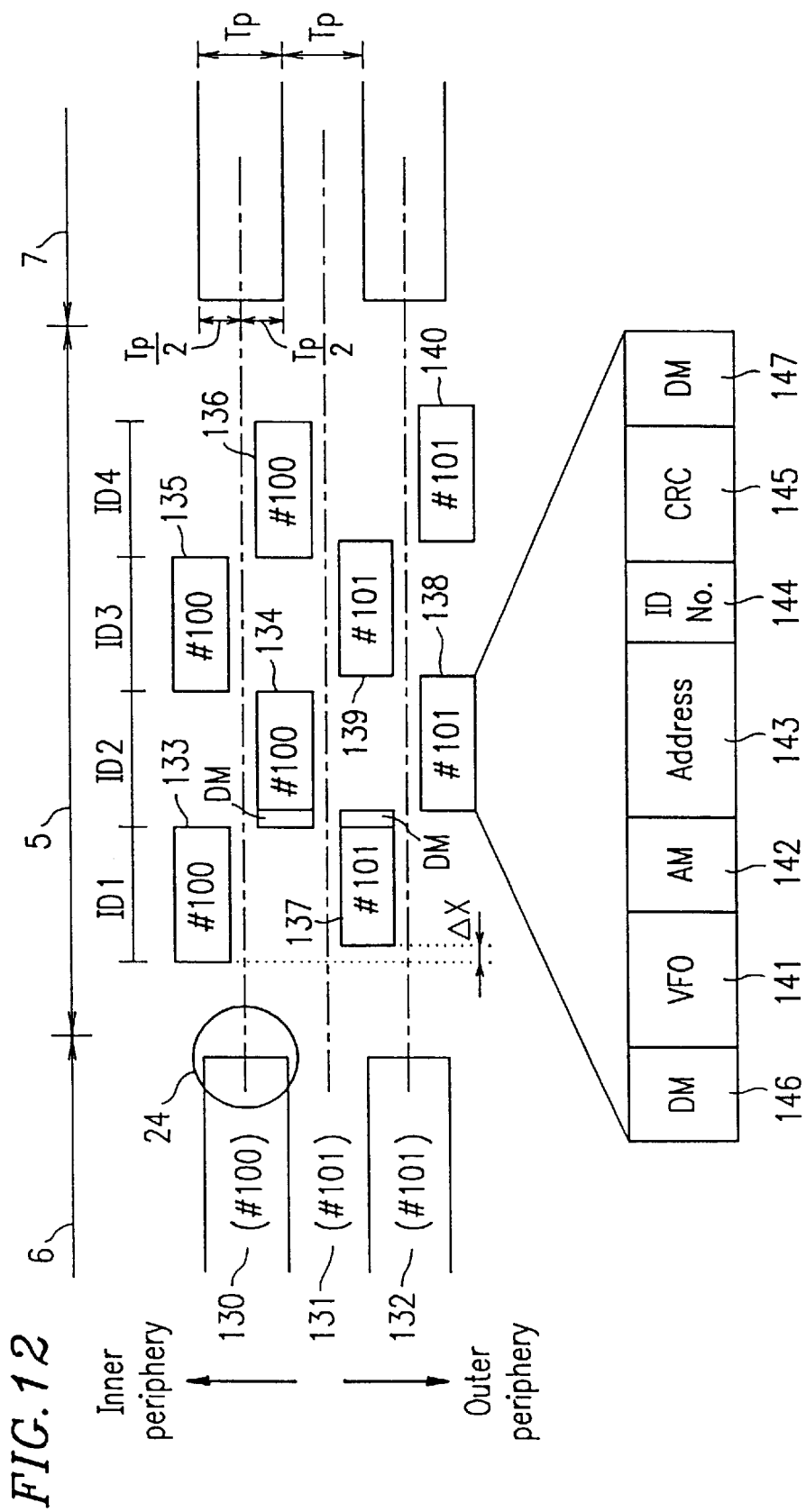
FIG. 12 is a diagram showing the location of address blocks in an optical disk according to still another example of the present invention.

FIG. 12 shows the location of address blocks in sector address regions in an optical disk according to the present example. In FIG. 12, 130 and 132 denote groove tracks; 131 denotes a land track; 133, 134, 135, 136, 137, 138, 139, and 140 denote address blocks; 24 denotes a light spot; 141 denotes a VFO; 142 denotes an AM; 143 denotes an address number; 144 denotes an ID number; 145 denotes a CRC; and 146 and 147 denote dummy data regions.

In the present example, as shown in FIG. 12, dummy data regions 146 and 147 are disposed at the beginning and the end of each address block, the dummy data regions 146 and 147 containing data which has nothing to do with the identification of address signals. Herein, the VFO 141, the AM 142, the address number 143, the ID number 144, and the CRC 145 are the same as those described in Example 2. By providing the dummy data regions 146 and 147, the beginning of an address block is prevented from overlapping with the end of its previous address block even when a locational fluctuation occurs for the address blocks along the circumference direction.

The pit pattern of the dummy data can be arbitrary selected. For example, by ensuring that the dummy data has the same pit pattern as the VFO 141 in the successively formed. In the groove track 150, the pits of the address blocks 153 and 154 are formed in synchronization with a standard clock for cutting, so that the interval between address pits in the address blocks 153 and 154 along the time axis when reproducing data from the groove track 150 will be a multiple of an information reading clock period Tw (e.g., about 5 to 100 ns). In other words, not only a pit interval T10 within the same address block but also a pit interval T11 between different address blocks will become a multiple of Tw in theory.

However, in practice, the position of the address block for the next groove track 152 is purposely shifted along the circumference direction in order to prevent the overlapping of address blocks due to rotation fluctuation during the cutting, as described in Example 4. Even in this case, if ΔX is set at an arbitrary value, a time interval T14 from the pit 163 of the address block 155 to the pit 160 of the address block 154 may not be a multiple of Tw.

When the time interval T14 is not a multiple of Tw, some time is required for readjusting the phase of the data reading clock in the PLL at the VFO located in the beginning of the address block 154.

In order to solve such a problem, the address pits can be disposed with their phases matched so that the time interval T12 of the offset ΔX approximately becomes a multiple of Tw. Thus, T14 also approximately becomes a multiple of Tw, whereby the time required for the PLL synchronization in the address block 154 when beginning of each address information region, the VFO region will appear to be longer, thereby providing an advantage of ensuring the generation of the data reading clock. The length of each of the dummy data regions 146 and 147 can be any value as long as the dummy data region does not overlap with a region which is actually required for the identification of the address signal.

It is also applicable to dispose a dummy data region only in the end of each address block.

(EXAMPLE 7)

Next, an example of an optical disk recording/reproduction device according to the present invention will be described.

Figure 13:
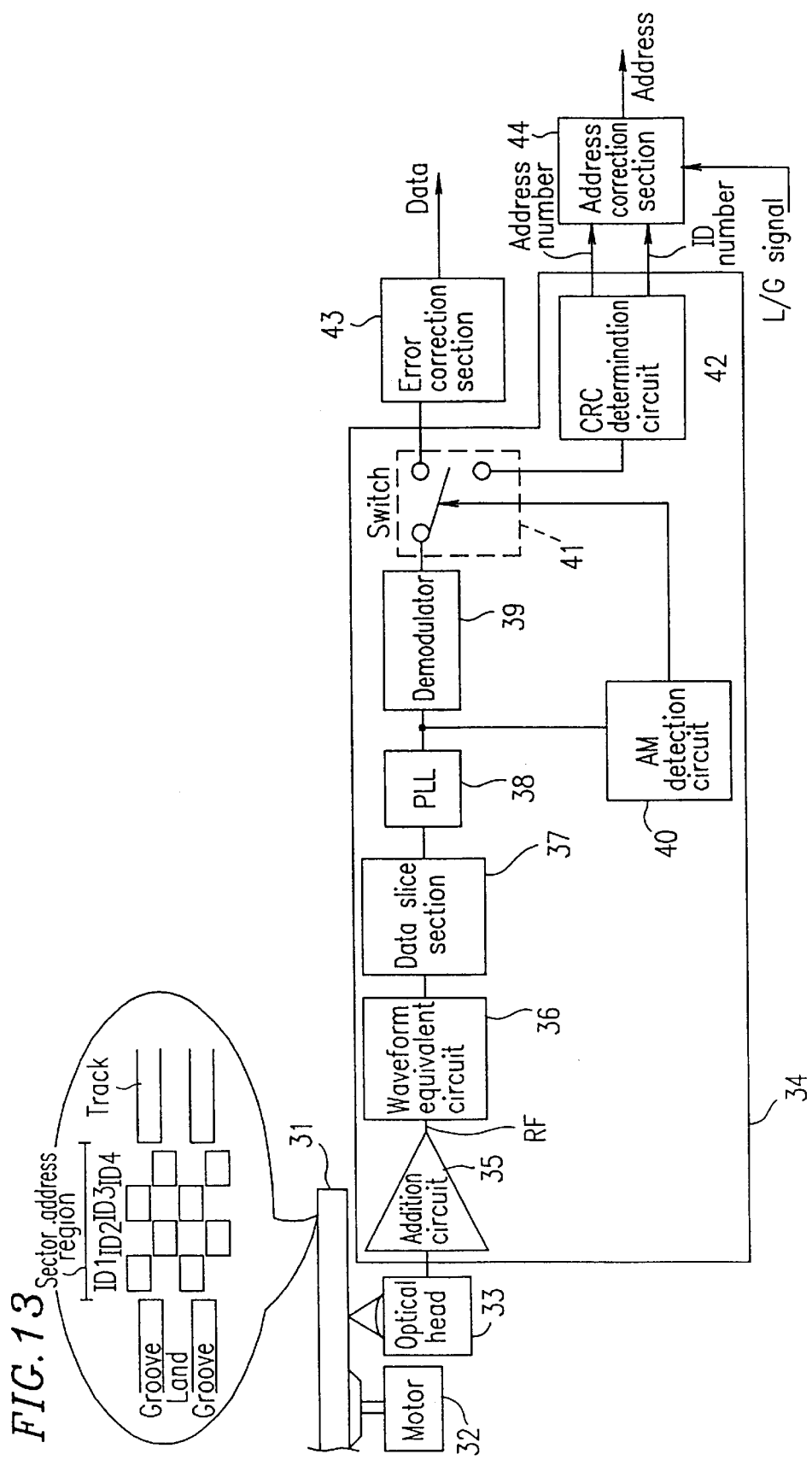
FIG. 13 is a block diagram showing an optical disk recording/reproduction device according to an example of the present invention.

FIG. 13 is a block diagram showing an optical disk recording/reproduction device capable of reading, sector addresses in the optical disk shown in FIG. 7A. In FIG. 13, 31 denotes a disk; 32 denotes a disk motor; 33 denotes an optical head; 34 denotes an address reproduction section composed of an addition circuit 35, a waveform equivalent section 36, a data slice section 37, a PLL 38, a demodulator 39, an AM detection section 40, a switcher 41, and a CRC determination section 42; 43 denotes an error correction section; and 44 denotes an address correction section.

Figure 14:
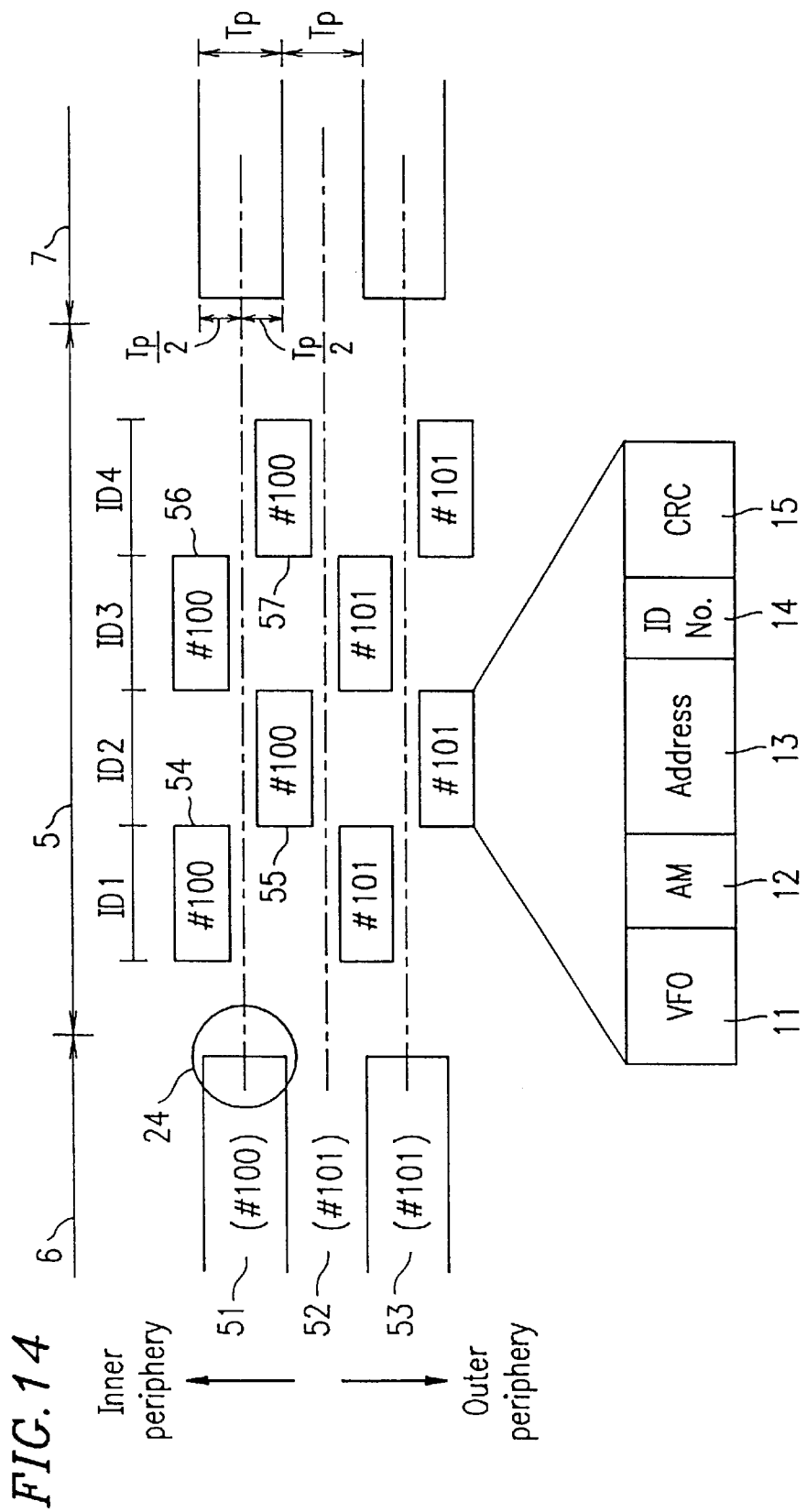
FIG. 14 is a diagram showing the location of address blocks in an optical disk according to still another example of the present invention.

FIG. 14 shows the configuration of sector addresses of an optical disk for which recording/reproduction of information with the present optical disk recording/reproduction device is performed. The optical disk has the same configuration as that of the optical disk shown in FIG. 7A. In FIG. 14, a land track 52 and groove tracks 51 and 53 interposing the land track 52 are illustrated. In a sector address region 5 provided between the data regions 6 and 7, address blocks 54 to 57 are disposed so as to wobble with respect to the track center. In this example, it is assumed that the track number increases by 1 for every complete round of the track; a groove track 51 has an address #100; a land track 52 has an address #101; and a groove track 53 has an address #101. The values (e.g., #100) in each address block represents a value (address) set in the address number 13 in that address block.

An operation of reading a signal from the sector address region 5 shown in FIG. 14 by using the optical disk recording/reproduction device shown in FIG. 13 will be described.

First, the optical head 33 radiates laser light onto the optical disk 31, whereby the intensity of the light reflected from the optical disk 31 is detected. A reproduced signal (RF signal) is generated based on the amount of reflected light. The same operation of extracting an address number and an ID number from an RF signal for each address block as described in the description of conventional techniques is performed by means of the waveform equivalent section 36, the data slice section 37, the PLL 38, the demodulator 39, the AM detection section 40, the switcher 41, and the CRC determination section 42.

When the light spot 24 reproduces data in the groove track 51, the address signals obtained in the sector address regions are, respectively, (#100, 1), (#100, 2), (#100, 3), (#100, 4), where (address number, ID number). These values are input to the address correction section 44. The address correction section 44 detects an address based on an input address number and an input ID number.

Figure 15:
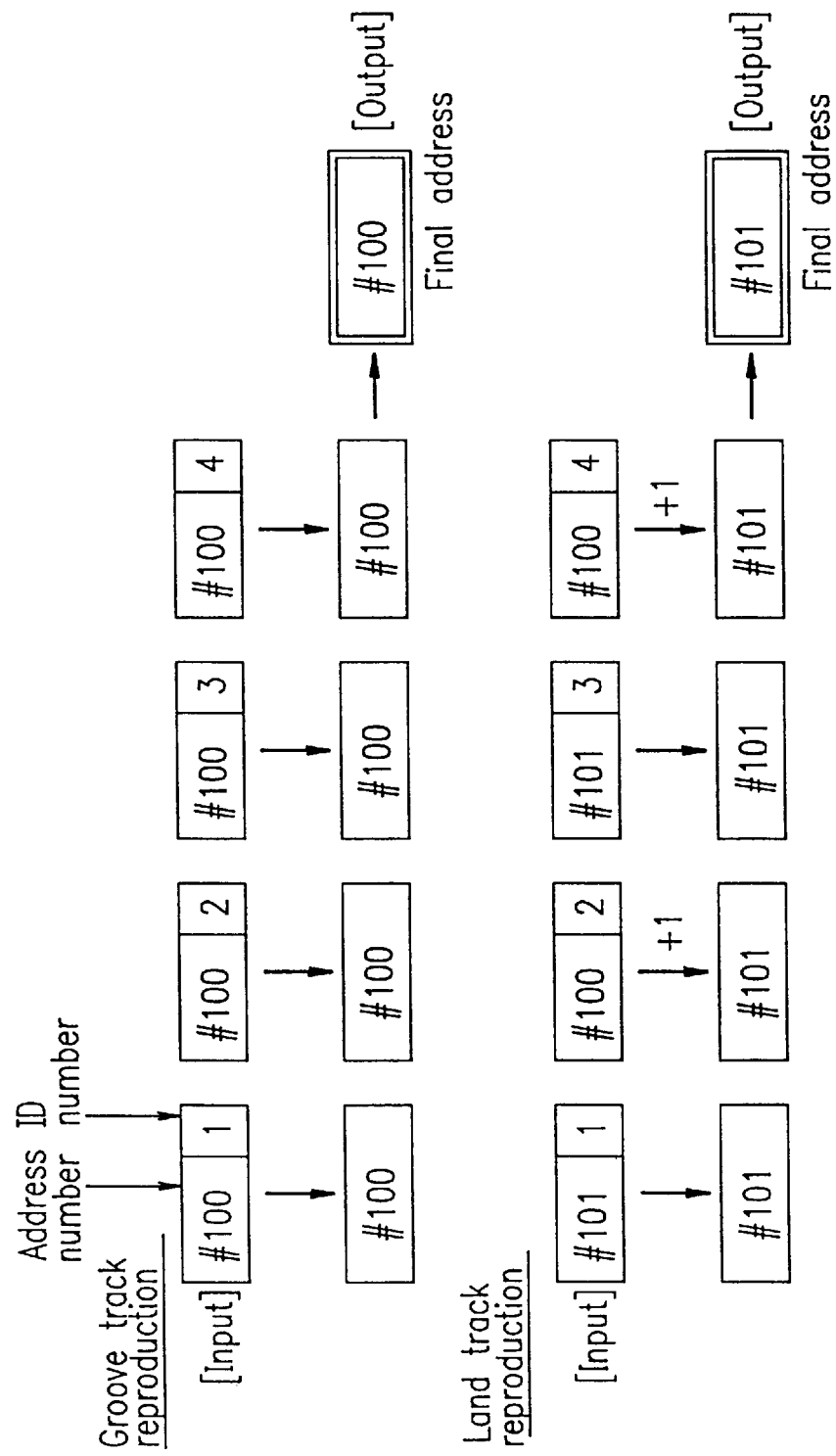
FIG. 15 is a diagram describing the operation of an address correction section.

FIG. 15 shows sets of signals input to the address correction section 44 when reproducing data in a groove track and when reproducing data in a land track. The address blocks 54, 55, 56, and 57, which include the same address number, are disposed so as to wobble on the inner periphery side and the outer periphery side with respect to the center the groove track 51. Therefore, the address numbers of ID1 to ID4, obtained when reproducing the data in the groove track 51, all take the same value (i.e., #100 in this example). Accordingly, the read-out address number #100 can be output intact from the address correction section 44 as a final address value.

On the other hand, when the light spot 24 reproduces data in the land track 52, the address signals obtained in the sector address regions are, (#101, 1), (#100, 2), (#101, 3), (#100, 4), which are input to the address correction section 44 in this order. Since it is known from the location pattern of address blocks shown in FIG. 14 that the address number indicated in ID1 and ID3 is smaller by 1 than the actual address number, the address correction section 44 adds 1 to the address number #101 read from ID2 and ID4 to obtain an address number #101. Since the address number #101 read from ID1 and ID3 coincides with the actual address value, it is used intact as the address number. Thus, a final address value #101 is output. By inputting a signal (L/G signal) which indicates whether data in a groove track is being reproduced or data in a land track is being reproduced to the address correction section 44, the above-mentioned address correction can be achieved.

Thus, in accordance with the optical disk recording/reproduction device of the present example, the address correction section 44 is provided which is capable of correcting a read-out address number (e.g., #100) based on an ID number which is read out substantially simultaneously (e.g., 2) provided that it is previously known whether data in a groove track is being reproduced or data in a land track is being reproduced so as to derive a correct sector address value (e.g., #101). As a result, it becomes possible to manage the sector addresses of an optical disk located as in FIGS. 7A, 7B, and 14.

In this example, the address numbers of the land track and the groove track are the address number indicated in ID1. Since substantially all of the four addresses ID1 to ID4 are properly read when reading sector addresses, it is preferable to, if the value of ID1 was properly obtained, use that value as the track address. In other words, it is more practical to set the track address of the land track 52 to be #101 because this will eliminate the need of correcting an address number read out from ID1, although it is also applicable to set the track address of the land track 52 to be #100. Another advantage of equal readability regardless of land tracks or groove tracks will be provided by ID1 indicating the track address number itself in the case where the VFO of ID1 is prescribed to be longer than those of other address blocks so as to enhance the readability of ID1.

In the above example, a case was described in which one sector is provided for one track. However, in the case of a disk of a format such that a number N of sectors are included in one track, the sector number consecutively increasing, address #100 will be adjoined by address (#100+N). Accordingly, the address correction section outputs a corrected value by adding N to a read-out address value when reproducing data in a land track. Thus, it becomes possible to derive address values for both land tracks and groove tracks in the same manner described above.

Furthermore, in the case where a number N of sectors are included in one track such that the address number takes discontinuous values, it is possible to calculate a corrected value in accordance with the specific format of the sector addresses based on the address number and the sector number which are read from each address block.

Furthermore, although a case was described in which the same address number is read out when reproducing data in a groove track, it is also applicable to configure the optical disk so that the same address number is read out when reproducing data in a land track.

Although the same address number was disposed on the inner periphery side and the outer periphery side of one track, it is also possible to correct a read-out address number based on an ID number if the location pattern of ID numbers and address blocks is known.

(EXAMPLE 8)

Next, another example of an optical disk recording/reproduction device according to the present invention will be described.

Figure 16:
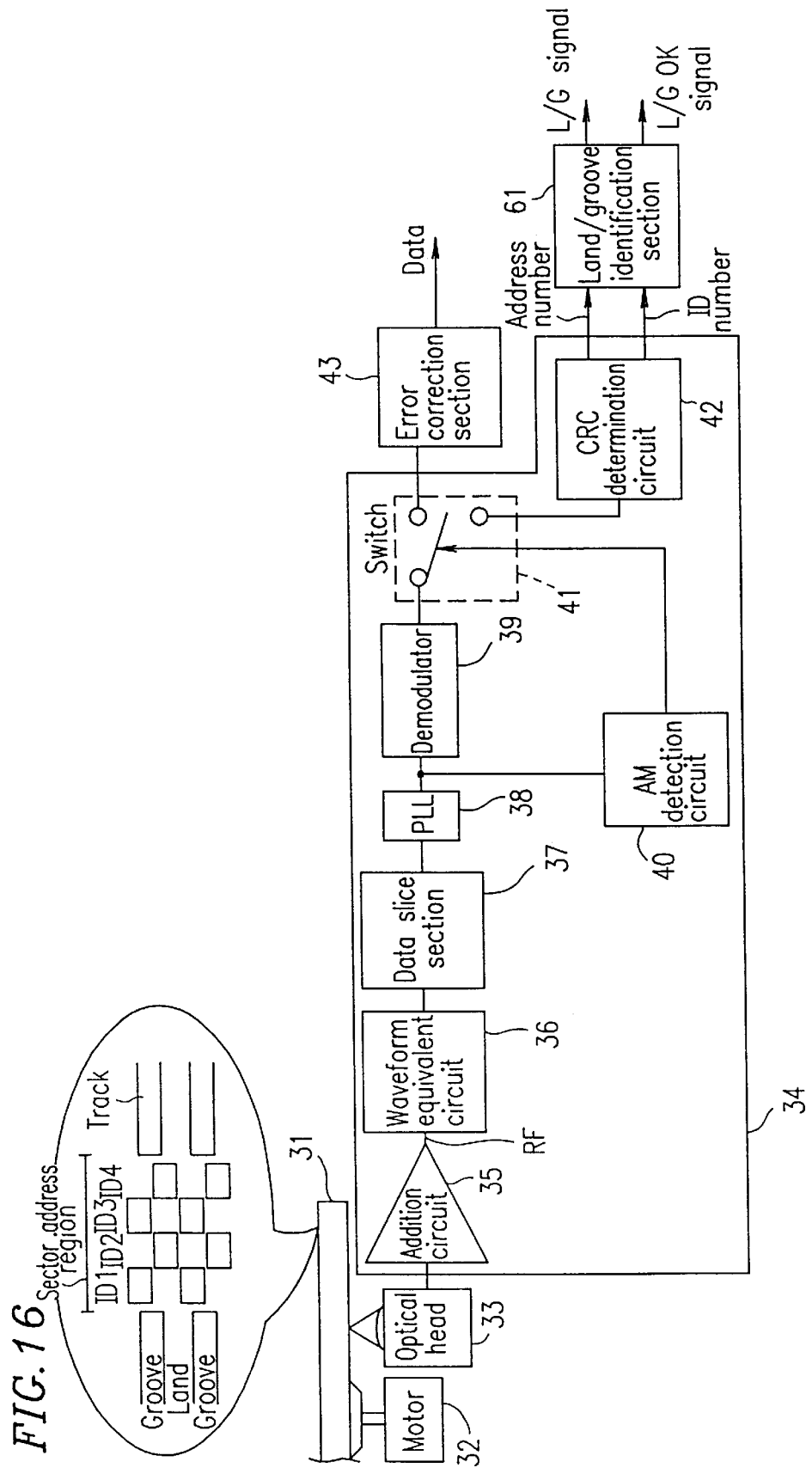
FIG. 16 is a block diagram showing an optical disk recording/reproduction device according to another example of the present invention.

FIG. 16 is a block diagram showing an optical disk recording/reproduction device according to the present example. In FIG. 16, 31 denotes a disk; 32 denotes a disk motor; 33 denotes an optical head; 34 denotes an address reproduction section composed of an addition circuit 35, a waveform equivalent section 36, a data slice section 37, a PLL 38, a demodulator 39, an AM detection section 40, a switcher 41, and a CRC determination section 42; 43 denotes an error correction section; and 61 denotes a land/groove identification section.

Figure 17A:
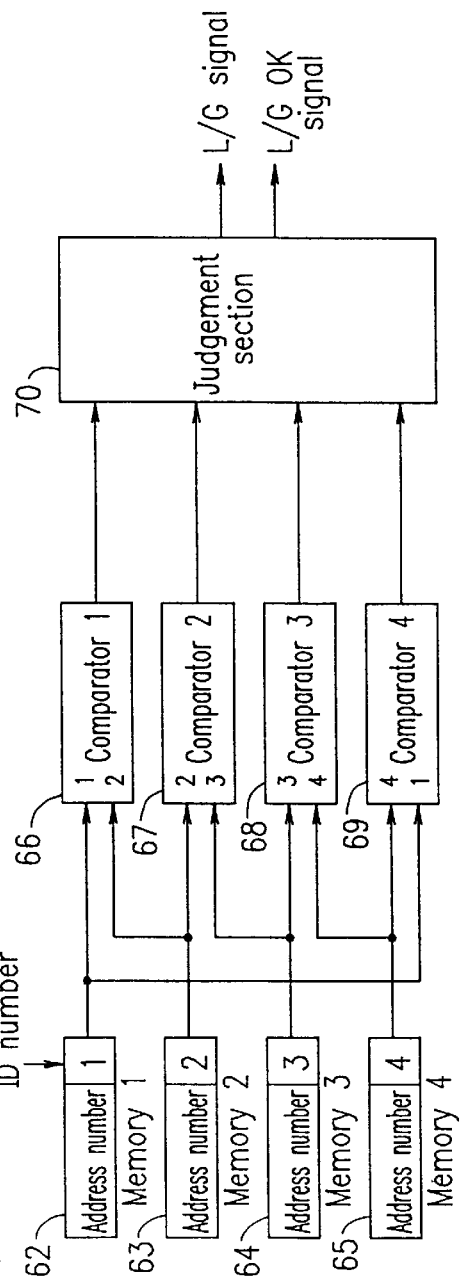
FIG. 17A is a block diagram showing a land/groove identification section.

FIG. 17A is a block diagram showing the configuration of the land/groove identification section 61. Reference numeral 62 denotes memory 1; 63 denotes memory 2; 64 denotes memory 3; 65 denotes memory 4; 66 denotes comparator 1; 67 denotes comparator 2; 68 denotes comparator 3; 69 denotes comparator 4; and 70 denotes a judgement section.

An operation of land/groove identification by the above-described optical disk recording/reproduction device as shown in FIG. 16, performed based on address signals obtained from sector address sections in which address blocks are disposed as shown in FIG. 10, will be described. First, the optical head 33 radiates laser light onto the disk 31, whereby a reproduced signal (RF signal) is generated based on the amount of reflected light. The same operation of extracting an address number and an ID number from an RF signal for each address block as described in the description of conventional techniques is performed by means of the waveform equivalent section 36, the data slice section 37, the PLL 38, the demodulator 39, the AM detection section 40, the switcher 41, and the CRC determination section 42.

The address signals read by the light spot 24 scanning the sector address region 5 are sequentially input to the land/groove identification section 61 as pairs of (address number, ID number). In the land/groove identification section 61, the read-out address numbers are stored intact in the memories 62, 63, 64, and 65 corresponding to the respective input ID numbers. Specifically, an address number in ID number 1 is stored in memory 1 (62); an address number in ID number 2 is stored in memory 2 (63); and so on.

With reference to FIG. 14, when reproducing data in the groove track 51, #100 is stored in memory 1; #100 is stored in memory 2; #100 is stored in memory 3; and #100 is stored in memory 4. Comparator 1 (66) in FIG. 17A compares the address numbers in memory 1 (62) and memory 2 (63) so as to determine whether or not the two address numbers coincide, and transfers the result to the judgment section 70. Similarly, comparator 2 (67) compares the address numbers in memory 2 (63) and memory 3 (64); comparator 3 (68) compares the address numbers in memory 3 (64) and memory 4 (65); and comparator 4 (69) compares the address numbers in memory 4 (65) and memory 1 (62). The comparators 2 to 4 transfer their respective results to the judgment section 70.

In this example, comparators 1 to 4 are all expected to output a result "coincided" for a groove track, due to the location pattern of the address blocks as shown in FIG. 14. The judgement section 70 judges that the currently reproduced track is a groove track when the outputs of all the comparators coincide. On the other hand, while the light spot 24 is reproducing data in the land track 52 shown in FIG. 14, #101 is stored in memory 1 (62); #100 is stored in memory 2 (63); #101 is stored in memory 3 (64); and #100 is stored in memory 4 (65). As a result, the outputs of comparators 1 to 4 all become "not coincided". Thus, comparators 1 to 4 are all expected to output a result "not coincided" for a land track, due to the location pattern of the address blocks as shown in FIG. 14; in this case, the currently reproduced track is judged to be a land track.

As described above, it is possible to determine whether a currently reproduced track is a land track or a groove track by examining whether or not address numbers corresponding to predetermined ID numbers coincide. In the case of the location pattern of address blocks according to the present example, the currently reproduced track is determined to be a groove track if at least one of the results from comparator 1 (66), comparator 2 (67), comparator 3 (68), and comparator 4 (69) is "coincided". The currently reproduced track is determined to be a land track if at least one result is "not coincided". In other words, it is not necessary for all the address blocks to be read accurately. The land/groove identification is possible as long as information in at least one of the address blocks ID1 and ID3 (on the inner periphery side) and information in at least one of the address blocks ID2 and ID4 (on the outer periphery side) can be read out as address signals.

Figure 17B:
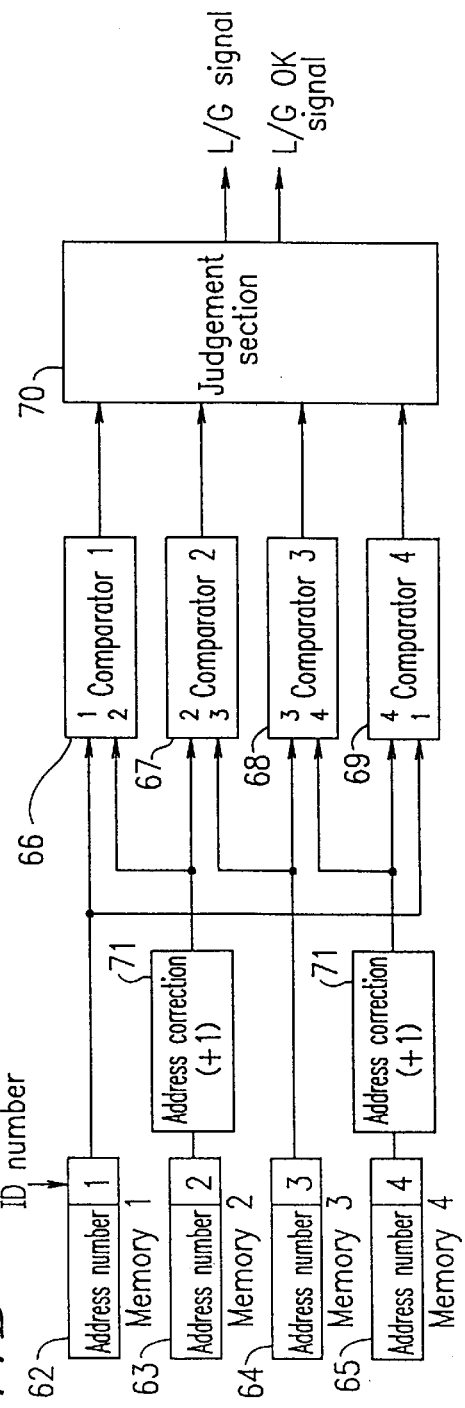
FIG. 17B is a block diagram showing a land/groove identification section.

Moreover, the land/groove identification is also possible when an address correction section 71 for correcting the address numbers is incorporated as shown in FIG. 17B. In this case, #101 is input to memory 1 (62); #100 is input to memory 2 (63); #101 is input to memory 3 (64); and #100 is input to memory 4 (65). Therefore, the outputs of the comparators 1 to 4 all become "coincided" when reproducing data in a land track. Thus, the track is determined to be a land track when all the comparators output "coincided".

On the other hand, when reproducing data in a groove track, the outputs of the comparators 1 to 4 all become "not coincided". Thus, the track is determined to be a groove track when all the comparators output "not coincided".

However, the identification as to land/groove is impossible in the case where address signals can be read only from the address blocks ID1 and ID3 (on the inner periphery side) or only from the address blocks ID2 and ID4 (on the outer periphery side). In such cases, a signal (L/G OK signal) indicating that the judgement section 70 is incapable of judging can be output. Since sector addresses are read at a rate of once in every few milliseconds in accordance with the disk rotation, in general, there is only a very small probability for the land/groove identification to be disabled for all the sector addresses over a long period of time. Therefore, the land/groove identification is practically possible by the above operation.

If an address which actually indicates a false address but was erroneously judged as correct by the CRC judgment section is input to the land/groove identification section, the outputs of the comparators will include both "coincided" and "not coincided". In such cases, too, a signal (L/G OK signal) indicating that the judgement section 70 is incapable of judging can be output.

It will be appreciated that by inputting the land/groove identification signal (L/G signal) from the land/groove identification section 61 to the address correction section 44 of Example 7 shown in FIG. 13, the land/groove identification and outputting of an address value can be simultaneously performed based on one sector address.

(EXAMPLE 9)

Next, still another example of an optical disk recording/reproduction device according to the present invention will be described.

Figure 18:
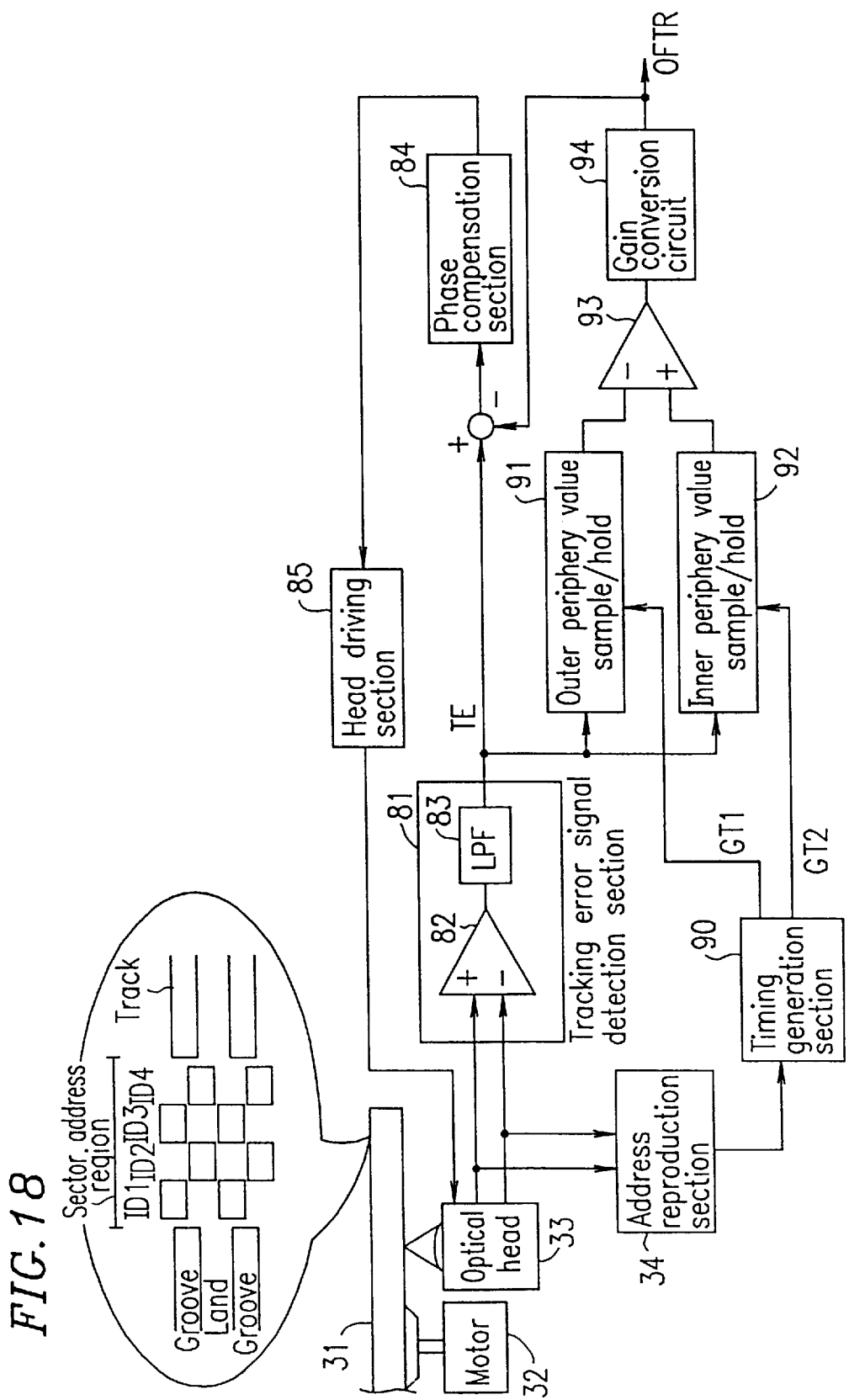
FIG. 18 is a block diagram showing an optical disk recording/reproduction device according to another example of the present invention.

FIG. 18 is a block diagram showing an optical disk recording/reproduction device according to the present example. In FIG. 18, 31 denotes a disk; 32 denotes a disk motor; 33 denotes an optical head; 34 denotes an address reproduction section; 81 denotes a tracking error signal detection section composed of a differential circuit 82 and a LPF (Low Pass Filter) 83; 84 denotes a phase compensation section; 85 denotes a head driving section; 90 denotes a timing generation section; 91 denotes an outer periphery value sample/hold section; 92 denotes an inner periphery value sample/hold section; 93 denotes an addition circuit; and 94 denotes a gain conversion circuit.

An operation of detecting an off-tracking amount between a light spot and a track in a sector address region having address blocks disposed as shown in FIG. 14, performed by the above-described optical disk recording/reproduction device, will be described.

First, the optical head 33 in FIG. 18 radiates laser light onto the disk 31 and detects a reproduced signal (RF signal) based on the amount of reflected light. The operation of extracting an address number and an ID number for each address block as described in the description of conventional techniques is performed by the address reproduction section 34.

Figure 19:
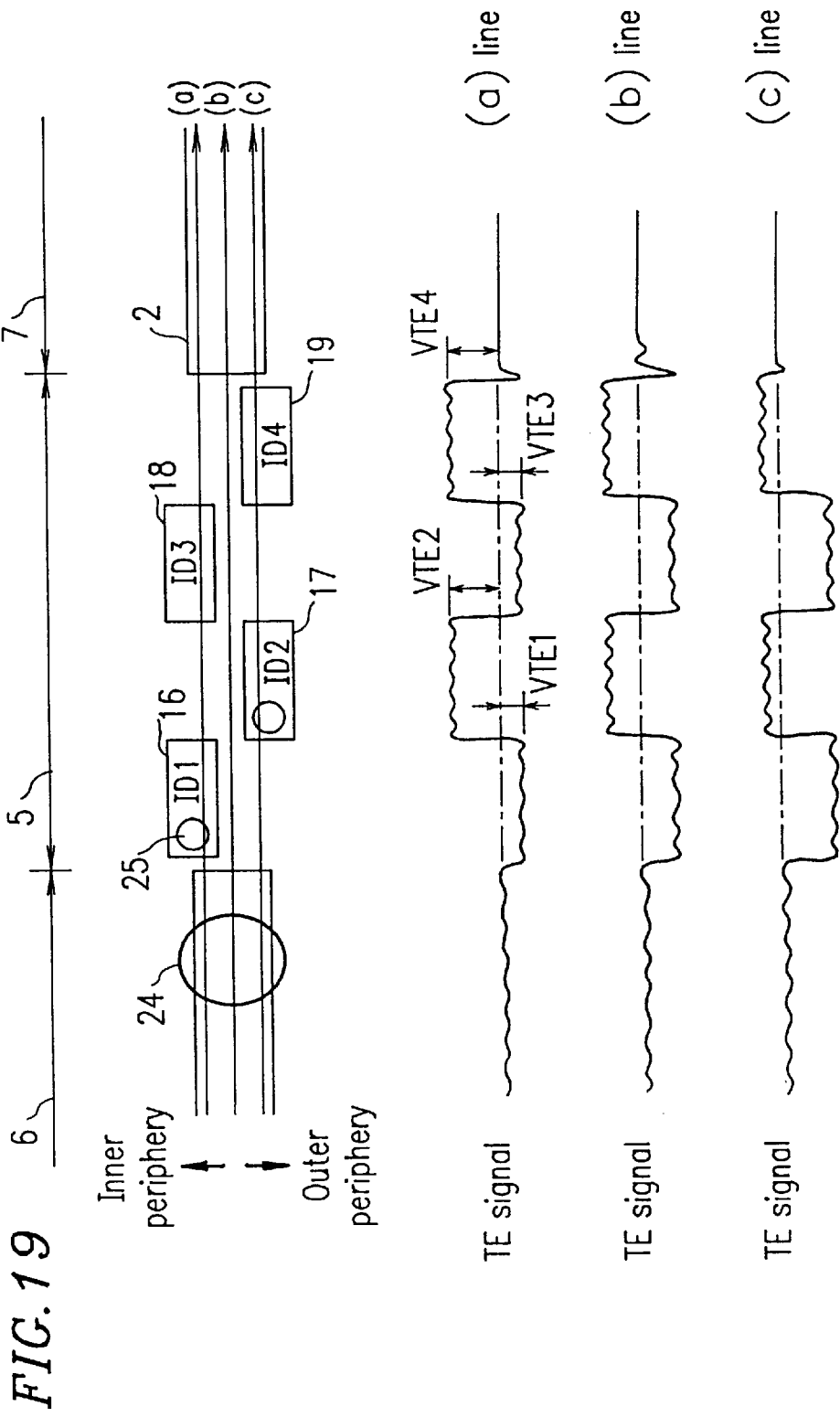
FIG. 19 is a diagram showing changes in the TE signal in response to off-tracking.

FIG. 19 is a schematic diagram showing change in the tracking error signal (TE signal) in a sector address region 5 during an off-track state. The level of the TE signal shifts substantially in proportion with the distance between the light spot and the address pits, and the direction of level shifts is determined by the relative positions of the light spot and the address pits, as described in Example 2. Herein, it is assumed that the TE signal takes a negative value when the light spot 24 passes over address pits 25 on the outer periphery side and takes a positive value when the light spot 24 passes over address pits 25 on the inner periphery side. When the light spot 24 follows line (a) of a track 2, the level shifts VTE1 and VTE3 of the TE signal take small negative values because the distance between the light spot 24 and the address pits 25 is relatively small in ID1 and ID3. In this case, the level shifts VTE2 and VTE4 of the TE signal take large positive values because the distance between the light spot 24 and the address pits 25 is relatively large in ID2 and ID4. As a result, a TE signal shown in (a) of FIG. 19 is obtained. When the light spot 24 follows line (b) of the track 2, the level shift amount is the same in all of ID1 to ID4 because the distances between the light spot 24 and the address pits 25 in ID1 to ID4 are the same. As a result, a TE signal shown in (b) of FIG. 19 is obtained. When the light spot 24 follows line (c) of the track 2, a TE signal shown in (c) of FIG. 19 is obtained. As seen from FIG. 19, the levels of VTE1 (or VTE3) and VTE2 (or VTE4) vary depending on which position of the track 2 the light spot 24 moved over, so that the off-tracking amount can be deduced based on a difference between level shifts. In other words, the off-tracking amount can be obtained in accordance with the equation Voftr=VTE1−VTE2. If the light spot 24 follows the center line (b) of the track 2, VTE1−VTE2=0 in the sector address region 5; if the light spot 24 follows the line (a) of the track 2, VTE1−VTE2<0 in the sector address region 5; and if the light spot 24 follows the line (c) of the track 2, VTE1−VTE2>0 in the sector address region 5. Thus, the direction and amount of off-tracking can be obtained.

Figure 20:
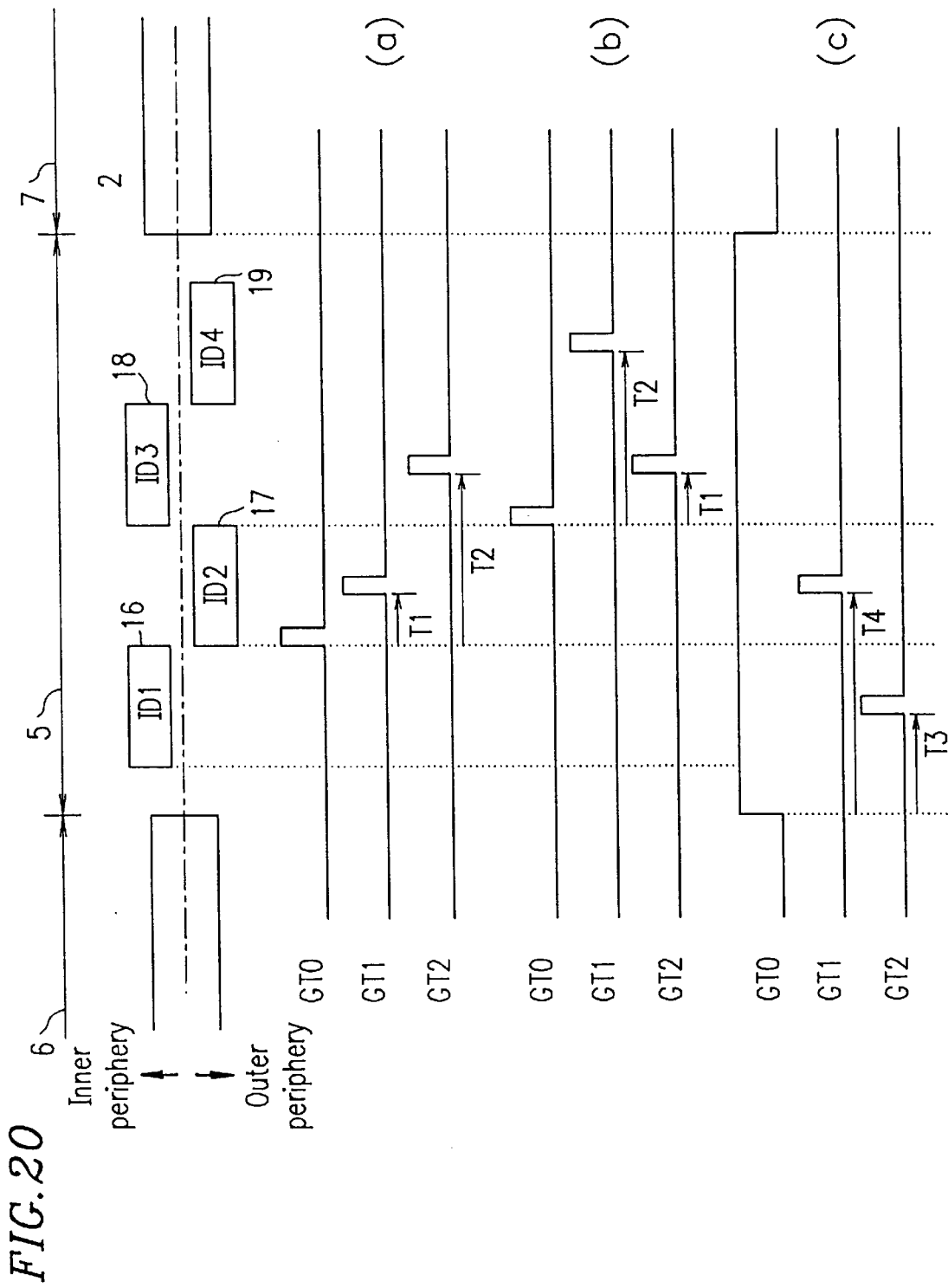
FIG. 20 is a timing diagram of a timing generation section.

Next, the operation of the timing generation section 90 in FIG. 18 will be described. FIG. 20 is a timing diagram showing gate pulse signals (GT0 to GT2) in the timing generation section 90. Since read-out address signals are input from the address reproduction section 34 to the timing generation section 90, the timing generation section 90 generates a gate pulse signal GT1 which is in synchronization with address blocks on the outer periphery side and a gate pulse signal GT2 which is in synchronization with address blocks on the inner periphery side, based on the received address signals. The gate pulse signal GT1 becomes a signal for sampling a signal in the outer periphery value sample/hold section 91. The gate pulse signal GT2 becomes a signal for sampling a signal in the inner periphery value sample/hold section 92.

First, (a) of FIG. 20 shows a case where ID1 was successfully read. The timing with which ID2, ID3, and ID4 appear can be known if ID1 is successfully read. Accordingly, the signal GT0, which includes a gate pulse in synchronization with the end of ID1, is generated. In this case, gate pulse signals GT2 and GT1 are generated for the address block ID3 (on the inner periphery side) and the address block ID2 (on the outer periphery side), respectively (ID2 can also be ID4). Accordingly, the timing generation section 90 generates the gate pulse signal GT1 so as to lag behind the gate pulse signal GT0 by time T1, and generates the gate pulse signal GT2 so as to lag behind the gate pulse signal GT0 by time T2.

Next, (b) of FIG. 20 is a timing diagram showing the case where ID2, but not ID1, was successfully read. A gate pulse GT0 is generated which is in synchronization with the end of ID2. In this case, gate pulse signals GT2 and GT1 are generated for the address block ID3 (on the inner periphery side) and the address block ID4 (on the outer periphery side), respectively. Accordingly, the timing generation section 90 generates the gate pulse signal GT1 so as to lag behind the gate pulse signal GT0 by time T2, and generates the gate pulse signal GT2 so as to lag behind the gate pulse signal GT0 by time T1.

Next, (c) of FIG. 20 shows the case where gate pulse signals to be sampled and held are generated in synchronization with a further gate pulse signal which is in synchronization with the sector address region. Assuming that GT0 is the further gate pulse signal, which rises immediately before each sector address region, gate pulse signals GT2 and GT1 are generated for the address block ID1 (on the inner periphery side) and the address block ID2 (on the outer periphery side), respectively. Accordingly, the timing generation section 90 generates the gate pulse signal GT1 so as to lag behind the gate pulse signal GT0 by time T4, and generates the gate pulse signal GT2 so as to lag behind the gate pulse signal GT0 by time T3.

By using the gate pulse signals GT1 and GT2 generated by the timing generation section 90, with reference to (a) of FIG. 20, for example, the level VTE2 of the TE signal in the address block ID2 (on the outer periphery side) is stored in the outer periphery value sample/hold section 91 in synchronization with the gate pulse signal GT1, and the level VTE3 of the TE signal in the address block ID3 (on the inner periphery side) is stored in the inner periphery value sample/hold section 92 in synchronization with the gate pulse signal GT2. As a result, a value (VTE1−VTE2) is output from the differential circuit 93. Since this value corresponds to the off-tracking amount, it can be further converted into an off-track signal (OFTR signal) by adjusting its level to the level of the TE signal by the gain conversion section 94.

In the actual tracking control system, a state may occur in which the light spot is not actually in the track center, owing to offset components, etc. generated in the tracking error signal detection section 81, the phase compensation section 84, and the head driving section 85, although the TE signal is controlled to be zero. Accordingly, by applying the OFTR signal for correcting the offset in the tracking control system as shown in FIG. 18, it becomes possible to position the light spot in the track center. The same applies to (b) and (c) of FIG. 20.

The gate pulse signal GT2 is to be generated in synchronization with one of the address blocks on the inner periphery side, rather than a specific one of the address blocks; the gate pulse signal GT1 is to be generated in synchronization with one of the address blocks on the outer periphery side, rather than a specific one of the address blocks. Although it's not necessary to adjust time T1 and time T2 at exact time intervals so as to synchronize the gate pulse signals with specific address pit positions in the address block, it is preferable that the pit patterns in the respective address blocks are measured (scanned) with the same period (e.g., the VFO region).

Although the information in only one address block on the inner periphery side and only one address block on the outer periphery side is sampled and held in the present example, a more average value can be detected by detecting an off-track signal by using a mean value of a plurality of address blocks on the inner periphery side and a mean value of a plurality of address blocks on the outer periphery side, even if the tracks are locally warped.

(EXAMPLE 10)

Next, still another example of an optical disk recording/reproduction device according to the present invention will be described.

Figure 21:
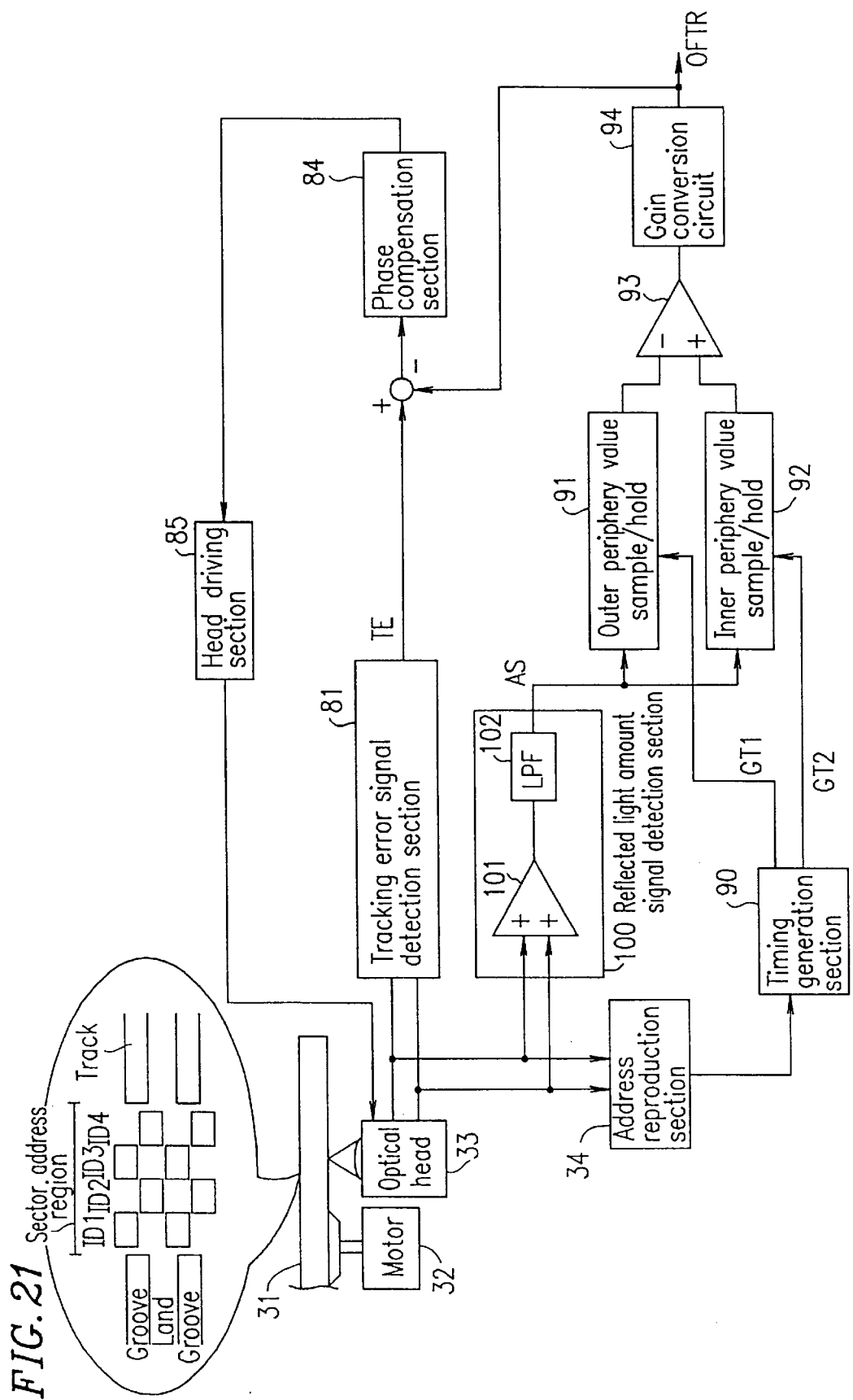
FIG. 21 is a diagram showing the location of address blocks in an optical disk according to still another example of the present invention.

FIG. 21 is a block diagram showing an optical disk recording/reproduction device according to the present example. In FIG. 21, 31 denotes a disk; 32 denotes a disk motor; 33 denotes an optical head; 34 denotes an address reproduction section; 81 denotes a tracking error signal detection section; 84 denotes a phase compensation section; 85 denotes a head driving section; 90 denotes a timing generation section; 91 denotes an outer periphery value sample/hold section; 92 denotes an inner periphery value sample/hold section; 93 denotes a differential circuit; 94 denotes a gain conversion circuit; and 100 denotes a reflected light amount signal detection section composed of an addition circuit 101 and a LPF (Low Pass Filter) 102.

In FIG. 21, elements 31, 32, 33, 34, 81, 84, 85, 90, 91, 92, and 93 perform the same operation described in Example 9. While a TE signal is sampled and held in order to detect an off-tracking amount in Example 9, the detection of the off-tracking amount in Example 10 is performed by sampling and holding a reflected light amount signal (AS signal) detected by the reflected light amount signal detection section 100.

In the reflected light amount signal detection section 100, the outputs of a two-divided photosensitive elements of the optical head 33 are summed up in the addition circuit 101, and the added signal is led through the LPF 102 (having a band in a few dozen kHz to a few 100 kHz, which is higher than the tracking control band but lower than the RF signal) in order to remove the high-frequency component thereof. As a result, an AS signal is detected as a signal indicating an average reflected light amount.

Figure 22:
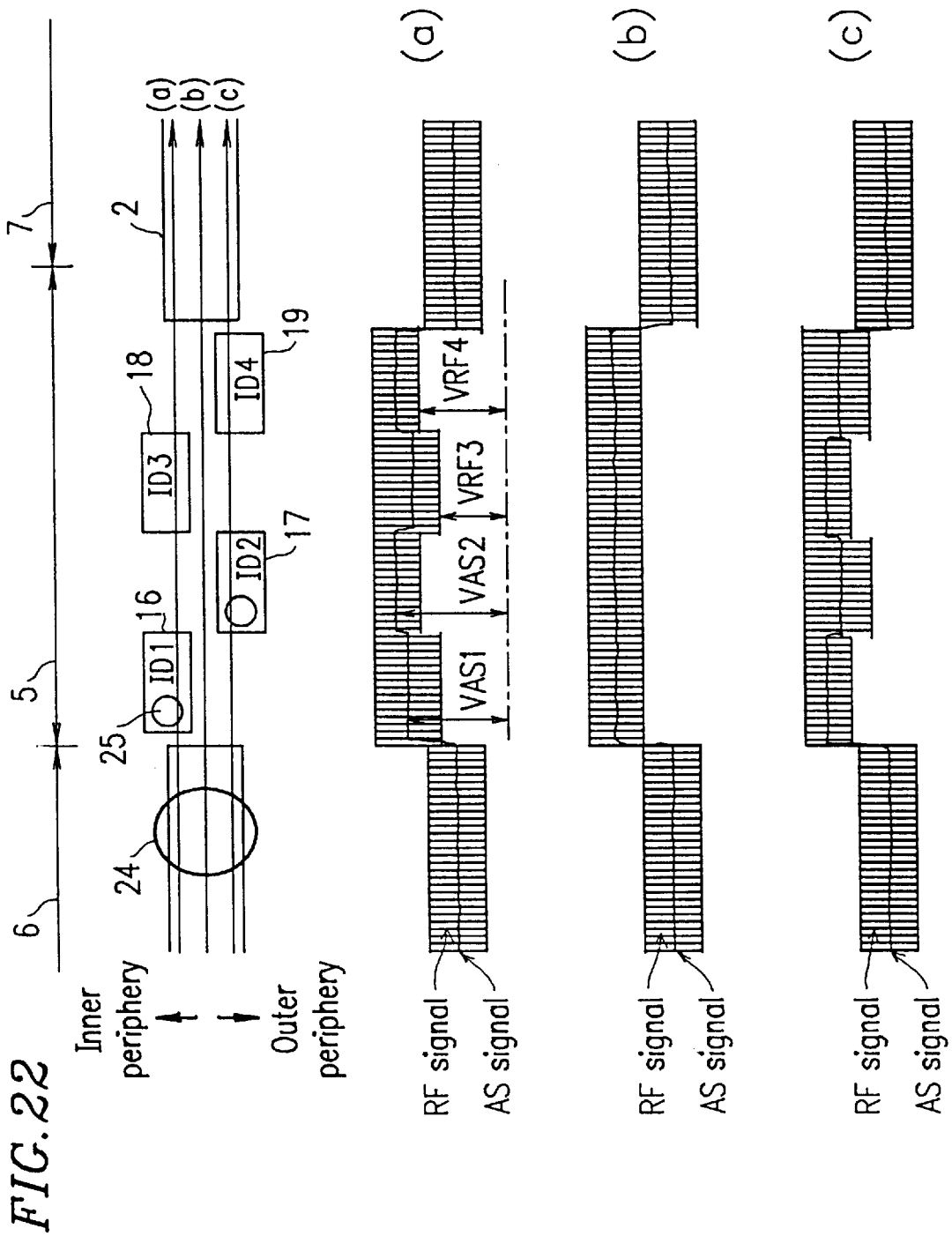
FIG. 22 is a diagram showing changes in an AS signal in response to off-tracking.

FIG. 22 shows the change in the AS signal with respect to the offset amount between the light spot and a track. As described in Example 2, the RF signal shifts as shown in FIG. 7A, 8A or 8B depending on where the light spot 24 passes through. Since the AS signal indicates an average level of the RF signal, AS signals as shown in (a), (b), and (c) in FIG. 22 will result, respectively, for lines (a), (b), (c) in FIG. 22 which the light spot 24 follows. Therefore, by sampling and holding VAS1, VAS2, and the like in synchronization with the address blocks on the inner periphery side and the address blocks on the outer periphery side and obtaining a difference therebetween (VAS1−VAS2) as in Example 9, a signal corresponding to the off-tracking amount can be detected. Gate pulse signals GT1 and GT2 for the sampling and holding are generated by the timing generation section 90 as shown in Example 9. However, as for the timing of gate pulse signal generation, it is preferable to employ an AS signal derived from the VFO portion, the AM portion, or a specially provided pit portion because a more accurate detection will be enabled by sampling AS signals at portions in address blocks having the same pit pattern.

Moreover, it is applicable to employ an offtrack signal (OFTR signal) detected by using the AS signal for correcting the offset in the tracking control system as in Example 9.

Although the AS employed herein is obtained by leading the RF signal through the LPF, it is also applicable to employ the lower envelope level (i.e., the side having a smaller reflected light amount) of the RF signal (i.e., VRF3 and VRF4 in FIG. 22).

(EXAMPLE 11)

Next, still another example of an optical disk according to the present invention will be described.

Figure 23:
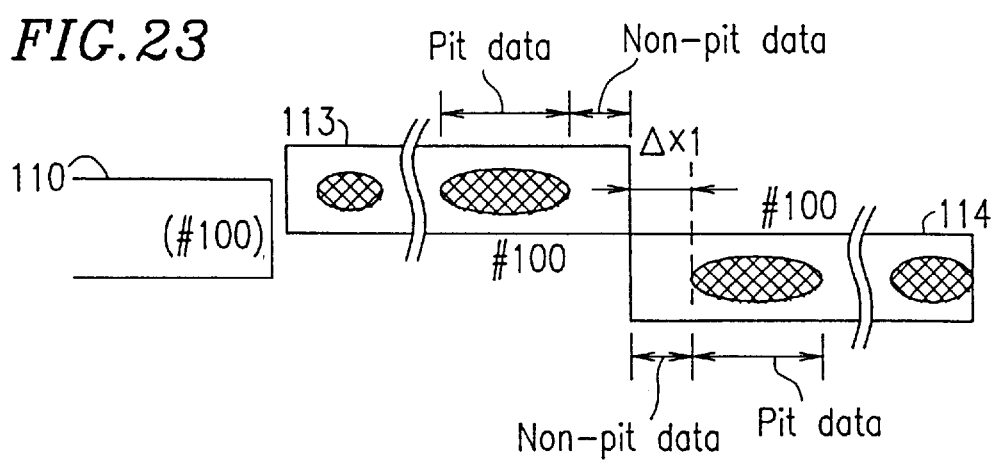
FIG. 23 is a diagram showing the location of address blocks in an optical disk according to still another example of the present invention.

The address blocks in the sector address regions in the optical disk of the present example has substantially the same schematic location shown in FIG. 10A. However, instead of incorporating a margin ($\Delta X1$) between adjoining address blocks, the optical disk of the present example adopts a data pattern such that the end pattern of each address block is not in the form of pits and that the beginning pattern of the subsequent address block is also not in the form of pits, as shown in FIG. 23. In particular, the beginning pattern of each address block includes non-pit data (having a length of $\Delta X1$) longer than the rotation accuracy ($\Delta X$) in the cutting of the master disk.

While distances between address block are wasted in the case of FIG. 10B, where address blocks are disposed so as to be shifted with respect to one another along the circumference direction, the optical disk of the present example overcomes that problem.

Figure 24A:
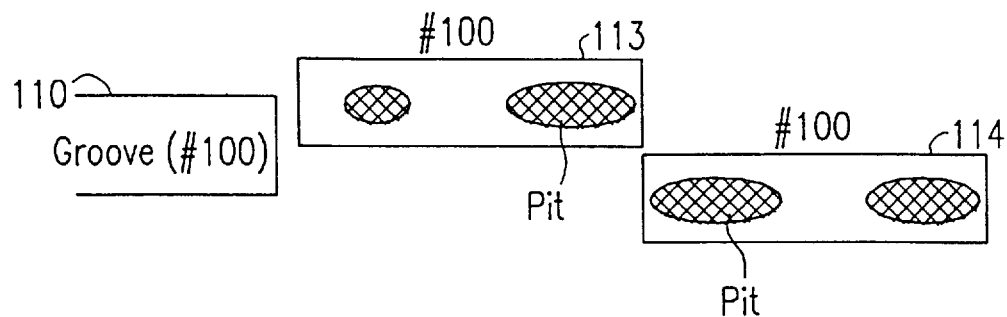
FIG. 24A is a diagram showing two address blocks which should be formed.
Figure 24B:
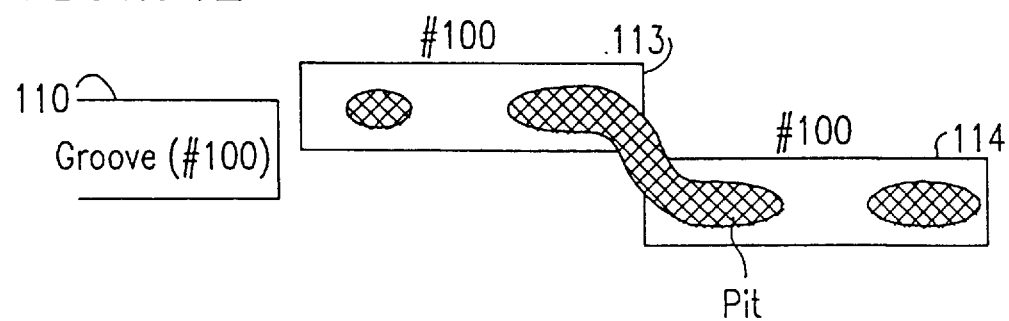
FIG. 24B is a diagram showing two address blocks which are formed in actuality.

The advantages of the optical disk of the present example will be described in detail with reference to FIGS. 24A, 24B, 25A, and 25B. In the data pattern of the address blocks shown in FIGS. 24A and 24B, the end pattern of each address block is in the form of pits, and the beginning pattern of the subsequent address block is also in the form of pits. Specifically, FIG. 24A shows a pit configuration designed to result in the case of such a data pattern. In FIG. 24A, the end pits of the address block 113 and the beginning pits of the address block 114 are formed so as to have predetermined lengths along the respective center lines thereof. However, in practice, the end pits of the address block 113 and the beginning pits of the address block 114 may be formed in a continuous manner shown in FIG. 24B when address pits are formed while shifting the location of the light spot in the sector address region 5 along the radius direction in the cutting process of the master disk. This is because the laser light is radiated onto the optical disk even while shifting the laser light spot for cutting from the address block 113 to the address block 114 along the radius direction. As a result, as shown in FIG. 24B, pits having an unexpected configuration may result, thereby making it difficult to properly reproduce data.

This problem can be solved by cutting the address pits on the inner periphery side and the address pits on the outer periphery side by using separate laser light beams. However, the use of such a method would complicate the structure of the cutting apparatus.

Figure 25A:
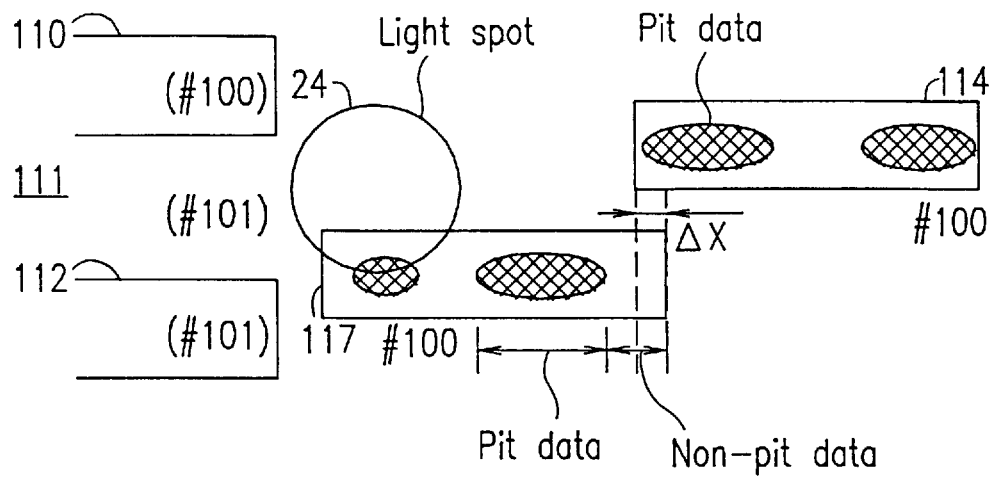
FIG. 25A is a diagram showing a case where pit data of one of two adjoining address blocks overlaps with the other address block.
Figure 25B:
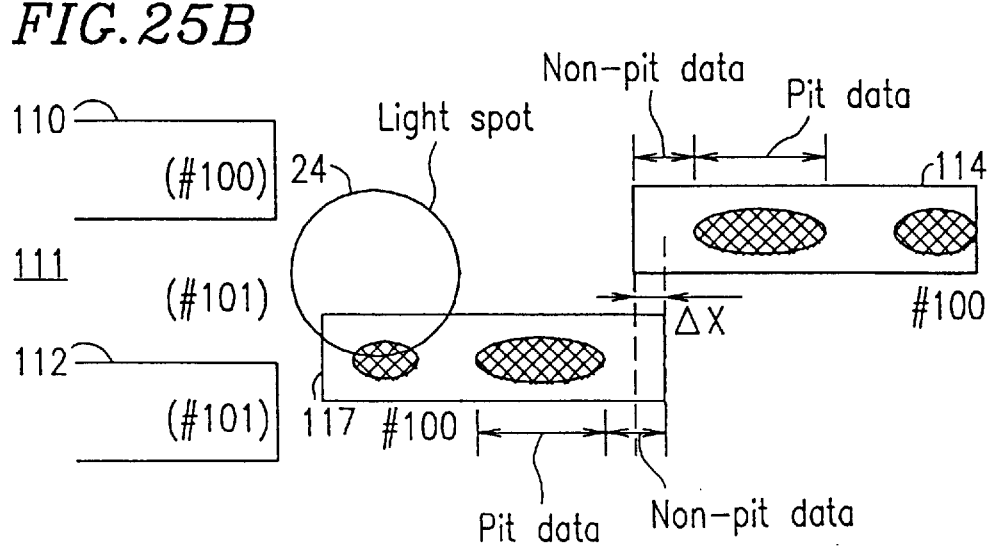
FIG. 25B is a diagram showing a case where pit data of one of two adjoining address blocks does not overlap with the other address block.

FIGS. 25A and 25B show the operation of reading pits in the case where the light spot 24 scans the land track 111 for reproducing the data therein. FIG. 25A shows a sector address region in the case where the pit pattern in portions connecting address blocks is not particularly defined. In the sector address region of FIG. 25A, adjoining address blocks 114 and 117 overlap with each other by a length corresponding to the cutting accuracy $\Delta X$ along the circumference direction, and the beginning of the address block 114 is pit data. In such a state, where non-pit data of the end of the address block 117 overlaps with the pit data of the beginning of the address block 114 as shown in FIG. 25A, reproducing data in the address block 117 while moving the light spot 24 along the center line of the land track 111 would result in data error in the address block 117. This is because the pit data in the beginning of the address block 114 causes a misjudgment that the end of the address block 117 has pit data.

On the other hand, FIG. 25B shows a sector address region of the optical disk of the present example. The optical disk includes non-pit data in the beginning and the end of each address block. In the case of FIG. 25B, where the beginning of the address block 114 is not pit data, no data error occurs in the address block 117 even if the non-pit data (which is the last data) of the address block 117 overlaps with the non-pit data in the beginning of the address block 114 because the reproduced signal is non-pit data. Although the number of non-pit data in the beginning of the address block 114 cannot be correctly detected, the beginning of an address block is generally a VFO region, so that not all the data are required to be read. No problems will occur in reading address blocks if the address data portion is resynchronized in the AM region following the VFO region and the address number and CRC are properly recognized.

Thus, by ensuring that the beginning pattern and the end pattern of each sector address are non-pit data as shown in FIG. 25B, insufficient formation of pits between wobbling address blocks during the cutting of the master disk and reading errors of address data during reproduction of sector addresses due to overlapping of address blocks can be prevented, while also eliminating wasteful gaps.

(EXAMPLE 12)

Next, still another example of an optical disk according to the present invention will be described.

Figure 26A:
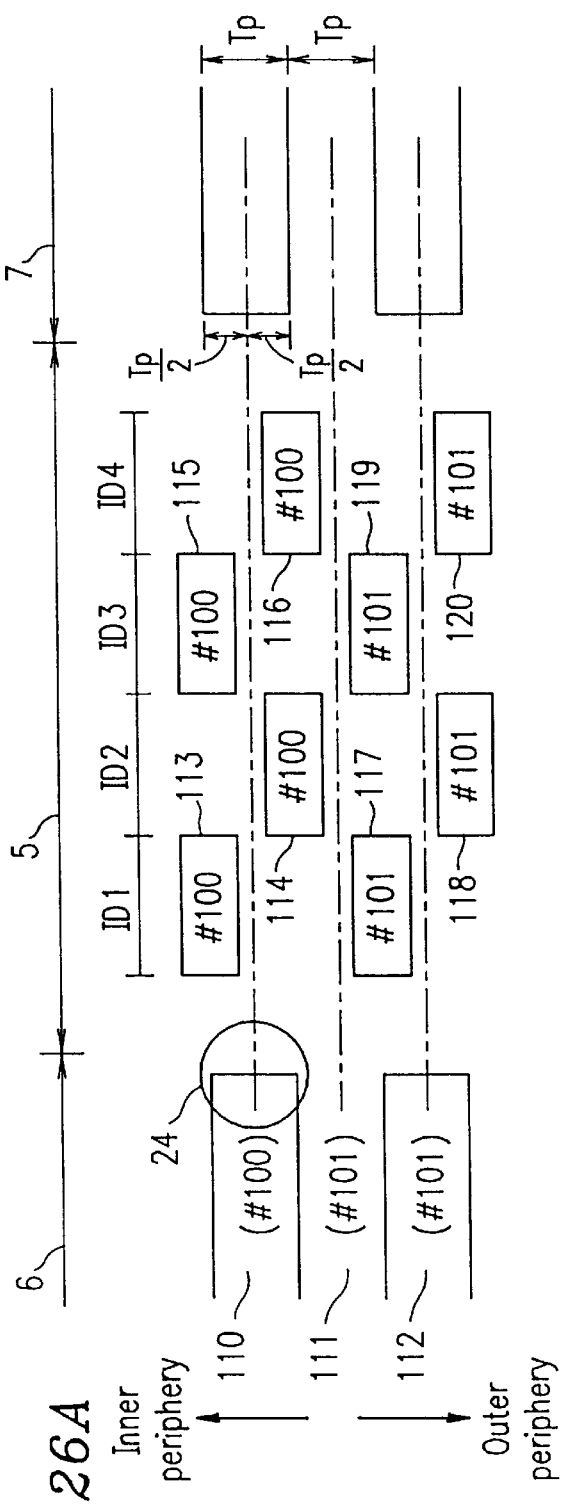
FIG. 26A is a diagram showing the location of address blocks in an optical disk according to still another example of the present invention.
Figure 26B:
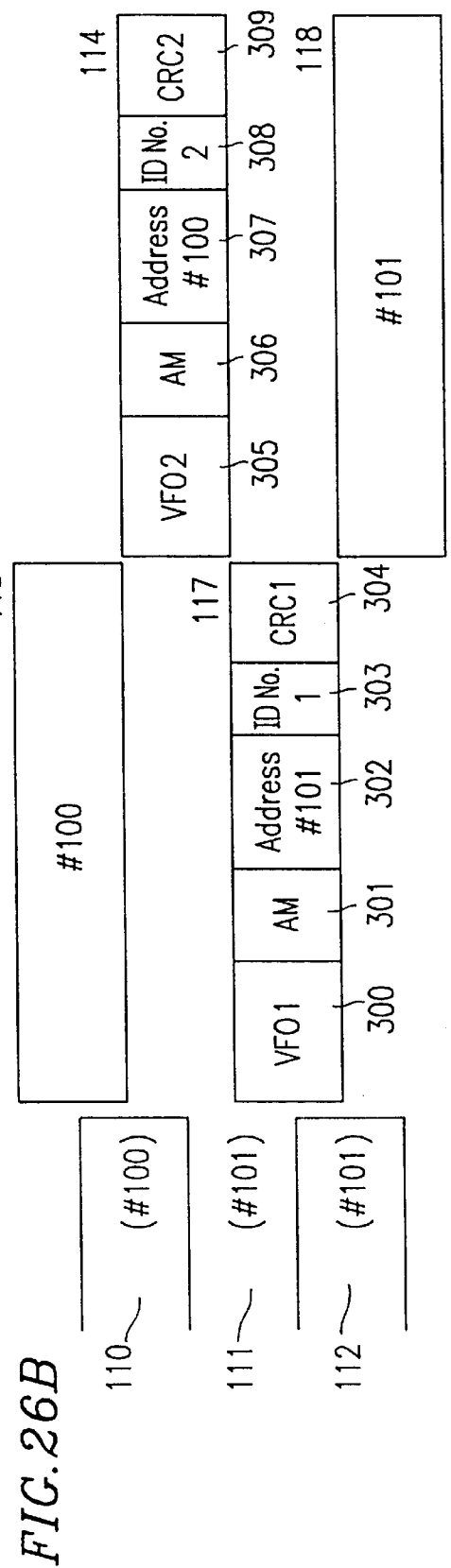
FIG. 26B is a diagram showing the location of data within those address blocks.

FIG. 26A shows the location of address blocks of the optical disk of the present example, which is similar to Example 2: 110 and 112 denote groove tracks; 111 denotes a land track; 113, 114, 115, 116, 117, 118, 119, and 120 denote address blocks; and 24 denotes a light spot. FIG. 26B shows the location of data in the respective address blocks. The address block 117 in ID1 is composed of the following data: VFO1 (300), AM (301), address number (302), ID number (303), and CRC1 (304). The address block 114 in ID2 is composed of the following data: VFO2 (305), AM (306), address number (307), ID number (308), and CRC2 (309).

The optical disk of the present example differs from the optical disk of Example 2 in that the length of VFO1 of the address block 117 is prescribed to be 1.5 times to 3 times longer than the VFO of address blocks in ID2, ID3, and ID4 according to the present example.

When a sector address region is irradiated by the light spot 24, in ID1 and data in ID2 are reproduced in this order. The data region 6 is composed of a track groove, but the sector address region 5 is composed of a mirror face having address pits formed therein. Therefore, as shown in FIGS. 8A and 8B, the d.c. signal component (DC level) of the reproduced signal (RF signal) varies between the data region 6 and the sector address region 5. As a result, the level of the RF signal drastically shifts immediately after the light spot 24 has moved from the data region 6 to the sector address region 5. In order to accurately read the data in spite of such level shifts, it is necessary to improve the reproduction circuit. However, even by improving the reproduction circuit, the influence of level shifts of the RF signal cannot be completely eliminated in the interface between the data region 6 and the sector address region 5. Therefore, it takes more time to lock the PLL in ID1 in order to match the phases of the data reading clock and the data (VFO1). In ID2 and after, it becomes faster to lock the PLL in the VFO because the influence of the level shifts of the RF signal decreases.

In the case where the data lengths of all the address blocks are made equal, the lengths of the VFOs in ID2 to ID4 must coincide with the length of VFO required in ID1, so that the VFOs in ID2 to ID4 become longer than necessary, resulting in waste of space. Therefore, according to the present example, only the length of the VFO in ID1 is made longer than the VFOs in ID2 to ID4, thereby making it possible to optimize the lengths of the VFOs required for the respective address blocks. As a result, it becomes possible to eliminate redundant data and to maintain readability of addresses.

Since the difference between the length of VFO1 (300) in ID1 and VFO2 (305) in ID2 is small relative to the data length of one sector address region, there is substantially no influence on the average value of the tracking error signal in the sector address region described in Example 1.

(EXAMPLE 13)

Figure 27:
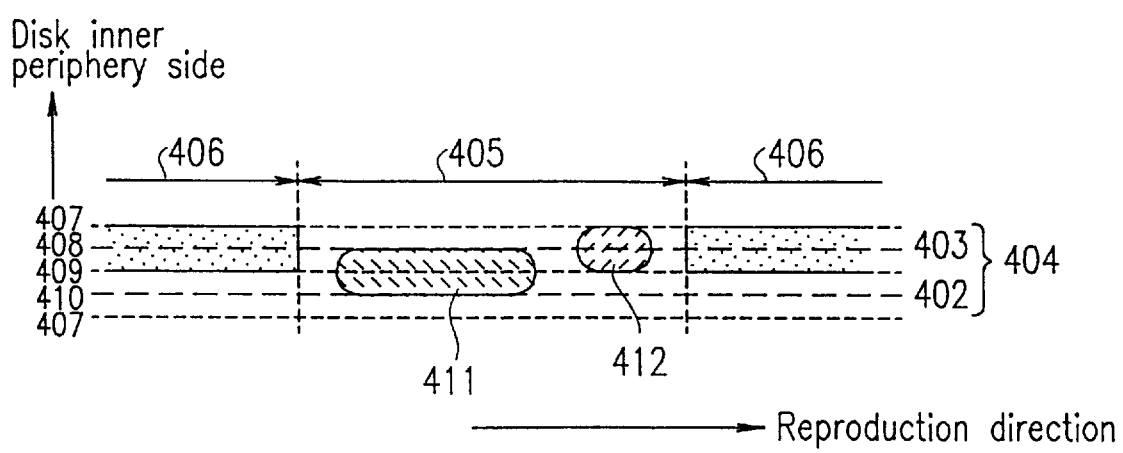
FIG. 27 is a diagram showing the location of address blocks in an optical disk according to still another example of the present invention.

Next, still another example of an optical disk according to the present invention will be described with reference to FIG. 27. FIG. 27 shows an address region 405. An address block 411 provided in the address region 405 is recorded so as to be centered around a boundary line 409 between a groove track 403 and a land track 402 on the outer periphery side, the address block 411 thus being on both the groove track 403 and the land track 402, and it takes a different value in each address region. Since the address block 411 is included in common in the address regions of the land track 402 and the groove track 403 adjoining each other, the data regions are to be identified by the same address block 411. A track identification mark 412 is for identifying the land track 402 from the groove track 403 (or vice versa), both of which have the same address block 411, and is disposed in the center of either track (i.e., 408 or 410). Herein, the track identification mark 412 is provided on the track center 408 of the groove track 403.

As a result, the track identification mark 412 is reproduced when reproducing data in the groove track 403, and the track identification mark 412 is not reproduced when reproducing data in the land track 402. Although the tracks 403 and 402 have the same address block 411, it is possible to identify whether a currently reproduced track is a land track or a groove track depending on whether or not the track identification mark 412 is subsequently reproduced.

In FIG. 27, the track identification mark 412 is located after the address block 411, so as to be more easily and accurately detected in accordance with a gate pulse signal generated based on the address block 411. In other words, it is ensured that the track identification mark 412 is reproduced after the address block 411 in the reproduced signal.

Since the reproduced signal differs depending on the track as described above, it is possible to identify the land track 402 from the groove track 403 based on the reproduced signal alone. Therefore, irrespective of the correspondence between groove configurations and tracking polarities, recording or reproduction can be performed for a desired track by only using the reproduced signal.

Although the track identification mark 412 is recorded on the groove track 403 in the above example, it will be appreciated that the same effect can also be attained by recording the track identification mark 412 on the land track 402.

Figure 28:
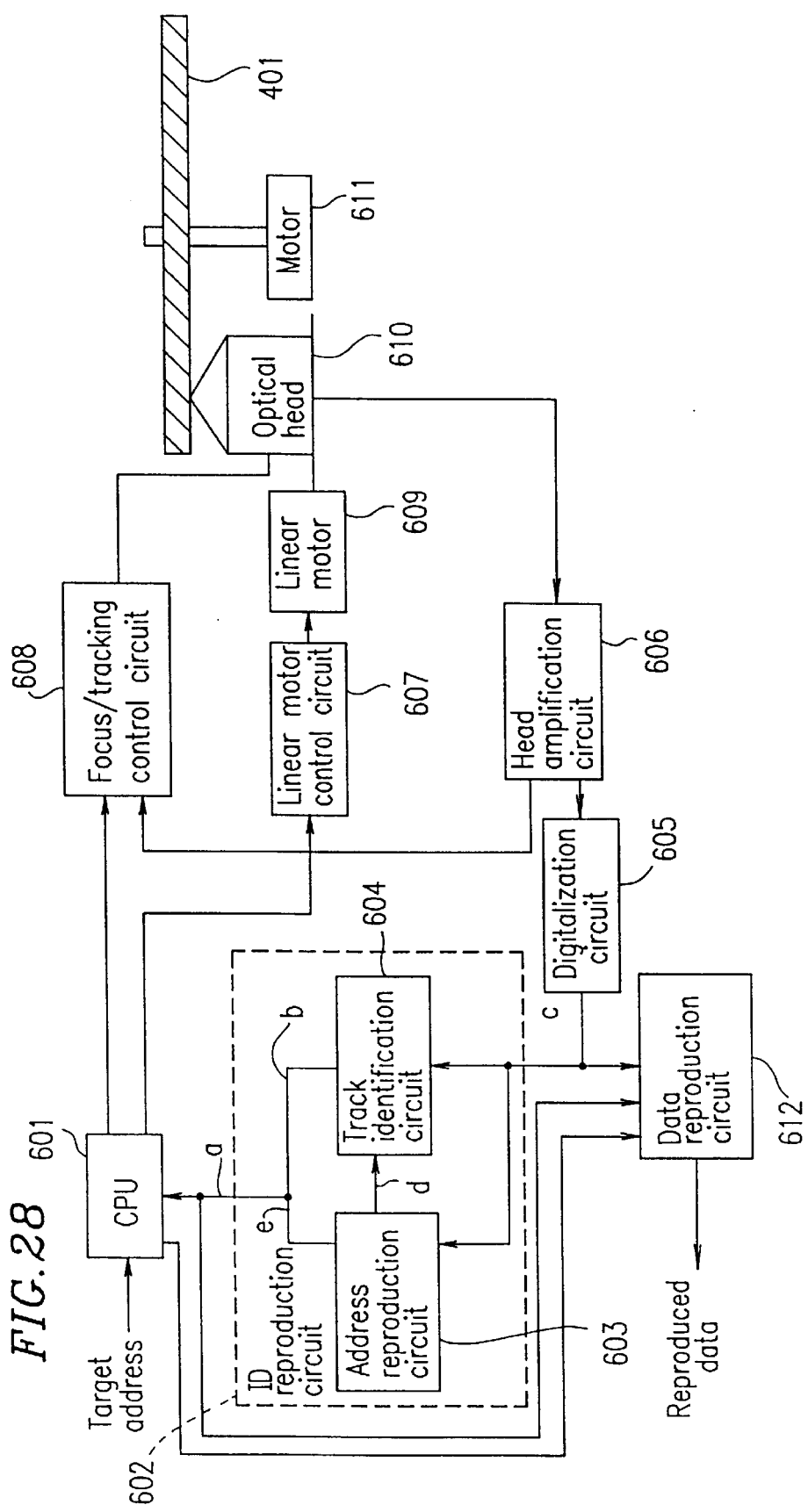
FIG. 28 is a block diagram showing an optical disk recording/reproduction device according to still another example of the present invention.

FIG. 28 is a diagram showing the configuration of an optical disk recording/reproduction device according to another example of the present invention. The optical disk recording/reproduction device shown in FIG. 28 records or reproduces information on the optical disk shown in FIG. 27. In the following description, a CPU 601 will be described as a track designation means, and a track identification mark reproduction circuit 604 will be described as a track identification mark reproducing means.

In FIG. 28, elements 601 and 605 to 612 perform the same operation as that described in Example 1.

An ID reproduction circuit 602 is composed of an address reproduction circuit 603 for reproducing information in an address block 411 based on a signal digitalized by a digitalization circuit 605 and the track identification mark reproduction circuit 604 for reproducing a track identification mark 412.

Figure 29:
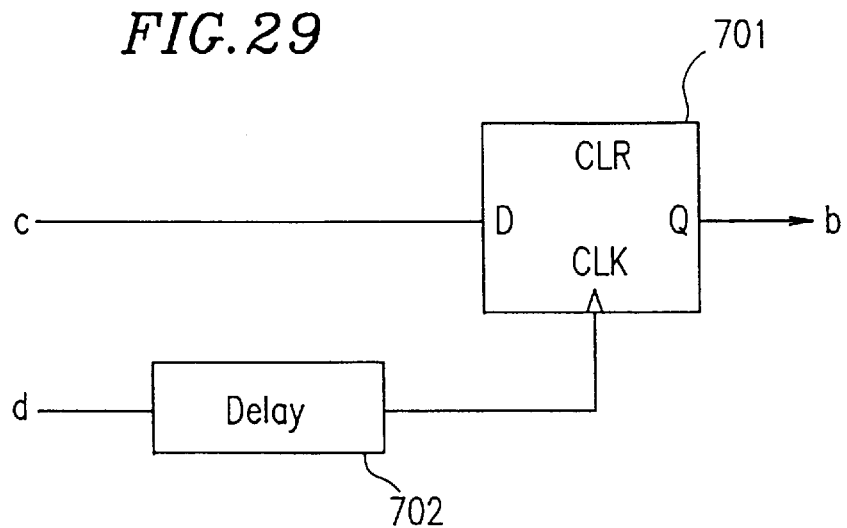
FIG. 29 is a diagram showing the configuration of a track identification mark reproduction circuit.

FIG. 29 is a diagram showing the configuration of the track identification mark reproduction circuit 604 for reproducing the track identification mark 412 from an optical disk having address regions shown in FIG. 27. Reference numeral 701 denotes a flip-flop, and 702 denotes a delay element. Signal b is a track identification signal. Signal c is a reproduced signal which has been digitalized. Signal d is a gate pulse signal based on a reproduced address.

Each logical address for identifying a data region is expressed by an address which is common to the land track 402 and the groove track 403 (reproduced by the address reproduction circuit 603) and a 1-bit track identification mark for identifying the land track 402 from the groove track 403.

FIG. 29 shows the track identification mark reproduction circuit 604 in the case where the track identification mark 412 is composed of 1 bit. The track identification mark reproduction circuit 604 is composed of the flip-flop 701 and the delay element 702 so that the address detection signal d (representing that the previous address has been successfully reproduced) is delayed by a predetermined amount of time and the reproduced signal c is taken into the flip-flop 701 during the gate period thereof. In accordance with this circuit, the track identification mark 412 (composed of 1 bit) is reproduced after a predetermined amount of time from the reproduction of the address. Herein, the most significant bit of the logical address is obtained based on whether or not the track identification mark 412 is present. In the case where the reproduced track identification mark 412 is composed of a plurality of bits, a track identification signal can be generated by comparison with a predetermined mark representing the land track 402 or the groove track 403, the signal being utilized as the most significant bit of the address.

The data reproduction circuit 612 compares the address reproduced by the ID reproduction circuit 602 and the address supplied from the CPU 601, and, if the addresses match, reproduces data after a predetermined period of time from the reproduction of the address.

Finally, if the reproduced address is determined to be different from the address supplied from the CPU 601, the target track is sought again. Herein, if only the most significant bit of these addresses are different, a half-track jump is made, and the track selection signal, which selects the tracking polarity, is inverted. In the above-described example, the case where only the most significant of the addresses are different corresponds to a case in which the addresses common to the land track and the groove track match but either a land track or a groove track is wrongly selected. In order to correct this situation, the tracking selection signal is inverted, so that the tracking polarity is switched.

When reproducing the data in a groove track of the optical disk shown in FIG. 27 by the above apparatus, the laser light scans approximately the center 408 of that groove track, and the address block 411 and the track identification mark 412 are reproduced. On the other hand, when reproducing the data in a land track, the laser light scans approximately the center 410 of that land track, and only the address is reproduced. Thus, the reproduced signal in the address region differs depending on the reproduced track. As a result, it becomes possible to identify the currently reproduced target to be either the land track 402 or the groove track 403 based on the reproduced signal only. Therefore, irrespective of the correspondence between groove configurations (i.e., groove track or land track) and tracking polarities, recording or reproduction can be performed for a desired track by only using the reproduced signal.

In accordance with the above-described optical disk recording/reproduction device, the tracking polarity can be automatically switched based on the reproduced signal in relation to the track identification mark. Therefore, it is possible to perform one, common type of tracking regardless of the kind of disk and the characteristics of the optical disk recording/reproduction device. As a result, compatibility among optical disks in which information is recorded on both land tracks and groove tracks can be improved.

(EXAMPLE 14)

Figure 30:
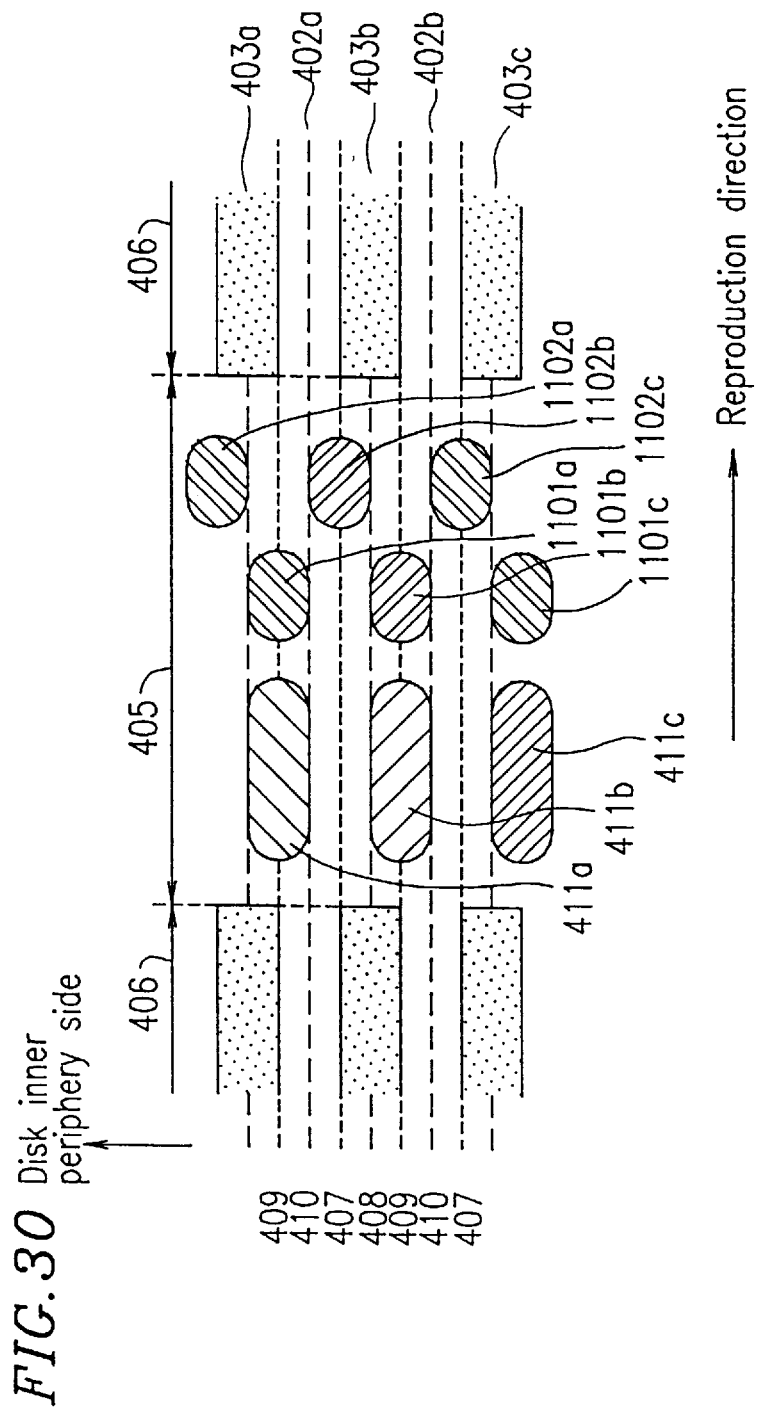
FIG. 30 is a diagram showing the location of address blocks in an optical disk according to still another example of the present invention.

FIG. 30 shows address regions 405 of still another example of an optical disk according to the present invention. The present example is characterized in that track identification marks 1101a, 1101b, 1101c, 1102a, 1102b, and 1102c are provided, as well as address blocks 411a, 411b, and 411c, in the address regions 405 of the optical disk.

The address regions 405 shown in FIG. 30 are formed in accordance with the CAV or ZCAV (ZCLV) format, in which the address regions of adjoining tracks are aligned along the radius direction of the disk. The address blocks 411a and 411b for identifying subsequent data regions are provided in the address regions 405.

The address block 411b is provided so as to be centered around a boundary line 409 between a groove track 403b and a land track 402b, the address block 411b being on both the groove track 403b and the land track 402b; different addresses are provided for different address regions. Since the address block 411b is located in the middle of the groove track 403b and the land track 402b, the same address block 411b is provided for the data regions 406 of the groove track 403b and the land track 402b adjoining each other in this disk. The two track identification marks 1101b and 1102b are formed so as to be shifted toward the outer periphery and the inner periphery, respectively, from the center 408 of the groove track 403b by about ½ of the track width. Herein, it is assumed that the two track identification marks 1101b and 1102b, present in the same address region, have the same value. Moreover, the two track identification marks are disposed in sequential positions along the track direction so that they will be sequentially reproduced. Similarly, two track identification marks 1101a, 1102a are similarly provided for a groove track 403a (located on the inner periphery side of the groove track 403b); two track identification marks 1101c, 1102c are provided for a groove track 403c (located on the outer periphery side of the groove track 403b). Herein, the two track identification marks present in a given address region 405 are assigned with a value different from that of the track identification marks in an adjoining address region 405. For example, the same mark 1 (indicated by oblique lines descending toward left in FIG. 30) is employed for the track identification marks 1101a and 1102a, 1101c, and 1102c on the groove tracks 403a and 403c, but mark 2 (indicated by oblique lines descending toward right in FIG. 30), which is different from mark 1, is employed for the track identification marks 1101b and 1102b on the adjoining groove track 403b. Herein, it is assumed that the track identification marks are each formed as data of 1 bit (i.e., 0 or 1), and that pits alternately representing 0 and 1 are provided for adjoining address regions along the radius direction. Specifically, a pit of 1 bit is provided, as the track identification marks 1101b and 1102b, for the groove track 403b; however, no pits are provided, as the track identification marks 1101a and 1102c, for the groove tracks adjoining the groove track 403b on the inner periphery side and the outer periphery side. In the optical disk 401 shown in FIG. 30, the track identification marks 1101 and 1102 are all located after the address blocks 411, so as to be more easily and accurately detected in accordance with a gate pulse signal generated based on the address blocks 411. In other words, it is ensured that the track identification marks 1101 and 1102 are reproduced after the address blocks 411 in the reproduced signal.

As a result, the two track identification marks having the same value (i.e., 1101b and 1102b) in the address regions 405 are reproduced when reproducing data in the groove track 403b, and the track identification marks having different values (i.e., 1101b and 1102c) in the address regions 405 are reproduced when reproducing data in the land track 402b. Although the tracks 403b and 402b have the same address block 411b, it is possible to identify whether a currently reproduced track is a land track or a groove track depending on whether the subsequently reproduced track identification mark matches or not.

FIG. 30 describes a disk in which the first track identification marks 1101a, 1101b, and 1101c are disposed on the boundary line 409 between the groove track 403b and the land track 402b adjoining the outer periphery of the groove track 403b and the second track identification marks 1102a, 1102b, and 1102c are disposed on the boundary line 407 between the groove track 403b and the land track 402a adjoining the inner periphery of the groove track 403b. However, the same effect can be attained by a disk in which the first track identification marks are disposed on the boundary line 407 between the groove track 403b and the land track 402a adjoining the inner periphery of the groove track 403b and the second track identification marks are disposed on the boundary line 409 between the groove track 403b and the land track 402b adjoining the outer periphery of the groove track 403b.

A case was described in which two track identification marks provided in the address region on a groove track have the same value, but the same effect can be attained in the case where two track identification marks provided in the address region on a land track have the same value.

Figure 31:
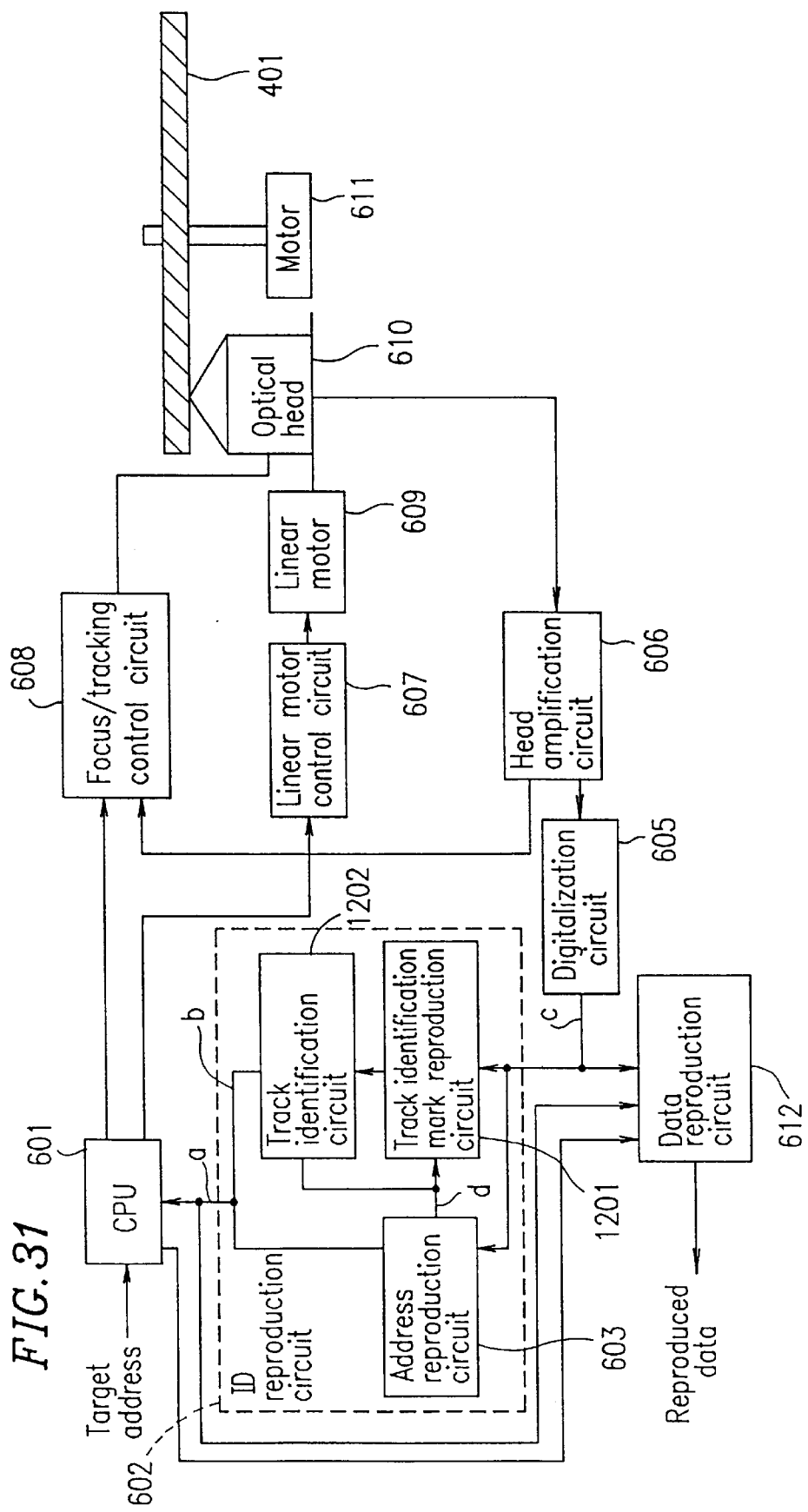
FIG. 31 is a block diagram showing an optical disk recording/reproduction device according to still another example of the present invention.

FIG. 31 is a diagram showing the configuration of an optical disk recording/reproduction device according to another example of the present invention. The optical disk recording/reproduction device of the present example records or reproduces information on the optical disk shown in FIG. 30. In the following description, a CPU 601 will be described as a track designation means; a track identification mark reproduction circuit 1201 will be described as a track identification mark reproduction means; and a track identification circuit 1202 will be described as a track identification means.

In FIG. 31, elements 601 and 605 to 612 perform the same operation as that described in Example 1.

An ID reproduction circuit 602 is composed of an address reproduction circuit 603 for reproducing information in an address block 411 based on a signal digitalized by a digitalization circuit 605, the track identification mark reproduction circuit 1201 for reproducing the track identification marks 1101 and 1102, and the track identification circuit 1202 for identifying the land track 402 from the groove track 403.

Figure 32:
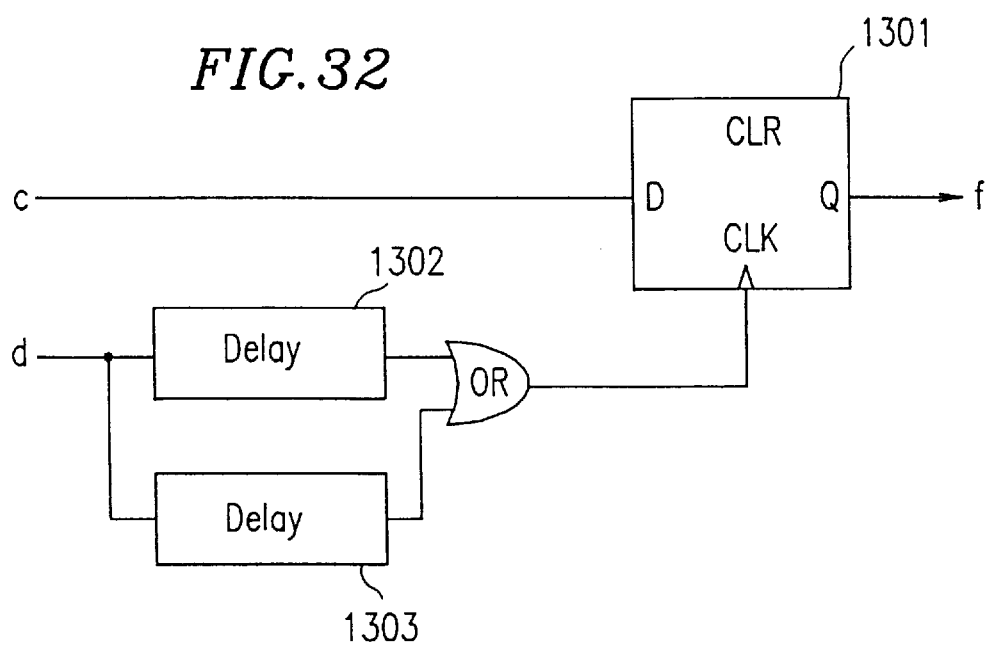
FIG. 32 is a diagram showing the configuration of a track identification mark reproduction circuit employed in the optical disk recording/reproduction device according to the present invention.

FIG. 32 is a diagram showing the configuration of the track identification mark reproduction circuit 1201 for reproducing the track identification marks 1101 and 1102 from the optical disk 401 shown in FIG. 30. Reference numeral 1301 denotes a flip-flop; 1302 and 1303 each denote a delay element.

Figure 33:
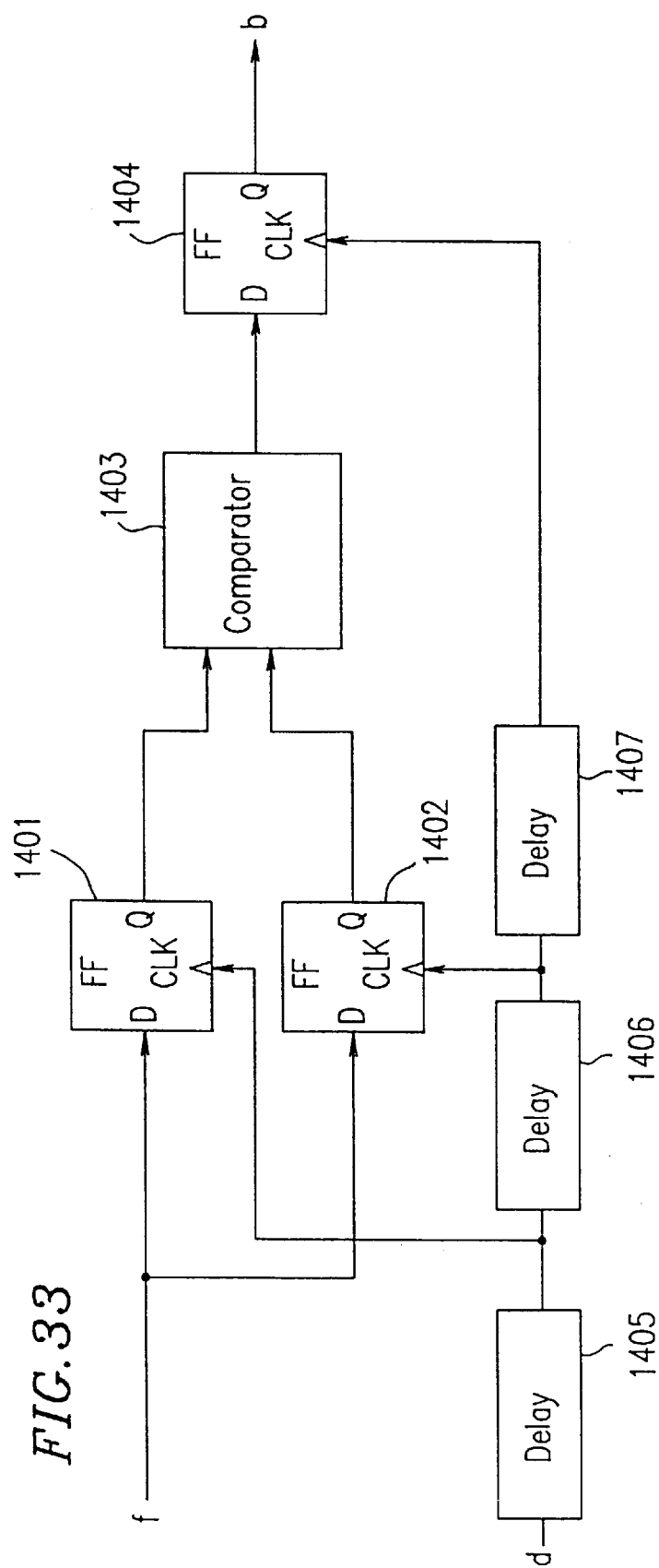
FIG. 33 is a diagram showing the configuration of a track identification circuit employed in the optical disk recording/reproduction device according to the present invention.

FIG. 33 is a diagram showing the configuration of the track identification circuit 1202 for generating track identification signal b from the two track identification marks 1101 and 1102 reproduced from the optical disk 401 shown in FIG. 30. Reference numeral 1401 denotes a flip-flop for retaining the value of the first track identification mark 1101 (composed of 1 bit); 1402 denotes a flip-flop for retaining the value of the second track identification mark 1102 (composed of 1 bit); 1403 denotes a comparator for comparing the two track identification marks; and 1404 denotes a flip-flop for retaining the value of a track identification signal. Gate pulse signals for taking in the two track identification marks 1101 and 1102 and a gate pulse signal for taking in the comparison result of the two track identification marks 1101 and 1102 are generated by delaying an address detection signal d by predetermined time periods.

Each logical address for identifying a data region is expressed by an address which is common to the land track 402 and the groove track 403 (reproduced by the address reproduction circuit 603) and a 1-bit track identification mark for identifying the land track 402 from the groove track 403.

FIG. 32 shows the track identification mark reproduction circuit 1201 in the case where the track identification marks 1101 and 1102 are each composed of 1 bit. The track identification mark reproduction circuit 1201 is composed of the flip-flop 1301 and the delay element 1302 so that the address detection signal d is delayed by predetermined amounts of time by means of the delay elements 1302 and 1303 and the digitalized reproduced signal c is taken into the flip-flop 1301 during the gate periods thereof. In accordance with this circuit, the two track identification marks 1101 and 1102 (composed of 1 bit) are reproduced after predetermined amounts of time from the reproduction of the address.

The track identification circuit 1202 shown in FIG. 33 is composed of the three flip-flops 1401, 1402, and 1404, the comparator 1403, and delay elements 1405, 1406, and 1407. The first track identification mark (reproduced by the track identification mark reproduction circuit 1201) is taken into the flip-flop 1401. The second track identification mark (reproduced by the track identification mark reproduction circuit 1201) is taken into the flip-flop 1402. The two track identification marks are compared by the comparator 1403, in accordance with gate pulse signals obtained by delaying the address detection signal d by predetermined time periods by means of the delay elements 1405, 1406, and 1407, respectively, the comparison result being retained in the flip-flop 1404. Specifically, the gate pulse signals obtained by delaying the address detection signal d by predetermined time periods by means of the delay elements 1405, 1406, and 1407, respectively, are applied to the clock terminals of the flip-flops 1401, 1402, and 1404.

The above circuitry generates a track identification signal which identifies a currently reproduced track to be a groove track when the two track identification marks match or a land track when the two track identification marks do not match. The track identification signal defines the most significant bit of the address of each data region.

When reproducing the information in the address regions of the optical disk shown in FIG. 30 by using the above apparatus, the laser light scans approximately the center 408 of the groove track 403b, so that the information in the address block 411b and the track identification marks 1101b and 1102b having the same value is reproduced. On the other hand, the laser light scans approximately the center 410 of the land track 402b, so that the information in the address block 411b and the track identification marks 1101b and 1102c having different values are reproduced. Thus, the reproduced signal for the reproduced track identification mark differs depending on the reproduced track. As a result, it becomes possible to identify the currently reproduced target to be either the land track 402 or the groove track 403 based on the reproduced signal only. Therefore, irrespective of the correspondence between groove configurations (i.e., groove track or land track) and tracking polarities, recording or reproduction can be performed for a desired track by only using the reproduced signal.

In accordance with the above-described optical disk recording/reproduction device, the tracking polarity can be automatically switched based on the reproduced signal in relation to the two track identification marks. Therefore, it is possible to perform one, common type of tracking regardless of the kind of disk and the characteristics of the optical disk recording/reproduction device. As a result, compatibility among optical disks in which information is recorded on both land tracks and groove tracks can be improved.

(EXAMPLE 15)

Another example of an optical disk according to the present invention will be described.

Figure 34:
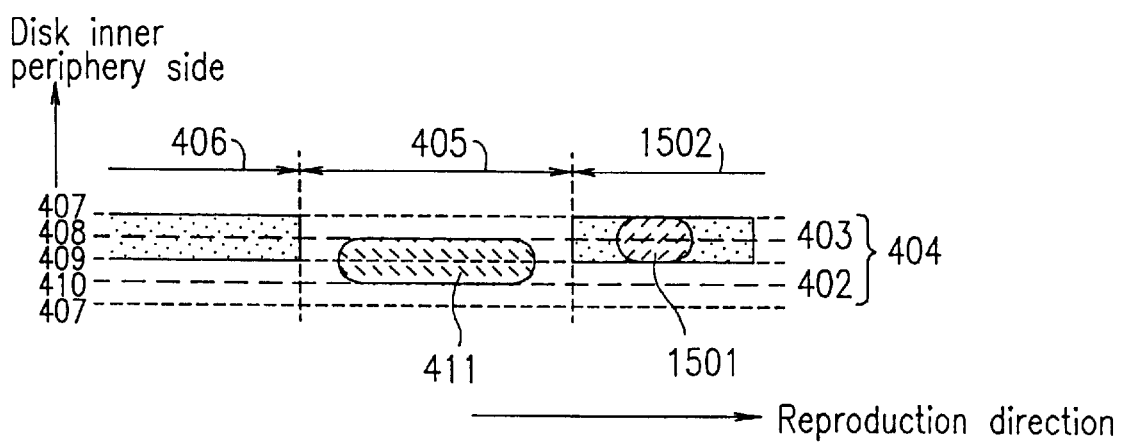
FIG. 34 is a diagram showing the location of address blocks in an optical disk according to still another example of the present invention.

FIG. 34 shows address regions 405 and a control information region 1502 of the optical disk according to the present example. In FIG. 34, 402 denotes a land track; 403 denotes a groove track; 405 denotes address regions; 411 denotes an address block; and 1501 denotes a track identification mark.

The address block 411 provided in the address regions 405 is recorded so as to be centered around a boundary line 409 between a groove track 403 and a land track 402, the address block 411 being on both the groove track 403 and the land track 402, and it takes a different value in each address region. The data regions of the adjoining groove track 403 and land track 402 are to be identified by the same address block 411. The track identification mark 1501 is provided in a specific position of the predetermined control information region 1502 of either the land track 402 or the groove track 403, so as to be on a track center 408 or 410 in the control information region 1502. The track identification mark 1501 is for identifying whether the track on which the track identification mark 1501 is provided is the land track 402 or the groove track 403, and differs depending on whether it is provided on a land track or a groove track. Herein, the track identification mark 1501 is composed of 1 bit.

As a result, if a track identification mark representing a groove track is reproduced in a currently reproduced track, it is known that the polarity of the currently performed tracking is intended for reproducing data in a groove track. If a track identification mark representing a land track is reproduced, it is known that the polarity of the currently performed tracking is intended for reproducing data in a land track. Thus, by reproducing the track identification mark 1501 from the reproduced signal only and detecting its pattern, the correspondence between the groove configuration of the currently reproduced track and a tracking polarity can be obtained.

In the optical disk 401 shown in FIG. 34, the track identification mark 1501 is located in the data region 406 after the address block 411, so as to be more easily and accurately detected in accordance with a gate pulse signal generated based on the address blocks 411. In other words, it is ensured that the track identification mark 1501 is reproduced after the address blocks 411 in the reproduced signal. It will be appreciated that, although the track identification mark 1501 is recorded in a data region on the groove track 403 in FIG. 34, the same effect can be expected by recording the track identification mark 1501 in a data region on the land track 402.

(EXAMPLE 16)

Figure 35:
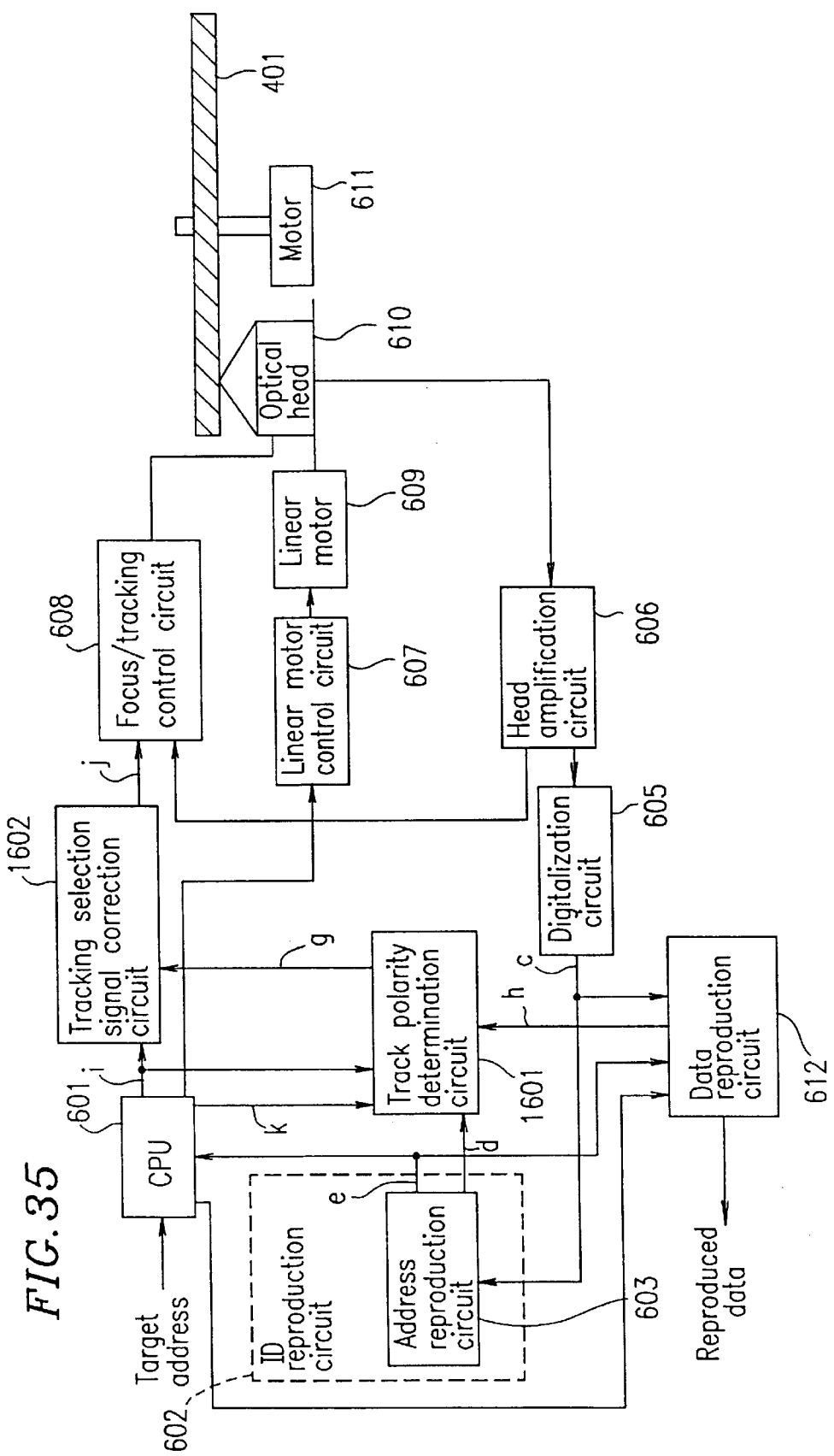
FIG. 35 is a block diagram showing an optical disk recording/reproduction device according to still another example of the present invention.

FIG. 35 is a diagram showing the configuration of an optical disk recording/reproduction device according to still another example of the present invention. The optical disk recording/reproduction device shown in FIG. 35 records or reproduces information on the optical disk shown in FIG. 34. In the following description, a CPU 601 will be described as a track designation means; a track polarity determination circuit 1601 will be described as a track polarity determination means; and a track selection signal correction circuit 1602 will be described as a track selection signal correction means.

In FIG. 35, elements 601 and 605 to 612 perform the same operation as that described in Example 1.

When reproducing data in a track in which a control information region 1502 is provided, the track polarity determination circuit 1601 identifies the currently reproduced track to be either a land track or a groove track by extracting a track identification mark 1501 from the reproduced signal from a data reproduction circuit 612. The track polarity determination circuit 1601 determines whether or not selection of a track is correctly performed by obtaining the correspondence between the designated track selection signal and the groove configuration (i.e., land or groove) of the track, and generates a tracking determination signal. The track selection signal correction circuit 1602 corrects the track selection signal from the CPU 601 depending on whether the tracking selection, as derived from the track polarity determination circuit 1601, is correct or not.

Figure 36:
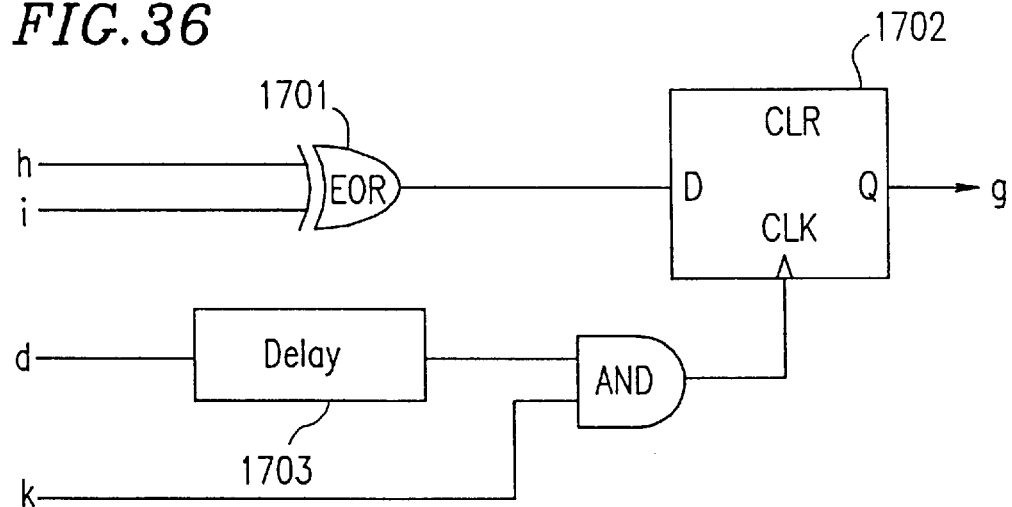
FIG. 36 is a diagram showing the configuration of a track polarity determination circuit employed in the optical disk recording/reproduction device according to the present invention.

FIG. 36 is a diagram showing an exemplary configuration of the track polarity determination circuit 1601 for determining whether or not tracking selection is correctly performed based on a track identification mark 1501 (reproduced signal h) in the control information region 1502 of the optical disk shown in FIG. 34 and a track selection signal i from the CPU 601. Reference numeral 1701 denotes an exclusive OR gate; 1702 denotes a flip-flop; and 1703 denotes a delay element.

Figure 37:
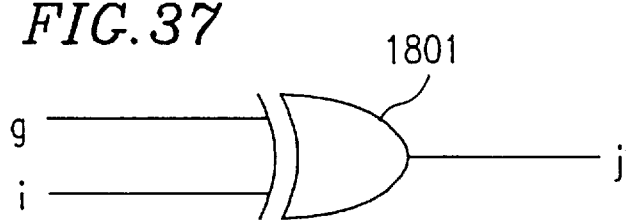
FIG. 37 is a diagram showing the configuration of a track selection signal correction circuit employed in the optical disk recording/reproduction device according to the present invention.
Figure 38:
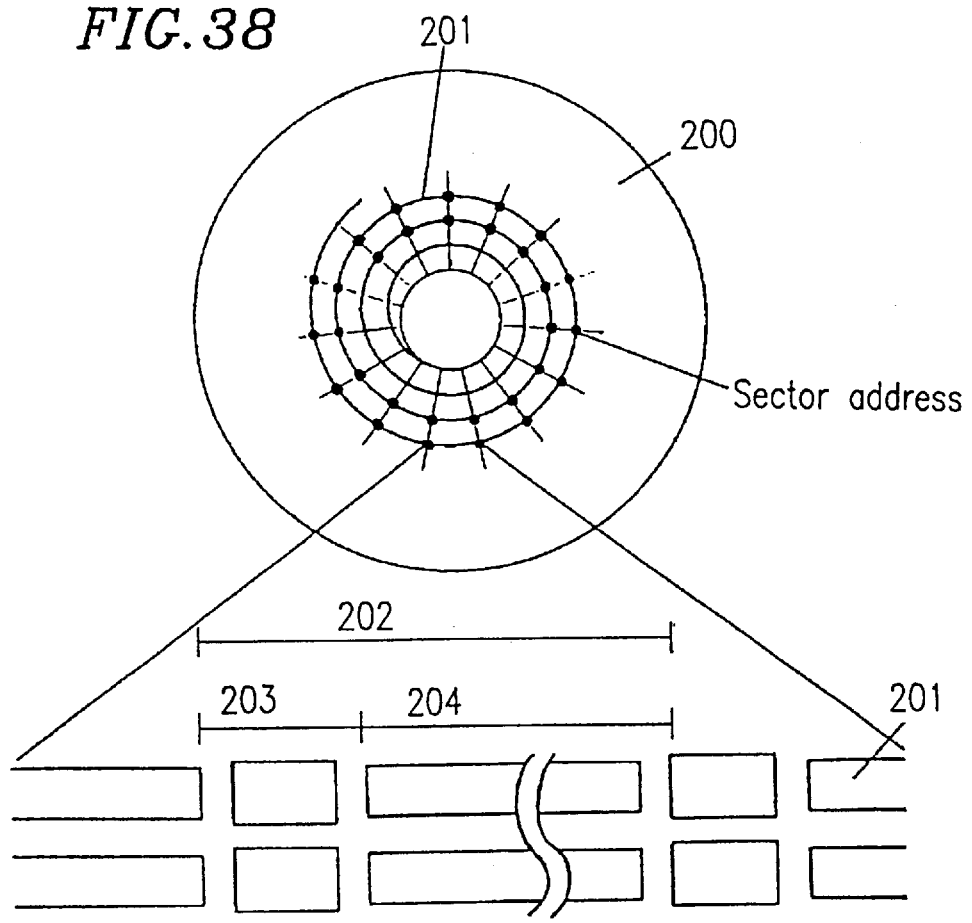
FIG. 38 is a diagram showing the track structure of a conventional optical disk.
Figure 39:
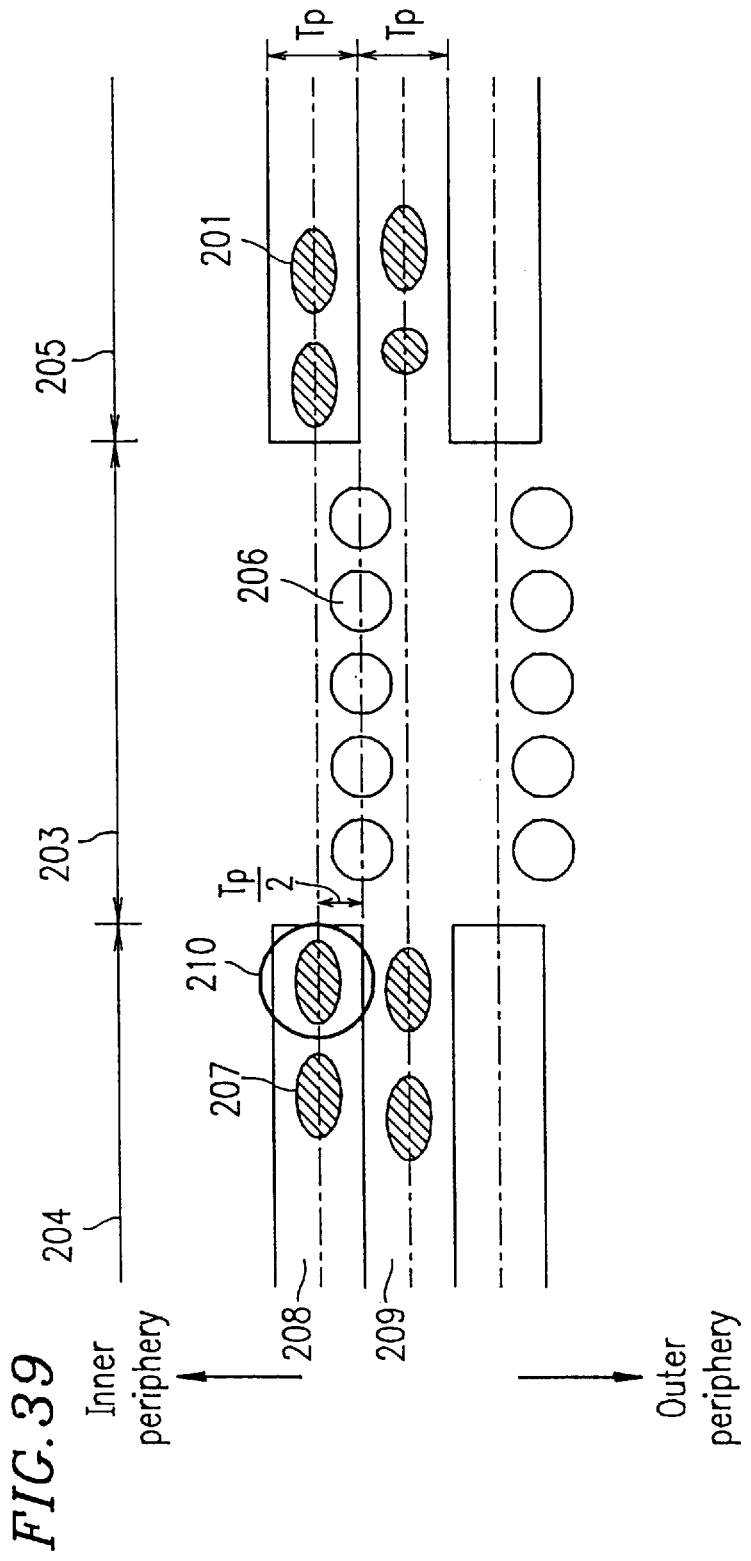
FIG. 39 is a schematic diagram showing a sector address in a conventional optical disk.
Figure 40:
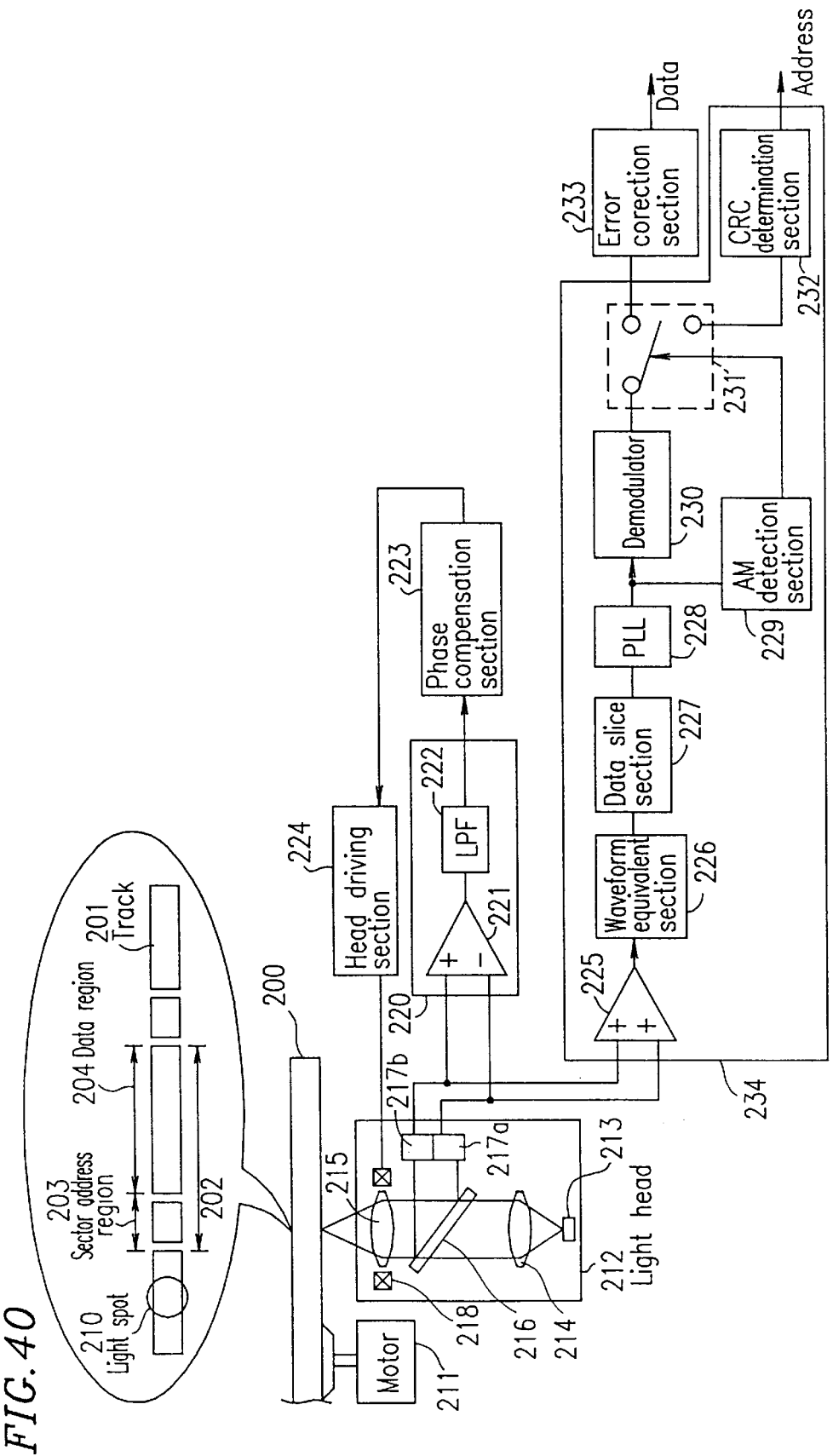
FIG. 40 is a block diagram showing a conventional optical disk recording/reproduction device.
Figure 41:
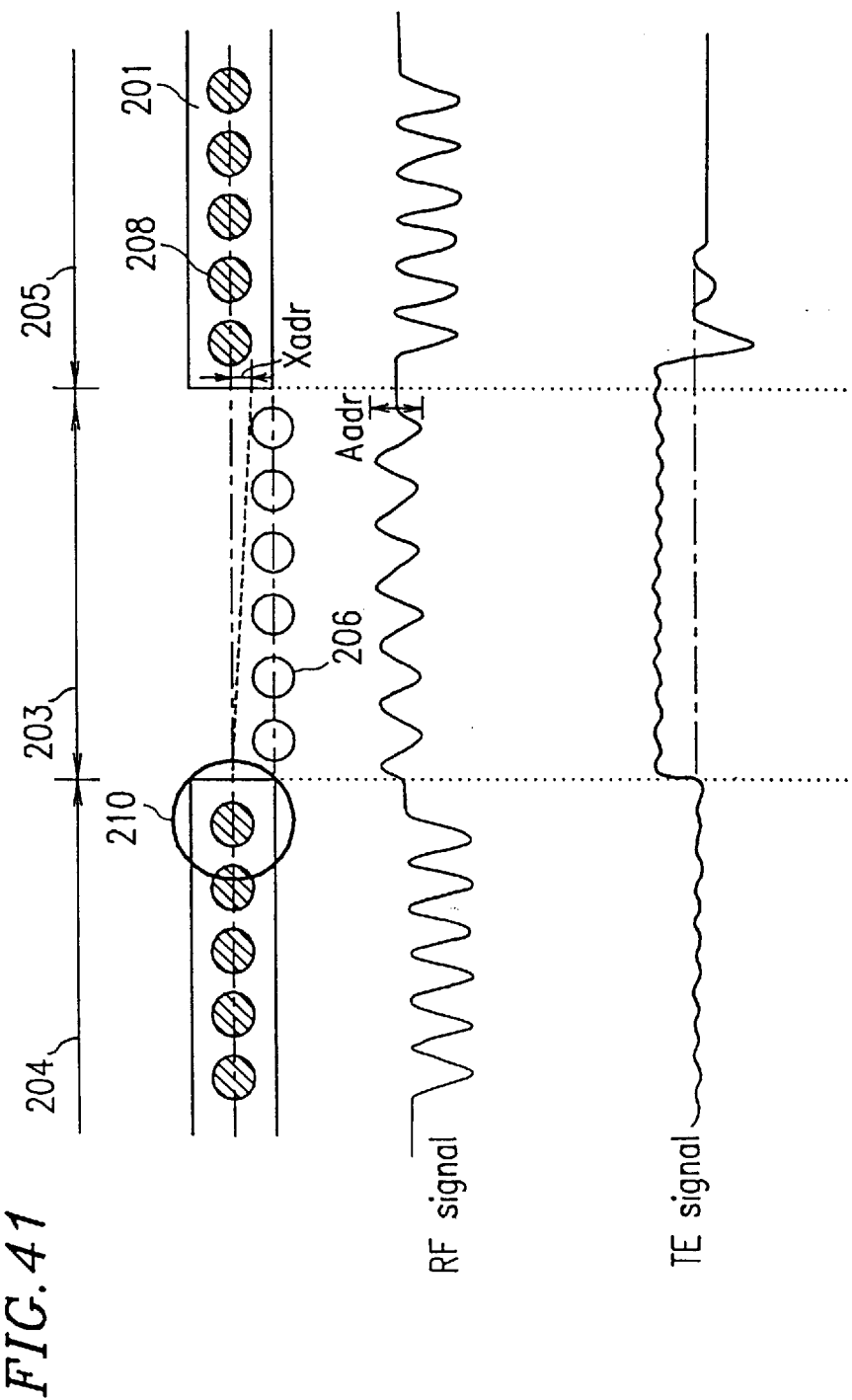
FIG. 41 is a diagram describing a RF signal and TE signal in a conventional example.

FIG. 37 is a diagram showing an exemplary configuration of the track selection signal correction circuit 1602 for correcting the track selection signal from the CPU 601 based on the track selection determination signal g, which is a result derived from the track polarity determination circuit 1601 indicating whether the tracking selection is correct or not. Reference numeral 1801 denotes an exclusive OR gate.

An operation which is performed when an optical disk is mounted in the optical disk recording/reproduction device having the above-described configuration will be described below.

When an optical disk is mounted, the recording/reproduction device reproduces a control information region 1502 of a particular track on which the track identification mark 1501 is provided. At this time, the CPU 601 outputs a track polarity identification signal k to the track polarity determination circuit 1601. When the logical address of a track including a control information region 1502 in which the track identification mark 1501 is provided is supplied to the CPU 601, the CPU 601 issues a command for a linear motor control circuit 607 to seek for a target track, and drives a linear motor 609 so as to move an optical head 610 to the vicinity of the target track. Next, the CPU 601 outputs a track jump command and the track selection signal i (which is in accordance with whether the track is a land track or a groove track) to a focus/tracking control circuit 608 so as to arrive at the target track. When the track selection signal i is supplied, the focus/tracking control circuit 608 conducts a half-track jump by switching the tracking control polarity, whereby focusing and tracking for the target track are attained.

It is assumed that the logical address for identifying a data region is represented by an address common to the land track 402 and the groove track 403 (reproduced by an address reproduction circuit 603) and a track selection signal composed of 1 bit for identifying a groove track from a land track (e.g., the most significant bit).

The data reproduction circuit 612 compares the address reproduced by the ID reproduction circuit 602 and the address supplied from the CPU 601 and, if the addresses match, reproduces data after a predetermined period of time from the reproduction of the address. When a disk has been mounted, the information in the control information region 1502 of a track which is provided with the track identification mark 1501 is reproduced.

FIG. 36 shows the track polarity determination circuit 1601 in the case where the track identification mark 1501 is composed of 1 bit. For example, when the track identification mark 1501 (reproduced signal h) indicates "1", the track identification mark 1501 is recorded on the groove track 403, and when the track identification mark 1501 indicates "0", the track identification mark 1501 is recorded on the land track 402. When the CPU 601 selects the groove track 403, "1" is output as the track selection signal i, and "0" is output when the land track 402 is desired to be selected. The exclusive OR gate 1701 shown in FIG. 36 detects a track selection error when the track selection signal i is different from the track identification mark 1501 (reproduced signal h). In other words, the track selection is wrong when it is determined based on the track identification mark 1501 that a land track is actually being tracked (i.e., when the track identification mark is "0") although a groove track is being selected (i.e., the track identification mark is "1") by the track selection signal i. By taking an exclusive OR of the two signals, such an error is detected. The track polarity determination signal k from the CPU 601 and the address detection signal d from the address reproduction circuit 603 are used as gate pulse signals for taking into the flip-flop 1702 a determination result as to whether or not the track selection is correct. The delay element 1703 delays the address detection signal d by a predetermined amount of time in order to generate the gate pulse signal used for taking in the signal indicating whether or not the track selection is correct.

The track selection signal correction circuit 1602 in FIG. 37 performs a correction based on the track polarity determination signal g in the case where the wrong tracking is being performed as known by the track selection signal i. When the wrong track is being selected, "1" appears in the track polarity determination signal; in such cases, the track selection signal i is inverted and supplied to the focus/tracking control circuit 608. This inversion operation is performed by the exclusive OR gate 1801 in FIG. 37. Since the data in a track in which the track identification mark 1501 is provided is reproduced when a disk is mounted or when the drive is activated, and since the matching/mismatching of the track selection signal from the CPU 601 and the tracking polarity is stored in the flip-flop 1702 in the track polarity determination circuit 1601, a correction based on the track polarity determination signal g is performed for the tracking selection in the subsequent reproduction/recording of data. As a result, correct tracking is always performed.

Therefore, in an optical disk in which at least one track identification mark 1501 is provided in the control information regions 1502 as shown in FIG. 34, the correspondence between the respective polarities of groove tracks and land tracks and the track selection signal output from the CPU 601 is previously obtained, so that recording or reproduction can be performed for a desired track irrespective of the correspondence between groove configurations and tracking polarities. Moreover, since correction of tracking polarities is possible by providing a track identification mark in only one track, a larger recording capacitance can be obtained than in the case where a track identification mark is provided in every address region.

In accordance with the above-described optical disk recording/reproduction device, the tracking polarity can be automatically switched based on the reproduced signal in relation to the two track identification marks. Therefore, it is possible to perform one, common type of tracking regardless of the kind of disk and the characteristics of the optical disk recording/reproduction device. As a result, compatibility among optical disks in which information is recorded on both land tracks and groove tracks can be improved.

It will be appreciated that all of the above Examples can also be applied to phase change type optical disks or magneto-optical disks.

Although disks having two or four address blocks in each sector address region were described in the above-described examples, the number of address blocks can be increased to three, or five or more to improve the address reading accuracy and determination accuracy of land/groove.

Thus, in accordance with the present invention, a plurality of address blocks are provided within one sector address region of an optical disk which allows recording/reproduction on both land tracks and groove tracks, the address blocks being disposed so as to wobble with respect to the center of each track along the radius direction, i.e., toward the inner periphery side or the outer periphery side. As a result, sector addresses can be securely read even when the light spot is off-tracked, and the disturbance in the tracking control due to level shifts of the tracking error signal in the sector address regions can be reduced. Thus, an optical disk which is unlikely to cause reading errors of address signals can be provided.

Moreover, in accordance with an optical disk recording/reproduction device employing the above optical disk, when information in wobbling address blocks is reproduced, the read-out address numbers are corrected in accordance with the overlapping sequential number (ID number), depending on whether the track is a land track or a groove track. As a result, a different address number can be read for each address block in one sector address, whereby an accurate address value can be obtained.

Moreover, in accordance with an optical disk recording/reproduction device employing the above optical disk, when information in wobbling address blocks is reproduced, it is determined whether or not the address numbers for the respective overlapping sequential numbers of the address blocks on the inner periphery side match the address numbers for the respective overlapping sequential numbers of the address blocks on the outer periphery side. As a result, it becomes possible to identify the current track to be either a land track or a groove track.

Furthermore, by detecting a difference between a tracking error signal or a reflected light amount signal in the address blocks on the inner periphery side and a tracking error signal or a reflected light amount signal in the address blocks on the outer periphery side, the true off-tracking amount between the light spot and the track can be detected. By detecting a tracking error signal by using this off-tracking amount, a tracking control system is realized such that the light spot can be always positioned in a track center.

Furthermore, since a tracking signal offset is symmetrically generated while the light spot passes through address regions, the tracking during the address reproduction becomes stable.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk recording/reproduction device for an optical disk of a land and groove recording/reproduction type including a plurality of sectors each having a sector address region and a data region, wherein the sector address region of the optical disk includes a plurality of address blocks, at least two of the plurality of address blocks that adjoin each other along a circumference direction being disposed on a boundary line between the land and the groove so as to be shifted toward opposite sides with respect to a track center, and each of the plurality of address blocks includes a portion indicating an address number for identifying the plurality of sectors from one another and a portion indicating an ID number for identifying the plurality of address blocks from one another within the sector address region, and wherein the recording/reproduction device comprises:

an optical head for radiating a light beam on the optical disk and receiving light reflected from the optical disk so as to output a reproduced signal; and an address signal reproduction section for reading the address number and the ID number when reproducing the sector address of the optical disk.

2. An optical disk recording/reproduction device according to claim 1 further comprising an address correction section for correcting the address number which is read from each address block in accordance with the ID number by employing a signal indicating land reproduction or groove reproduction.

3. An optical disk recording/reproduction device according to claim 1 further comprising:

a memory for storing the address number read by the address signal reproduction section as associated with the ID number read by the address signal reproduction section;

a comparator for comparing two or more address numbers respectively associated with two or more ID numbers against each other so as to detect whether or not the two or more address numbers match each other; and a judgment section for determining whether a track on which the light beam for reproduction is a land track or a groove track based on an output of the comparator.

4. An optical disk recording/reproduction device according to claim 1 further comprising a tracking error signal detection section for detecting a tracking error signal indicating a locational offset amount between a track and a light spot;

a timing generation section for generating a gate pulse signal synchronized with each address block of the sector address region;

an outer periphery value sample/hold section for sampling and holding the levels of the tracking error signals for the address blocks disposed on an outer periphery side in synchronization with the gate pulse signal;

an inner periphery value sample/hold section for sampling and holding the levels of the tracking error signals for the address blocks disposed on an inner periphery side in synchronization with the gate pulse signal;

a differential circuit for obtaining a difference between a value in the outer periphery value sample/hold section and a value in the inner periphery value sample/hold section;

a gain conversion section for converting an output of the differential circuit into a signal having a predetermined level; and a tracking offset correction circuit for performing a tracking correction using an output from the gain conversion section.

5. An optical disk recording/reproduction device according to claim 1 further comprising:

a reflected light amount signal detection section for detecting the amount of reflected light from the optical disk;

a timing generation section for generating a gate pulse signal synchronized with each address block of the sector address region;

an outer periphery value sample/hold section for sampling and holding the signal levels of the reflected light for the address blocks disposed on an outer periphery side in synchronization with the gate pulse signal;

an inner periphery value sample/hold section for sampling and holding the signal levels of the reflected light for the address blocks disposed on an inner periphery side in synchronization with the gate pulse signal;

a differential circuit for obtaining a difference between a value held in the outer periphery value sample/hold section and a value held in the inner periphery value sample/hold section;

a gain conversion section for converting an output of the differential circuit, into a signal having a predetermined level; and a tracking offset correction circuit for performing a tracking correction using an output from the gain conversion section.

6. An optical disk recording/reproduction device according to claim 3 further comprising an address correction section for correcting the address number stored in the memory in accordance with the ID number.

* * * * *